United States Patent
Chong et al.

(10) Patent No.: US 11,412,430 B2
(45) Date of Patent: Aug. 9, 2022

(54) NETWORK HANDOVER METHOD AND SESSION MANAGEMENT NETWORK ELEMENT

(71) Applicant: HUAWEI TECHNOLOGIES CO., LTD., Guangdong (CN)

(72) Inventors: Weiwei Chong, Shanghai (CN); Xiaobo Wu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 74 days.

(21) Appl. No.: 16/872,997

(22) Filed: May 12, 2020

(65) Prior Publication Data
US 2020/0275332 A1   Aug. 27, 2020

Related U.S. Application Data

(63) Continuation of application No. PCT/CN2018/114922, filed on Nov. 9, 2018.

(30) Foreign Application Priority Data

Nov. 20, 2017   (CN) .......................... 201711158612.3

(51) Int. Cl.
*H04W 36/14* (2009.01)
*H04L 65/1066* (2022.01)
(Continued)

(52) U.S. Cl.
CPC .......... *H04W 36/14* (2013.01); *H04L 65/1066* (2013.01); *H04W 28/24* (2013.01); *H04W 36/0022* (2013.01)

(58) Field of Classification Search
CPC . H04W 28/24; H04W 36/14; H04W 36/0022; H04L 65/1066; H04L 65/106
See application file for complete search history.

(56) References Cited

U.S. PATENT DOCUMENTS 10,880,789 B2 * 12/2020 Xu .................. H04W 76/11
2005/0197122 A1 * 9/2005 Sliva ............... H04W 36/12
                                                                455/436
(Continued)

FOREIGN PATENT DOCUMENTS

CN     103596643 A     2/2014
CN     106937345 A     7/2017

OTHER PUBLICATIONS

3GPP TS 23.501 V1.5.0 (Nov. 2017)," 3rd Generation Partnership Project; Technical Specification Group Services and System Aspects; System Architecture for the 5G System;Stage 2 (Release 15)," Nov. 2017, 170 pages.

(Continued)

*Primary Examiner* — Melanie Jagannathan
(74) *Attorney, Agent, or Firm* — Fish & Richardson P.C.

(57) ABSTRACT

Embodiments of this application relate to the communications field and disclose a network handover method and a session management network element. The method includes: receiving, by a session management network element, first indication information and second indication information from an access management network element, wherein the first indication information is used to indicate that a terminal device is handed over from a first network to a second network to set up a voice service, and the second indication information is used to indicate that the terminal device needs to return to the first network after the voice service ends; and sending, by the session management network element, the first indication information and the second indication information to an access network device of the second network.

14 Claims, 31 Drawing Sheets

(51) Int. Cl.
H04W 28/24 (2009.01)
H04W 36/00 (2009.01)

(56) References Cited

U.S. PATENT DOCUMENTS

| | | | |
|---|---|---|---|
| 2006/0019664 A1* | 1/2006 | Nelakanti | H04W 36/14 455/436 |
| 2012/0063420 A1* | 3/2012 | Long | H04W 4/16 370/331 |
| 2013/0260765 A1 | 10/2013 | Aoyagi et al. | |
| 2015/0350964 A1* | 12/2015 | Lin | H04W 36/00835 455/436 |
| 2016/0007240 A1* | 1/2016 | Belghoul | H04W 76/27 370/331 |
| 2016/0157142 A1* | 6/2016 | Koskinen | H04W 36/0022 370/331 |
| 2016/0183156 A1* | 6/2016 | Chin | H04L 61/2007 370/331 |
| 2017/0339609 A1* | 11/2017 | Youn | H04W 76/11 |
| 2018/0227978 A1* | 8/2018 | Keller | H04W 4/14 |
| 2018/0270715 A1* | 9/2018 | Lee | H04L 12/4633 |
| 2018/0270778 A1* | 9/2018 | Bharatia | H04L 65/1063 |
| 2018/0324646 A1* | 11/2018 | Lee | H04W 36/0016 |
| 2018/0359672 A1* | 12/2018 | Keller | H04L 67/141 |
| 2018/0376384 A1* | 12/2018 | Youn | H04W 36/0022 |
| 2019/0007500 A1* | 1/2019 | Kim | H04L 67/141 |
| 2019/0007877 A1* | 1/2019 | Keller | H04W 36/26 |
| 2019/0007992 A1* | 1/2019 | Kim | H04W 64/006 |
| 2019/0059026 A1* | 2/2019 | Huang-Fu | H04W 36/08 |
| 2019/0069210 A1* | 2/2019 | Lee | H04W 36/32 |
| 2019/0223135 A1* | 7/2019 | Park | H04W 8/02 |
| 2020/0015128 A1* | 1/2020 | Stojanovski | H04W 36/0022 |
| 2020/0022031 A1* | 1/2020 | Li | H04W 36/0022 |
| 2020/0112894 A1* | 4/2020 | Koshimizu | H04W 36/14 |
| 2020/0120552 A1* | 4/2020 | Yang | H04W 12/04 |
| 2020/0120570 A1* | 4/2020 | Youn | H04W 36/0033 |
| 2020/0205042 A1* | 6/2020 | Ryu | H04W 36/00 |
| 2020/0252849 A1* | 8/2020 | Tang | H04W 36/0022 |
| 2020/0275330 A1* | 8/2020 | Tang | H04W 36/22 |
| 2020/0275332 A1* | 8/2020 | Chong | H04L 5/00 |
| 2020/0275337 A1* | 8/2020 | Liu | H04W 36/0044 |
| 2020/0322851 A1* | 10/2020 | Sun | H04W 36/0016 |
| 2021/0185567 A1* | 6/2021 | Zhang | H04W 36/0022 |
| 2021/0345203 A1* | 11/2021 | Balasubramanian | H04W 60/04 |

OTHER PUBLICATIONS

3GPP TS 23.502 V1.3.0 (Nov. 2017), "3rd Generation Partnership Project; Technical Specification Group Services and System Aspects; Procedures for the 5G System; Stage 2 (Release 15)," Nov. 2017, 215 pages.

China Unicom, "Procedure of Voice fallback in 23.502," SA WG2 Meeting #122bis, S2-175487, Sophia Antipolis, France, Jul. 21-25, 2017, 5 pages.

Ericsson, "Fast return after CSFB, introduce the support for the Last Used LTE PLMN ID," 3GPP TSG RAN WG3 Meeting #83, R3-140311, Prague, Czech Republic, Feb. 10-14, 2014, 3 pages.

Extended European Search Report issued in European Application No. 18879469.7 dated Sep. 16, 2020, 9 pages.

Huawei et al., "How CSFB UE return back to the former LTE PLMN," SA WG2 Meeting #98, S2-132798, Valencia, Spain, Jul. 15-19, 2013, 14 pages.

Huawei et al., "Voice service for the UE camping on 5GS," SA WG2 Meeting #122 Bis, S2-175551, Sophia Antipolis, France, Aug. 21-25, 2017, 4 pages.

Intel, Samsung, "EPS fallback," SA WG2 Meeting #122, S2-174550, San Jose Del Cabo, Mexico, Jun. 26-30, 2017, 4 pages.

Office Action issued in Chinese Application No. 201711158612.3 dated Dec. 24, 2019, 15 pages (with English translation).

Oppo et al., "Discussion for returning back to NR in case of handover for voice," SA WG2 Meeting #122bis, S2-176976, Ljubljana, Slovenia, Oct. 23-27, 2017, 3 pages.

Oppo et al., "Returning back to NR in case of handover for voice," SA WG2 Meeting #122bis, S2-176977, Ljubljana, Slovenia, Oct. 23-27, 2017, 6 pages.

PCT International Search Report and Written Opinion issued in International Application No. PCT/CN2018/114922 dated Jan. 30, 2019, 16 pages (with English translation).

ZTE, "Discussion on EPS/RAT fallback scenario and solution," SA WG2 Meeting #122bis, S2-175477, Sophia Antipolis, France, Aug. 21-25, 2017, 4 pages.

* cited by examiner

NETWORK HANDOVER METHOD AND SESSION MANAGEMENT NETWORK ELEMENT

CROSS-REFERENCE TO RELATED APPLICATIONS

This application is a continuation of International Application No. PCT/CN2018/114922, filed on Nov. 9, 2018, which claims priority to Chinese Patent Application No. 201711158612.3, filed on Nov. 20, 2017. The disclosure of the aforementioned applications are hereby incorporated by reference in their entireties.

TECHNICAL FIELD

Embodiments of this application relate to the communications field, and in particular, to a network handover method and a session management network element.

BACKGROUND

Currently, a next generation radio access network (NG RAN) still cannot meet a coverage requirement of a voice service. Therefore, most operator networks may prefer to provide a voice service for a user by using a fallback solution, that is, a terminal device is enabled to fall back from the NG RAN to an evolved universal terrestrial radio access network (E-UTRAN) to execute a voice service. In an existing standard, two fallback solutions are proposed: an evolved packet system (EPS) fallback and a radio access type (RAT) fallback, and specific signaling designs and specific procedure designs are proposed for the foregoing two fallback solutions.

However, there is no solution for supporting the terminal device in quickly returning to the NG RAN after the terminal device falls back to the E-UTRAN to execute the voice service. Consequently, the terminal device fails to return to the NG RAN, or camps on the E-UTRAN for a long time, and therefore the terminal device cannot make full use of a wider variety of higher-rate services that are more stable and reliable and that are provided by an NG RAN newly deployed by an operator and cannot obtain better service experience.

SUMMARY

This application provides a network handover method and a session management network element, so that a terminal device can return to an NG RAN after the terminal device falls back to an E-UTRAN to execute a voice service.

To achieve the foregoing objective, the following technical solutions are used in this application:

According to a first aspect, a network handover method is disclosed, including: when a terminal device camps on a first network to initiate a voice call but needs to fall back to a second network to execute a voice service, receiving, by an access network device of the first network, a first message from a core network device of the first network, where the first message is used to request to set up a user plane tunnel of the voice service for the terminal device; sending, by the access network device of the first network, a second message to the core network device of the first network, where the second message herein is used to respond to the first message that is sent from the core network device of the first network and that is received by the access network device of the first network; and sending, by the access network device of the first network, a third message to the core network device of the first network or an access network device of the second network, where the third message is used to trigger the terminal device to be handed over from the first network to the second network. It should be noted that at least one of the second message and the third message carries first indication information and/or second indication information. The first indication information is used to indicate that the terminal device is handed over from the first network to the second network to set up a voice service, and the second indication information is used to indicate that the terminal device needs to return to the first network after the voice service ends.

In the network handover method provided in this embodiment of this application, when the access network device of the first network (for example, an NG RAN) enables the terminal device to fall back to the second network to execute the voice service, the access network device of the first network may send indication information to the access network device of the second network (for example, an E-UTRAN), and the access network device of the second network may return the terminal device to the first network based on the received indication information. The indication information may be the first indication information and/or the second indication information, the first indication information is used to indicate that the terminal device is handed over from the first network to the second network to set up the voice service, and the second indication information is used to indicate that the terminal needs to return to the first network after the voice service ends. In this way, the terminal device can make full use of a wider variety of higher-rate services that are more stable and reliable and that are provided by an NG RAN network newly deployed by an operator, to obtain better service experience.

With reference to the first aspect, in a first possible implementation of the first aspect, if the third message carries the first indication information and/or the second indication information, the method further includes: adding, by the access network device of the first network, the first indication information and/or the second indication information to a transparent container in the third message, where the transparent container is sent from the access network device of the first network to the access network device of the second network.

In other words, the access network device of the first network may directly send the first indication information and/or the second indication information to the access network device of the second network by using the transparent container, so that the access network device of the second network can return the terminal device to the first network based on the first indication information and/or the second indication information. In addition, the access network device of the first network may send the transparent container through an X2 interface between the access network device of the first network and the access network device of the second network, and the transparent container does not need to be forwarded by using the core network device of the first network and a core network device of the second network, thereby greatly reducing system signaling overheads.

With reference to the first aspect or the first possible implementation of the first aspect, in a second possible implementation of the first aspect, the method further includes: at least one of the second message and the third message carries a network identifier of the first network.

Specifically, network identifier information of the first network may be the first network PLMN. Therefore, after the network identifier information of the first network is transmitted to the core network device of the first network by using the second message or the third message, the core network device of the first network may forward the first indication information, the second indication information, and the network identifier information of the first network to the core network device of the second network, so that the core network device of the second network forwards the information to the access network device of the second network, and the access network device of the second network can determine to return the terminal device to the first network, and further determine to return the terminal device to a network corresponding to the network identifier information.

With reference to any one of the first aspect or the foregoing possible implementations of the first aspect, in a third possible implementation of the first aspect, a type of a core network of the first network is the same as that of a core network of the second network, and a type of an access network of the first network is different from that of an access network of the second network; or a type of a core network of the first network is different from that of a core network of the second network, and a type of an access network of the first network is different from that of an access network of the second network.

With reference to any one of the first aspect or the foregoing possible implementations of the first aspect, in a fourth possible implementation of the first aspect, that a type of a core network of the first network is the same as that of a core network of the second network, and a type of an access network of the first network is different from that of an access network of the second network includes: the core network of the first network and the core network of the second network are 5G core networks, the access network of the first network is an NG RAN, and the access network of the second network is an E-UTRAN.

In other words, the first network is a 5G network connected to the NG RAN, and the second network is a 5G network connected to the E-UTRAN.

With reference to any one of the first aspect or the foregoing possible implementations of the first aspect, in a fifth possible implementation of the first aspect, that a type of a core network of the first network is different from that of a core network of the second network, and a type of an access network of the first network is different from that of an access network of the second network includes: the core network of the first network is a 5G core network, the core network of the second network is a 4G core network, the access network of the first network is an NG RAN, and the access network of the second network is an E-UTRAN.

In other words, the first network is a 5G network connected to the NG RAN, and the second network is a 4G network connected to the E-UTRAN.

According to a second aspect, an access network device is disclosed, and the access network device is an access network device of a first network and includes: a receiving unit, configured to receive a first message from a core network device of the first network, where the first message is used to request to set up a user plane tunnel of a voice service for a terminal device; and a sending unit, configured to send a second message to the core network device of the first network, where the second message herein is used to respond to the first message that is sent from the core network device of the first network and that is received by the access network device of the first network. The sending unit is further configured to send a third message to the core network device of the first network or an access network device of a second network, where the third message is used to trigger the terminal device to be handed over from the first network to the second network. It should be noted that at least one of the second message and the third message carries first indication information and/or second indication information. The first indication information is used to indicate that the terminal device is handed over from the first network to the second network to set up a voice service, and the second indication information is used to indicate that the terminal device needs to return to the first network after the voice service ends.

When the access network device of the first network (for example, an NG RAN) provided in this embodiment of this application enables the terminal device to fall back to the second network to execute the voice service, the access network device of the first network may send indication information to the access network device of the second network (for example, an E-UTRAN), and the access network device of the second network may return the terminal device to the first network based on the received indication information. The indication information may be the first indication information and/or the second indication information, the first indication information is used to indicate that the terminal device moves from the first network to the second network to set up the voice service, and the second indication information is used to indicate that the terminal needs to return to the first network after the voice service ends. In this way, the terminal device can make full use of a wider variety of higher-rate services that are more stable and reliable and that are provided by an NG RAN network newly deployed by an operator, to obtain better service experience.

With reference to the second aspect, in a first possible implementation of the second aspect, if the third message carries the first indication information and/or the second indication information, the sending unit is specifically configured to: add the first indication information and/or the second indication information to a transparent container in the third message, and send the transparent container to the access network device of the second network.

In other words, the access network device of the first network may directly send the first indication information and/or the second indication information to the access network device of the second network by using the transparent container, so that the access network device of the second network can return the terminal device to the first network based on the first indication information and/or the second indication information. In addition, the access network device of the first network may send the transparent container through an X2 interface between the access network device of the first network and the access network device of the second network, and the transparent container does not need to be forwarded by using the core network device of the first network and a core network device of the second network, thereby greatly reducing system signaling overheads.

With reference to the second aspect or the first possible implementation of the second aspect, in a second possible implementation of the second aspect, the method further includes: at least one of the second message and the third message carries network identifier information of the first network.

Specifically, the network identifier information of the first network may be the first network PLMN. Therefore, after the network identifier information of the first network is transmitted to the core network device of the first network by using the second message or the third message, the core network device of the first network may forward the first indication information, the second indication information, and the network identifier information of the first network to the core network device of the second network, so that the core network device of the second network forwards the information to the access network device of the second network, and the access network device of the second network can determine to return the terminal device to the first network, and further determine to return the terminal device to a network corresponding to the network identifier information.

With reference to any one of the second aspect or the foregoing possible implementations of the second aspect, in a third possible implementation of the second aspect, a type of a core network of the first network is the same as that of a core network of the second network, and a type of an access network of the first network is different from that of an access network of the second network; or a type of a core network of the first network is different from that of a core network of the second network, and a type of an access network of the first network is different from that of an access network of the second network.

With reference to any one of the second aspect or the foregoing possible implementations of the second aspect, in a fourth possible implementation of the second aspect, that a type of a core network of the first network is the same as that of a core network of the second network, and a type of an access network of the first network is different from that of an access network of the second network includes: the core network of the first network and the core network of the second network are 5G core networks, the access network of the first network is an NG RAN, and the access network of the second network is an E-UTRAN.

In other words, the first network is a 5G network connected to the NG RAN, and the second network is a 5G network connected to the E-UTRAN.

With reference to any one of the second aspect or the foregoing possible implementations of the second aspect, in a fifth possible implementation of the second aspect, that a type of a core network of the first network is different from that of a core network of the second network, and a type of an access network of the first network is different from that of an access network of the second network includes: the core network of the first network is a 5G core network, the core network of the second network is a 4G core network, the access network of the first network is an NG RAN, and the access network of the second network is an E-UTRAN.

In other words, the first network is a 5G network connected to the NG RAN, and the second network is a 4G network connected to the E-UTRAN.

According to a third aspect, an access network device is disclosed, including a transceiver, a processor, and a memory, where the memory stores code, and the processor is configured to invoke the code in the memory to perform the network handover method in any one of the first aspect or the possible implementations of the first aspect.

According to a fourth aspect, a computer readable storage medium is disclosed. The computer readable storage medium stores an instruction, and when the computer readable storage medium runs on the access network device in any one of the second aspect or the possible implementations of the second aspect, the access network device is enabled to perform the network handover method in any one of the first aspect or the possible implementations of the first aspect.

According to a fifth aspect, a wireless communications apparatus is disclosed. The wireless communications apparatus stores an instruction, and when the wireless communications apparatus runs on the access network device in any one of the second aspect or the possible implementations of the second aspect, the access network device is enabled to perform the network handover method in any one of the first aspect or the possible implementations of the first aspect. The wireless communications apparatus may be a chip.

According to a sixth aspect, a network handover method is disclosed, including:

receiving, by an access network device of a second network, first indication information and/or second indication information from an access network device of a first network or a core network device of the second network, where the first indication information is used to indicate that a terminal device is handed over from the first network to the second network to set up a voice service, and the second indication information is used to indicate that the terminal device needs to return to the first network after the voice service ends; and returning, by the access network device of the second network, the terminal device to the first network based on the first indication information and/or the second indication information after the voice service of the terminal device ends.

In the network handover method provided in this embodiment of this application, when the access network device of the first network (for example, an NG RAN) enables the terminal device to fall back to the second network to execute a voice service, the access network device of the first network or the core network device of the second network may send indication information to the access network device of the second network (for example, an E-UTRAN), and the access network device of the second network may return the terminal device to the first network based on the received indication information. The indication information may be the first indication information and/or the second indication information. In this way, the terminal device can make full use of a wider variety of higher-rate services that are more stable and reliable and that are provided by an NG RAN network newly deployed by an operator, to obtain better service experience.

With reference to the sixth aspect, in a first possible implementation of the sixth aspect, the receiving, by an access network device of a second network, first indication information and/or second indication information from an access network device of a first network or a core network device of the second network specifically includes: receiving a handover request message from the access network device of the first network or a mobility management network element of the second network or an access management network element of the second network, where the handover request message carries the first indication information and/or the second indication information, and the handover request message is used to request to hand over the terminal device from the first network to the second network.

In other words, the access network device of the first network may directly send the first indication information and/or the second indication information to the access network device of the second network, or the access network device of the first network may first send the first indication information and/or the second indication information to a core network device of the first network, then the core network device of the first network forwards the first indication information and/or the second indication information to the core network device of the second network, and finally the core network device of the second network forwards the first indication information and/or the second indication information to the access network device of the second network. Regardless of which of the foregoing two manners is used to forward the first indication information and/or the second indication information, the access network device of the second network finally can receive the first indication information and/or the second indication information.

With reference to the sixth aspect or the first possible implementation of the sixth aspect, in a second possible implementation of the sixth aspect, that the handover request message carries the first indication information and/or the second indication information includes: a transparent container in the handover request message carries the first indication information and/or the second indication information, and the transparent container is sent from the access network device of the first network to the access network device of the second network.

In other words, the access network device of the first network directly sends the first indication information and/or the second indication information to the access network device of the second network by using the transparent container.

With reference to any one of the sixth aspect or the foregoing possible implementations of the sixth aspect, in a third possible implementation of the sixth aspect, the receiving, by an access network device of a second network, first indication information and/or second indication information from an access network device of a first network or a core network device of the second network specifically includes: receiving a tunnel release request from the mobility management network element or the access management network element of the second network, where the tunnel release request carries the first indication information and/or the second indication information, and the tunnel release request is used to request to release a user plane tunnel of a voice service.

In a scenario in which the first network is a 5G network connected to an NG RAN, and the second network is a 4G network connected to an E-UTRAN, the access network device of the second network receives the tunnel release request from the mobility management network element of the second network. In a scenario in which the first network is a 5G network connected to an NG RAN, and the second network is a 5G network connected to an E-UTRAN, the access network device of the second network receives a tunnel release request from a mobility management network element of the first network.

With reference to any one of the sixth aspect or the foregoing possible implementations of the sixth aspect, in a fourth possible implementation of the sixth aspect, the returning, by the access network device of the second network, the terminal device to the first network based on the first indication information and/or the second indication information after the voice service ends includes: returning, by the access network device of the second network, the terminal device to the first network based on the first indication information and/or the second indication information after the user plane tunnel of the voice service is released.

With reference to any one of the sixth aspect or the foregoing possible implementations of the sixth aspect, in a fifth possible implementation of the sixth aspect, when the access network device of the second network receives the first indication information and/or the second indication information from the access network device of the first network or the core network device of the first network, the method further includes:

receiving, by the access network device of the second network, a network identifier of the first network from the access network device of the first network or the core network device of the second network; and the returning, by the access network device of the second network, the terminal device to the first network based on the first indication information and/or the second indication information after the voice service ends includes: returning, by the access network device of the second network, the terminal device to the first network based on the first indication information and/or the second indication information and the network identifier of the first network after the voice service ends.

With reference to any one of the sixth aspect or the foregoing possible implementations of the sixth aspect, in a sixth possible implementation of the sixth aspect, the returning the terminal device to the first network includes: sending a second handover request message to the core network device of the second network, where the second handover request message is used to trigger the terminal device to be handed over to the first network; or sending redirection information to the terminal device, where the redirection information is used to trigger the terminal device to be redirected to the first network.

In specific implementation, the access network device of the second network may return the terminal device to the first network in either of the foregoing two manners.

With reference to any one of the sixth aspect or the foregoing possible implementations of the sixth aspect, in a seventh possible implementation of the sixth aspect, a type of a core network of the first network is the same as that of a core network of the second network, and a type of an access network of the first network is different from that of an access network of the second network; or a type of a core network of the first network is different from that of a core network of the second network, and a type of an access network of the first network is different from that of an access network of the second network.

With reference to any one of the sixth aspect or the foregoing possible implementations of the sixth aspect, in an eighth possible implementation of the sixth aspect, that a type of a core network of the first network is the same as that of a core network of the second network, and a type of an access network of the first network is different from that of an access network of the second network includes: the core network of the first network and the core network of the second network are 5G core networks, the access network of the first network is an NG RAN, and the access network of the second network is an E-UTRAN.

With reference to any one of the sixth aspect or the foregoing possible implementations of the sixth aspect, in a ninth possible implementation of the sixth aspect, that a type of a core network of the first network is different from that of a core network of the second network, and a type of an access network of the first network is different from that of an access network of the second network includes: the core network of the first network is a 5G core network, the core network of the second network is a 4G core network, the access network of the first network is an NG RAN, and the access network of the second network is an E-UTRAN.

With reference to any one of the sixth aspect or the foregoing possible implementations of the sixth aspect, in a tenth possible implementation of the sixth aspect, the receiving, by an access network device of a second network, first indication information and/or second indication information from an access network device of a first network or a core network device of the second network specifically includes: receiving a path setup response message from the mobility management network element or the access management network element of the second network, where the path setup response message carries the first indication information and/or the second indication information, the path setup response message is used to respond to a path setup request message, and the path setup request message is used to notify the mobility management network element or the access management network element of the second network that the terminal device has accessed the second network.

With reference to any one of the sixth aspect or the foregoing possible implementations of the sixth aspect, in an eleventh possible implementation of the sixth aspect, the receiving, by an access network device of a second network, first indication information and/or second indication information from an access network device of a first network or a core network device of the second network specifically includes: receiving a tunnel setup request from the mobility management network element or a session management network element of the second network, where the tunnel setup request carries the first indication information and/or the second indication information, and the tunnel setup request is used to request to set up a user plane tunnel of a voice service.

In a scenario in which the first network is a 5G network connected to an NG RAN, and the second network is a 4G network connected to an E-UTRAN, the access network device of the second network receives the tunnel setup request from the mobility management network element or the session management network element of the second network. In a scenario in which the first network is a 5G network connected to an NG RAN, and the second network is a 5G network connected to an E-UTRAN, the access network device of the second network receives a tunnel setup request from the mobility management network element or a session management network element of the first network.

According to a seventh aspect, an access network device is disclosed, and the access network device is an access network device of a second network and specifically includes: a receiving unit, configured to receive first indication information and/or second indication information from an access network device of a first network or a core network device of the second network, where the first indication information is used to indicate that a terminal device moves from the first network to the second network to set up a voice service, and the second indication information is used to indicate that the terminal device needs to return to the first network after the voice service ends; and a processing unit, configured to return the terminal device to the first network based on the first indication information and/or the second indication information after the voice service of the terminal device ends.

The access network device of the second network provided in this embodiment of this application may receive indication information (the first indication information and/or the second indication information) from the access network device of the first network (for example, an NG RAN), where the indication information is sent from the access network device of the first network to the access network device of the second network (for example, an E-UTRAN) when the access network device of the first network enables the terminal device to fall back to the second network to execute a voice service. Further, the access network device of the second network may return the terminal device to the first network based on the indication information. In this way, the terminal device can make full use of a wider variety of higher-rate services that are more stable and reliable and that are provided by an NG RAN network newly deployed by an operator, to obtain better service experience.

With reference to the seventh aspect, in a first possible implementation of the seventh aspect, the receiving unit is specifically configured to receive a handover request message from the access network device of the first network or a mobility management network element of the second network or an access management network element of the second network, where the handover request message carries the first indication information and/or the second indication information, and the handover request message is used to request to hand over the terminal device from the first network to the second network.

In other words, the access network device of the first network may directly send the first indication information and/or the second indication information to the access network device of the second network, or the access network device of the first network may first send the first indication information and/or the second indication information to a core network device of the first network, then the core network device of the first network forwards the first indication information and/or the second indication information to the core network device of the second network, and finally the core network device of the second network forwards the first indication information and/or the second indication information to the access network device of the second network. Regardless of which of the foregoing two manners is used to forward the first indication information and/or the second indication information, the access network device of the second network finally can receive the first indication information and/or the second indication information.

With reference to the seventh aspect or the first possible implementation of the seventh aspect, in a second possible implementation of the seventh aspect, that the handover request message carries the first indication information and/or the second indication information includes: a transparent container in the handover request message carries the first indication information and/or the second indication information, and the transparent container is sent from the access network device of the first network to the access network device of the second network.

In other words, the access network device of the first network directly sends the first indication information and/or the second indication information to the access network device of the second network by using the transparent container.

With reference to any one of the seventh aspect or the foregoing possible implementations of the seventh aspect, in a third possible implementation of the seventh aspect, the receiving unit is specifically configured to receive a tunnel release request from the mobility management network element or the access management network element of the second network, where the tunnel release request carries the first indication information and/or the second indication information, and the tunnel release request is used to request to release a user plane tunnel of a voice service.

In a scenario in which the first network is a 5G network connected to an NG RAN, and the second network is a 4G network connected to an E-UTRAN, the access network device of the second network receives the tunnel release request from the mobility management network element of the second network. In a scenario in which the first network is a 5G network connected to an NG RAN, and the second network is a 5G network connected to an E-UTRAN, the access network device of the second network receives a tunnel release request from a mobility management network element of the first network.

With reference to any one of the seventh aspect or the foregoing possible implementations of the seventh aspect, in a fourth possible implementation of the seventh aspect, the processing unit is specifically configured to: return, the terminal device to the first network based on the first indication information and/or the second indication information after the user plane tunnel of the voice service is released.

With reference to any one of the seventh aspect or the foregoing possible implementations of the seventh aspect, in a fifth possible implementation of the seventh aspect, the receiving unit is further configured to receive a network identifier of the first network from the access network device of the first network or the core network device of the second network; and the returning, by the access network device of the second network, the terminal device to the first network based on the first indication information and/or the second indication information after the voice service ends includes: returning, by the access network device of the second network, the terminal device to the first network based on the first indication information and/or the second indication information and the network identifier of the first network after the voice service ends.

With reference to any one of the seventh aspect or the foregoing possible implementations of the seventh aspect, in a sixth possible implementation of the seventh aspect, the access network device of the second network further includes a sending unit, and the processing unit is specifically configured to send a second handover request message to the core network device of the second network by using the sending unit, where the second handover request message is used to trigger the terminal device to be handed over to the first network; or send redirection information to the terminal device by using the sending unit, where the redirection information is used to trigger the terminal device to be redirected to the first network.

In specific implementation, the access network device of the second network may return the terminal device to the first network in either of the foregoing two manners.

With reference to any one of the seventh aspect or the foregoing possible implementations of the seventh aspect, in a seventh possible implementation of the seventh aspect, a type of a core network of the first network is the same as that of a core network of the second network, and a type of an access network of the first network is different from that of an access network of the second network; or a type of a core network of the first network is different from that of a core network of the second network, and a type of an access network of the first network is different from that of an access network of the second network.

With reference to any one of the seventh aspect or the foregoing possible implementations of the seventh aspect, in an eighth possible implementation of the seventh aspect, the core network of the first network and the core network of the second network are 5G core networks, the access network of the first network is an NG RAN, and the access network of the second network is an E-UTRAN.

With reference to any one of the seventh aspect or the foregoing possible implementations of the seventh aspect, in a ninth possible implementation of the seventh aspect, the core network of the first network is a 5G core network, the core network of the second network is a 4G core network, the access network of the first network is an NG RAN, and the access network of the second network is an E-UTRAN.

With reference to any one of the seventh aspect or the foregoing possible implementations of the seventh aspect, in a tenth possible implementation of the seventh aspect, the receiving unit is specifically configured to receive a path setup response message from the mobility management network element or the access management network element of the second network, where the path setup response message carries the first indication information and/or the second indication information, the path setup response message is used to respond to a path setup request message, and the path setup request message is used to notify the mobility management network element or the access management network element of the second network that the terminal device has accessed the second network.

With reference to any one of the seventh aspect or the foregoing possible implementations of the seventh aspect, in an eleventh possible implementation of the seventh aspect, the receiving unit is specifically configured to receive a tunnel setup request from the mobility management network element or a session management network element of the second network, where the tunnel setup request carries the first indication information and/or the second indication information, and the tunnel setup request is used to request to set up a user plane tunnel of a voice service.

In a scenario in which the first network is a 5G network connected to an NG RAN, and the second network is a 4G network connected to an E-UTRAN, the access network device of the second network receives the tunnel setup request from the mobility management network element or the session management network element of the second network. In a scenario in which the first network is a 5G network connected to an NG RAN, and the second network is a 5G network connected to an E-UTRAN, the access network device of the second network receives a tunnel setup request from the mobility management network element or a session management network element of the first network.

According to an eighth aspect, an access network device is disclosed, including a transceiver, a processor, and a memory, where the memory stores code, and the processor is configured to invoke the code in the memory to perform the network handover method in any one of the sixth aspect or the possible implementations of the sixth aspect.

According to a ninth aspect, a computer readable storage medium is disclosed. The computer readable storage medium stores an instruction, and when the computer readable storage medium runs on the access network device in any one of the seventh aspect or the possible implementations of the seventh aspect, the access network device is enabled to perform the network handover method in any one of the sixth aspect or the possible implementations of the sixth aspect.

According to a tenth aspect, a wireless communications apparatus is disclosed. The wireless communications apparatus stores an instruction, and when the wireless communications apparatus runs on the access network device in any one of the seventh aspect or the possible implementations of the seventh aspect, the access network device is enabled to perform the network handover method in any one of the sixth aspect or the possible implementations of the sixth aspect. The wireless communications apparatus may be a chip.

According to an eleventh aspect, a network handover method is disclosed, including: receiving, by a session management network element, first indication information and/or second indication information from an access management network element, where the first indication information is used to indicate that a terminal device moves from a first network to a second network to set up a voice service, and the second indication information is used to indicate that the terminal device needs to return to the first network after the voice service ends; and sending, by the session management network element, the first indication information and/or the second indication information to an access network device of the second network.

In the network handover method provided in this embodiment of this application, the session management network element may receive the first indication information and/or the second indication information from an access network device of the first network that are/is forwarded by the access management network element, and forward the received first indication information and/or the received second indication information to the access network device of the second network (for example, an E-UTRAN). The first indication information and/or the second indication information are/is sent from the access network device of the first network (for example, an NG RAN) when the access network device of the first network enables the terminal device to fall back to the second network to execute a voice service, so that the access network device of the second network can return the terminal device to the first network based on the indication information. In this way, the terminal device can make full use of a wider variety of higher-rate services that are more stable and reliable and that are provided by an NG RAN network newly deployed by an operator, to obtain better service experience.

With reference to the eleventh aspect, in a first possible implementation of the eleventh aspect, the receiving, by a session management network element, first indication information and/or second indication information from an access management network element includes: receiving, by the session management network element, a first message or a first service request from the access management network element, where the first message or the first service request includes first session management information from the access network device of the first network, the first session management information is used to indicate, to the session management network element, whether setup of a user plane tunnel of the voice service is completed, and the first session management information includes the first indication information and/or the second indication information.

With reference to the eleventh aspect, in a second possible implementation of the eleventh aspect, the receiving, by a session management network element, first indication information and/or second indication information from an access management network element includes: receiving, by the session management network element, a second message or a second service request from the access management network element, where the second message or the second service request is used to request a session management context of the terminal device from the session management network element, and the second message or the second service request includes the first indication information and/or the second indication information from the access network device of the first network.

With reference to the eleventh aspect, in a third possible implementation of the eleventh aspect, the receiving, by a session management network element, first indication information and/or second indication information from an access management network element includes: receiving, by the session management network element, a third message or a third service request from the access management network element, where the third message or the third service request is used to request the session management network element to hand over a session of the terminal device, and the third message or the third service request includes the first indication information and/or the second indication information from the access network device of the first network.

With reference to any one of the eleventh aspect or the foregoing possible implementations of the eleventh aspect, in a fourth possible implementation of the eleventh aspect, the sending, by the session management network element, the first indication information and/or the second indication information to an access network device of the second network includes: sending, by the session management network element, a tunnel release request to a serving gateway, where the tunnel release request is used to release a user plane tunnel of a voice service, and the tunnel release request includes the first indication information and/or the second indication information, so that the serving gateway forwards the first indication information and/or the second indication information to the access network device of the second network by using a mobility management network element.

With reference to any one of the eleventh aspect or the foregoing possible implementations of the eleventh aspect, in a fifth possible implementation of the eleventh aspect, the user plane tunnel of the voice service includes a user plane bearer of the voice service.

With reference to any one of the eleventh aspect or the foregoing possible implementations of the eleventh aspect, in a sixth possible implementation of the eleventh aspect, the sending, by the session management network element, the first indication information and/or the second indication information to an access network device of the second network includes: sending, by the session management network element, second session management information to the access network device of the second network, where the second session management information is used to release a user plane tunnel of a voice service, and the second session management information includes the first indication information and/or the second indication information.

With reference to any one of the eleventh aspect or the foregoing possible implementations of the eleventh aspect, in a seventh possible implementation of the eleventh aspect, the user plane tunnel of the voice service includes a user plane quality of service flow of the voice service.

With reference to any one of the eleventh aspect or the foregoing possible implementations of the eleventh aspect, in an eighth possible implementation of the eleventh aspect, before the sending, by the session management network element, the first indication information and/or the second indication information to an access network device of the second network, the method further includes: determining, by the session management network element, that the voice service ends.

With reference to any one of the eleventh aspect or the foregoing possible implementations of the eleventh aspect, in a ninth possible implementation of the eleventh aspect, the method further includes: when sending the first indication information and/or the second indication information to the access network device of the second network, sending, by the session management network element, network identifier information of the first network to the access network device of the second network.

With reference to any one of the eleventh aspect or the foregoing possible implementations of the eleventh aspect, in a tenth possible implementation of the eleventh aspect, a type of a core network of the first network is the same as that of a core network of the second network, and a type of an access network of the first network is different from that of an access network of the second network; or a type of a core network of the first network is different from that of a core network of the second network, and a type of an access network of the first network is different from that of an access network of the second network.

With reference to any one of the eleventh aspect or the foregoing possible implementations of the eleventh aspect, in an eleventh possible implementation of the eleventh aspect, the core network of the first network and the core network of the second network are 5G core networks, the access network of the first network is an NG RAN, and the access network of the second network is an E-UTRAN.

With reference to any one of the eleventh aspect or the foregoing possible implementations of the eleventh aspect, in a twelfth possible implementation of the eleventh aspect, the core network of the first network is a 5G core network, the core network of the second network is a 4G core network, the access network of the first network is an NG RAN, and the access network of the second network is an E-UTRAN.

With reference to any one of the eleventh aspect or the foregoing possible implementations of the eleventh aspect, in a thirteenth possible implementation of the eleventh aspect, the sending, by the session management network element, the first indication information and/or the second indication information to an access network device of the second network includes: sending, by the session management network element, a tunnel setup request to the serving gateway, where the tunnel setup request is used to request to set up a user plane tunnel of a voice service, and the tunnel setup request includes the first indication information and/or the second indication information, so that the serving gateway forwards the first indication information and/or the second indication information to the access network device of the second network by using the mobility management network element.

With reference to any one of the eleventh aspect or the foregoing possible implementations of the eleventh aspect, in a fourteenth possible implementation of the eleventh aspect, the sending, by the session management network element, the first indication information and/or the second indication information to an access network device of the second network includes: sending, by the session management network element, third session management information to the access network device of the second network, where the third session management information is used to set up a user plane tunnel of a voice service, and the third session management information includes the first indication information and/or the second indication information.

According to a twelfth aspect, a session management network element is disclosed, including: a receiving unit, configured to receive first indication information and/or second indication information from an access management network element, where the first indication information is used to indicate that a terminal device moves from a first network to a second network to set up a voice service, and the second indication information is used to indicate that the terminal device needs to return to the first network after the voice service ends; and sending, by the session management network element, the first indication information and/or the second indication information to an access network device of the second network.

In the network handover method provided in this embodiment of this application, the session management network element may receive the first indication information and/or the second indication information from an access network device of the first network that are/is forwarded by the access management network element, and forward the received first indication information and/or the received second indication information to the access network device of the second network (for example, an E-UTRAN). The first indication information and/or the second indication information are/is sent from the access network device of the first network (for example, an NG RAN) when the access network device of the first network enables the terminal device to fall back to the second network to execute a voice service, so that the access network device of the second network can return the terminal device to the first network based on the indication information. In this way, the terminal device can make full use of a wider variety of higher-rate services that are more stable and reliable and that are provided by an NG RAN network newly deployed by an operator, to obtain better service experience.

With reference to the twelfth aspect, in a first possible implementation of the twelfth aspect, the receiving unit is specifically configured to receive a first message or a first service request from the access management network element, where the first message or the first service request includes first session management information from the access network device of the first network, the first session management information is used to indicate, to the session management network element, whether setup of a user plane tunnel of the voice service is completed, and the first session management information includes the first indication information and/or the second indication information.

With reference to the twelfth aspect, in a second possible implementation of the twelfth aspect, the receiving unit is specifically configured to receive a second message or a second service request from the access management network element, where the second message or the second service request is used to request a session management context of the terminal device from the session management network element, and the second message or the second service request includes the first indication information and/or the second indication information from the access network device of the first network.

With reference to the twelfth aspect, in a third possible implementation of the twelfth aspect, the receiving unit is specifically configured to receive a third message or a third service request from the access management network element, where the third message or the third service request is used to request the session management network element to hand over a session of the terminal device, and the third message or the third service request includes the first indication information and/or the second indication information from the access network device of the first network.

With reference to any one of the twelfth aspect or the foregoing possible implementations of the twelfth aspect, in a fourth possible implementation of the twelfth aspect, the sending unit is specifically configured to send a tunnel release request to a serving gateway, where the tunnel release request is used to release a user plane tunnel of a voice service, and the tunnel release request includes the first indication information and/or the second indication information, so that the serving gateway forwards the first indication information and/or the second indication information to the access network device of the second network by using a mobility management network element.

With reference to any one of the twelfth aspect or the foregoing possible implementations of the twelfth aspect, in a fifth possible implementation of the twelfth aspect, the user plane tunnel of the voice service includes a user plane bearer of the voice service.

With reference to any one of the twelfth aspect or the foregoing possible implementations of the twelfth aspect, in a sixth possible implementation of the twelfth aspect, the sending unit is specifically configured to send second session management information to the access network device of the second network, where the second session management information is used to release a user plane tunnel of a voice service, and the second session management information includes the first indication information and/or the second indication information.

With reference to any one of the twelfth aspect or the foregoing possible implementations of the twelfth aspect, in a seventh possible implementation of the twelfth aspect, the user plane tunnel of the voice service includes a user plane quality of service flow of the voice service.

With reference to any one of the twelfth aspect or the foregoing possible implementations of the twelfth aspect, in an eighth possible implementation of the twelfth aspect, the session management network element further includes a processing unit, and the processing unit is configured to: before the sending unit sends the first indication information and/or the second indication information to the access network device of the second network, determine that the voice service ends.

With reference to any one of the twelfth aspect or the foregoing possible implementations of the twelfth aspect, in a ninth possible implementation of the twelfth aspect, the sending unit is further configured to: when sending the first indication information and/or the second indication information to the access network device of the second network, send a network identifier of the first network to the access network device of the second network.

With reference to any one of the twelfth aspect or the foregoing possible implementations of the twelfth aspect, in a tenth possible implementation of the twelfth aspect, a type of a core network of the first network is the same as that of a core network of the second network, and a type of an access network of the first network is different from that of an access network of the second network; or a type of a core network of the first network is different from that of a core network of the second network, and a type of an access network of the first network is different from that of an access network of the second network.

With reference to any one of the twelfth aspect or the foregoing possible implementations of the twelfth aspect, in an eleventh possible implementation of the twelfth aspect, the core network of the first network and the core network of the second network are 5G core networks, the access network of the first network is an NG RAN, and the access network of the second network is an E-UTRAN.

With reference to any one of the twelfth aspect or the foregoing possible implementations of the twelfth aspect, in a twelfth possible implementation of the twelfth aspect, the core network of the first network is a 5G core network, the core network of the second network is a 4G core network, the access network of the first network is an NG RAN, and the access network of the second network is an E-UTRAN.

With reference to any one of the twelfth aspect or the foregoing possible implementations of the twelfth aspect, in a thirteenth possible implementation of the twelfth aspect, the sending unit is specifically configured to send a tunnel setup request to the serving gateway, where the tunnel setup request is used to set up a user plane tunnel of a voice service, and the tunnel setup request includes the first indication information and/or the second indication information, so that the serving gateway forwards the first indication information and/or the second indication information to the access network device of the second network by using the mobility management network element.

With reference to any one of the twelfth aspect or the foregoing possible implementations of the twelfth aspect, in a fourteenth possible implementation of the twelfth aspect, the sending unit is specifically configured to send third session management information to the access network device of the second network, where the third session management information is used to set up a user plane tunnel of a voice service, and the third session management information includes the first indication information and/or the second indication information.

According to a thirteenth aspect, a session management network element is disclosed, including a transceiver, a processor, and a memory, where the memory stores code, and the processor is configured to invoke the code in the memory to perform the network handover method in any one of the eleventh aspect or the possible implementations of the eleventh aspect.

According to a fourteenth aspect, a computer readable storage medium is disclosed. The computer readable storage medium stores an instruction, and when the computer readable storage medium runs on the session management network element in any one of the twelfth aspect or the possible implementations of the twelfth aspect, the session management network element is enabled to perform the network handover method in any one of the eleventh aspect or the possible implementations of the eleventh aspect.

According to a fifteenth aspect, a wireless communications apparatus is disclosed. The wireless communications apparatus stores an instruction, and when the wireless communications apparatus runs on the session management network element in any one of the twelfth aspect or the possible implementations of the twelfth aspect, the session management network element is enabled to perform the network handover method in any one of the eleventh aspect or the possible implementations of the eleventh aspect. The wireless communications apparatus may be a chip.

According to a sixteenth aspect, a network handover method is disclosed, including:

receiving, by an access management network element of a first network, first indication information and/or second indication information from an access network device of the first network, where the first indication information is used to indicate that a terminal device is handed over from the first network to a second network to set up a voice service, and the second indication information is used to indicate that the terminal device needs to return to the first network after the voice service ends; and sending, by the access management network element of the first network, the first indication information and/or the second indication information to an access network device of the second network.

With reference to the sixteenth aspect, in a first possible implementation of the sixteenth aspect, the receiving, by an access management network element of a first network, first indication information and/or second indication information from an access network device of the first network includes: receiving, by the access management network element of the first network, first session management information from the access network device of the first network, where the first session management information is used to indicate, to a session management network element of the first network, whether setup of a user plane tunnel of the voice service is completed, and the first session management information includes the first indication information and/or the second indication information.

With reference to the sixteenth aspect or the first possible implementation of the sixteenth aspect, in a first possible implementation of the sixteenth aspect, the sending, by the access management network element of the first network, the first indication information and/or the second indication information to an access network device of the second network specifically includes:

sending, by the access management network element of the first network, a first message or a first service request to the session management network element of the first network, where the first message or the first service request includes the first session management information, so that the session management network element of the first network sends the first indication information and/or the second indication information to the access network device of the second network.

With reference to the sixteenth aspect or the first possible implementation of the sixteenth aspect, in a second possible implementation of the sixteenth aspect, the receiving, by an access management network element of a first network, first indication information and/or second indication information from an access network device of the first network includes: receiving, by the access management network element of the first network, a handover request message from the access network device of the first network, where the handover request message carries the first indication information and/or the second indication information.

With reference to the sixteenth aspect or the first possible implementation of the sixteenth aspect, in a third possible implementation of the sixteenth aspect, the sending, by the access management network element of the first network, the first indication information and/or the second indication information to an access network device of the second network includes: sending, by the access management network element of the first network, a relocation request message to a mobility management network element or an access management network element of the second network, where the relocation request message carries the first indication information and/or the second indication information, so that the mobility management network element or the access management network element of the second network sends the first indication information and/or the second indication information to the access network device of the second network.

With reference to the sixteenth aspect or the first possible implementation of the sixteenth aspect, in a fourth possible implementation of the sixteenth aspect, a type of a core network of the first network is the same as that of a core network of the second network, and a type of an access network of the first network is different from that of an access network of the second network; or a type of a core network of the first network is different from that of a core network of the second network, and a type of an access network of the first network is different from that of an access network of the second network.

With reference to the sixteenth aspect or the first possible implementation of the sixteenth aspect, in a fifth possible implementation of the sixteenth aspect, the core network of the first network and the core network of the second network are 5G core networks, the access network of the first network is an NG RAN, and the access network of the second network is an E-UTRAN.

With reference to the sixteenth aspect or the first possible implementation of the sixteenth aspect, in a sixth possible implementation of the sixteenth aspect, the core network of the first network is a 5G core network, the core network of the second network is a 4G core network, the access network of the first network is an NG RAN, and the access network of the second network is an E-UTRAN.

With reference to any one of the sixteenth aspect or the foregoing possible implementations of the sixteenth aspect, in a seventh possible implementation of the sixteenth aspect, the method further includes: receiving, by the access management network element of the first network, identifier information of the first network from the access network device of the first network.

According to a seventeenth aspect, an access management network element is disclosed, including: a receiving unit, configured to receive first indication information and/or second indication information from an access network device of a first network, where the first indication information is used to indicate that a terminal device is handed over from the first network to a second network to set up a voice service, and the second indication information is used to indicate that the terminal device needs to return to the first network after the voice service ends; and a sending unit, configured to send the first indication information and/or the second indication information to an access network device of the second network.

With reference to the seventeenth aspect, in a first possible implementation of the seventeenth aspect, the receiving unit is specifically configured to receive first session management information from the access network device of the first network, where the first session management information is used to indicate, to a session management network element of the first network, whether setup of a user plane tunnel of the voice service is completed, and the first session management information includes the first indication information and/or the second indication information.

With reference to the seventeenth aspect or the first possible implementation of the seventeenth aspect, in a first possible implementation of the seventeenth aspect, the sending unit is specifically configured to send a first message or a first service request to the session management network element of the first network, where the first message or the first service request includes the first session management information, so that the session management network element of the first network sends the first indication information and/or the second indication information to the access network device of the second network.

With reference to the seventeenth aspect or the first possible implementation of the seventeenth aspect, in a second possible implementation of the seventeenth aspect, the receiving unit is specifically configured to receive a handover request message from the access network device of the first network, where the handover request message carries the first indication information and/or the second indication information.

With reference to the seventeenth aspect or the first possible implementation of the seventeenth aspect, in a third possible implementation of the seventeenth aspect, the sending unit is specifically configured to send a relocation request message to a mobility management network element or an access management network element of the second network, where the relocation request message carries the first indication information and/or the second indication information, so that the mobility management network element or the access management network element of the second network sends the first indication information and/or the second indication information to the access network device of the second network.

With reference to the seventeenth aspect or the first possible implementation of the seventeenth aspect, in a fourth possible implementation of the seventeenth aspect, a type of a core network of the first network is the same as that of a core network of the second network, and a type of an access network of the first network is different from that of an access network of the second network; or a type of a core network of the first network is different from that of a core network of the second network, and a type of an access network of the first network is different from that of an access network of the second network.

With reference to the seventeenth aspect or the first possible implementation of the seventeenth aspect, in a fifth possible implementation of the seventeenth aspect, the core network of the first network and the core network of the second network are 5G core networks, the access network of the first network is an NG RAN, and the access network of the second network is an E-UTRAN.

With reference to the seventeenth aspect or the first possible implementation of the seventeenth aspect, in a sixth possible implementation of the seventeenth aspect, the core network of the first network is a 5G core network, the core network of the second network is a 4G core network, the access network of the first network is an NG RAN, and the access network of the second network is an E-UTRAN.

With reference to any one of the seventeenth aspect or the foregoing possible implementations of the seventeenth aspect, in a seventh possible implementation of the seventeenth aspect, the receiving unit is further configured to receive identifier information of the first network from the access network device of the first network.

According to an eighteenth aspect, an access management network element is disclosed, including a transceiver, a processor, and a memory, where the memory stores code, and the processor is configured to invoke the code in the memory to perform the network handover method in any one of the sixteenth aspect or the possible implementations of the sixteenth aspect.

According to a nineteenth aspect, a computer readable storage medium is disclosed. The computer readable storage medium stores an instruction, and when the computer readable storage medium runs on the access management network element in any one of the seventeenth aspect or the possible implementations of the seventeenth aspect, the access management network element is enabled to perform the network handover method in any one of the sixteenth aspect or the possible implementations of the sixteenth aspect.

According to a twentieth aspect, a wireless communications apparatus is disclosed. The wireless communications apparatus stores an instruction, and when the wireless communications apparatus runs on the access management network element in any one of the seventeenth aspect or the possible implementations of the seventeenth aspect, the access management network element is enabled to perform the network handover method in any one of the sixteenth aspect or the possible implementations of the sixteenth aspect. The wireless communications apparatus may be a chip.

According to a twenty-first aspect, a network handover method is disclosed, including: receiving, by a mobility management network element of a second network, first indication information and/or second indication information from an access network device of a first network, where the first indication information is used to indicate that a terminal device is handed over from the first network to the second network to set up a voice service, and the second indication information is used to indicate that the terminal device needs to return to the first network after the voice service ends; and sending, by the mobility management network element of the second network, the first indication information and/or the second indication information to an access network device of the second network.

With reference to the twenty-first aspect, in a first possible implementation of the twenty-first aspect, the receiving, by a mobility management network element of a second network, first indication information and/or second indication information from an access network device of a first network includes: receiving, by the mobility management network element of the second network, a tunnel release request from a serving gateway, where the tunnel release request is used to release a user plane tunnel of a voice service, and the tunnel release request includes the first indication information and/or the second indication information.

With reference to the twenty-first aspect or the first possible implementation of the twenty-first aspect, in a second possible implementation of the twenty-first aspect, the sending, by the mobility management network element of the second network, the first indication information and/or the second indication information to an access network device of the second network includes: sending, by the mobility management network element of the second network, the tunnel release request to the access network device of the second network, where the tunnel release request includes the first indication information and/or the second indication information.

With reference to any one of the twenty-first aspect or the foregoing possible implementations of the twenty-first aspect, in a third possible implementation of the twenty-first aspect, the receiving, by a mobility management network element of a second network, first indication information and/or second indication information from an access network device of a first network includes: receiving a relocation request message or a relocation service request from an access management network element of the first network, where the relocation request message or the relocation service request includes the first indication information and/or the second indication information.

With reference to any one of the twenty-first aspect or the foregoing possible implementations of the twenty-first aspect, in a fourth possible implementation of the twenty-first aspect, the sending, by the mobility management network element of the second network, the first indication information and/or the second indication information to an access network device of the second network includes: sending a third message or a third service request to a session management network element, where the third message or the third service request is used to request the session management network element to hand over a session of the terminal device, and the third message or the third service request includes the first indication information and/or second indication information, so that the session management network element sends the first indication information and/or the second indication information to the access network device of the second network.

With reference to any one of the twenty-first aspect or the foregoing possible implementations of the twenty-first aspect, in a fifth possible implementation of the twenty-first aspect, the sending, by the mobility management network element of the second network, the first indication information and/or the second indication information to an access network device of the second network includes: sending the tunnel release request or a handover request to the access network device of the second network, where the tunnel release request includes the first indication information and/or the second indication information, and the handover request includes the first indication information and/or the second indication information.

With reference to any one of the twenty-first aspect or the foregoing possible implementations of the twenty-first aspect, in a sixth possible implementation of the twenty-first aspect, a type of a core network of the first network is the same as that of a core network of the second network, and a type of an access network of the first network is different from that of an access network of the second network; or a type of a core network of the first network is different from that of a core network of the second network, and a type of an access network of the first network is different from that of an access network of the second network.

With reference to any one of the twenty-first aspect or the foregoing possible implementations of the twenty-first aspect, in a seventh possible implementation of the twenty-first aspect, the core network of the first network and the core network of the second network are 5G core networks, the access network of the first network is an NG RAN, and the access network of the second network is an E-UTRAN.

With reference to any one of the twenty-first aspect or the foregoing possible implementations of the twenty-first aspect, in an eighth possible implementation of the twenty-first aspect, the core network of the first network is a 5G core network, the core network of the second network is a 4G core network, the access network of the first network is an NG RAN, and the access network of the second network is an E-UTRAN.

With reference to the twenty-first aspect, in a ninth possible implementation of the twenty-first aspect, the receiving, by a mobility management network element of a second network, first indication information and/or second indication information from an access network device of a first network includes: receiving, by the mobility management network element of the second network, a tunnel setup request from a serving gateway, where the tunnel setup request is used to set up a user plane tunnel of a voice service, and the tunnel setup request includes the first indication information and/or the second indication information.

With reference to the twenty-first aspect or the first possible implementation of the twenty-first aspect, in a tenth possible implementation of the twenty-first aspect, the sending, by the mobility management network element of the second network, the first indication information and/or the second indication information to an access network device of the second network includes: sending, by the mobility management network element of the second network, a tunnel setup request to the access network device of the second network, where the tunnel setup request includes the first indication information and/or the second indication information.

With reference to any one of the twenty-first aspect or the foregoing possible implementations of the twenty-first aspect, in an eleventh possible implementation of the twenty-first aspect, the sending, by the mobility management network element of the second network, the first indication information and/or the second indication information to an access network device of the second network includes: receiving, by the mobility management network element of the second network, a path setup request from the access network device of the second network, where the path setup request is used to notify the mobility management network element of the second network that the terminal device has accessed the second network; and sending, by the mobility management network element of the second network, a path setup response to the access network device of the second network, where the path setup response includes the first indication information and/or the second indication information.

With reference to any one of the twenty-first aspect or the foregoing possible implementations of the twenty-first aspect, in a twelfth possible implementation of the twenty-first aspect, the mobility management network element of the second network further sends network identifier information of the first network to the access network device of the second network.

With reference to any one of the twenty-first aspect or the foregoing possible implementations of the twenty-first aspect, in a thirteenth possible implementation of the twenty-first aspect, the mobility management network element of the second network receives the network identifier information of the first network from the access network device of the first network or the access management network element of the first network.

According to a twenty-second aspect, a mobility management network element is disclosed, and the mobility management network element is a mobility management network element of a second network and includes: a receiving unit, configured to receive first indication information and/or second indication information from an access network device of a first network, where the first indication information is used to indicate that a terminal device is handed over from the first network to the second network to set up a voice service, and the second indication information is used to indicate that the terminal device needs to return to the first network after the voice service ends; and a sending unit, configured to send the first indication information and/or the second indication information to an access network device of the second network.

With reference to the twenty-second aspect, in a first possible implementation of the twenty-second aspect, the receiving unit is configured to receive a tunnel release request from a serving gateway, where the tunnel release request is used to release a user plane tunnel of a voice service, and the tunnel release request includes the first indication information and/or the second indication information.

With reference to the twenty-second aspect or the first possible implementation of the twenty-second aspect, in a second possible implementation of the twenty-second aspect, the sending unit is configured to send the tunnel release request to the access network device of the second network, where the tunnel release request includes the first indication information and/or the second indication information.

With reference to any one of the twenty-second aspect or the foregoing possible implementations of the twenty-second aspect, in a third possible implementation of the twenty-second aspect, the receiving unit is configured to receive a relocation request message or a relocation service request from an access management network element of the first network, where the relocation request message or the relocation service request includes the first indication information and/or the second indication information.

With reference to any one of the twenty-second aspect or the foregoing possible implementations of the twenty-second aspect, in a fourth possible implementation of the twenty-second aspect, the sending unit is configured to send a third message or a third service request to a session management network element, where the third message or the third service request is used to request the session management network element to hand over a session of the terminal device, and the third message or the third service request includes the first indication information and/or second indication information, so that the session management network element sends the first indication information and/or the second indication information to the access network device of the second network.

With reference to any one of the twenty-second aspect or the foregoing possible implementations of the twenty-second aspect, in a fifth possible implementation of the twenty-second aspect, the sending unit is configured to send the tunnel release request or a handover request to the access network device of the second network, where the tunnel release request includes the first indication information and/or the second indication information, and the handover request includes the first indication information and/or the second indication information.

With reference to any one of the twenty-second aspect or the foregoing possible implementations of the twenty-second aspect, in a sixth possible implementation of the twenty-second aspect, a type of a core network of the first network is the same as that of a core network of the second network, and a type of an access network of the first network is different from that of an access network of the second network; or a type of a core network of the first network is different from that of a core network of the second network, and a type of an access network of the first network is different from that of an access network of the second network.

With reference to any one of the twenty-second aspect or the foregoing possible implementations of the twenty-second aspect, in a seventh possible implementation of the twenty-second aspect, the core network of the first network and the core network of the second network are 5G core networks, the access network of the first network is an NG RAN, and the access network of the second network is an E-UTRAN.

With reference to any one of the twenty-second aspect or the foregoing possible implementations of the twenty-second aspect, in an eighth possible implementation of the twenty-second aspect, the core network of the first network is a 5G core network, the core network of the second network is a 4G core network, the access network of the first network is an NG RAN, and the access network of the second network is an E-UTRAN.

With reference to the twenty-second aspect, in a ninth possible implementation of the twenty-second aspect, the receiving unit is configured to receive a tunnel setup request from a serving gateway, where the tunnel setup request is used to set up a user plane tunnel of a voice service, and the tunnel setup request includes the first indication information and/or the second indication information.

With reference to the twenty-second aspect or the ninth possible implementation of the twenty-second aspect, in a tenth possible implementation of the twenty-second aspect, the sending unit is configured to send a tunnel setup request to the access network device of the second network, where the tunnel setup request includes the first indication information and/or the second indication information.

With reference to any one of the twenty-second aspect or the foregoing possible implementations of the twenty-second aspect, in an eleventh possible implementation of the twenty-second aspect, the receiving unit is configured to receive a path setup request from the access network device of the second network, where the path setup request is used to notify the mobility management network element of the second network that the terminal device has accessed the second network; and the sending unit is configured to send a path setup response to the access network device of the second network, where the path setup response includes the first indication information and/or the second indication information.

With reference to any one of the twenty-second aspect or the foregoing possible implementations of the twenty-second aspect, in a twelfth possible implementation of the twenty-second aspect, the sending unit is configured to send network identifier information of the first network to the access network device of the second network.

With reference to any one of the twenty-first aspect or the foregoing possible implementations of the twenty-first aspect, in a thirteenth possible implementation of the twenty-first aspect, the receiving unit is configured to receive the network identifier information of the first network from the access network device of the first network or the access management network element of the first network.

According to a twenty-third aspect, a mobility management network element is disclosed, including a transceiver, a processor, and a memory, where the memory stores code, and the processor is configured to invoke the code in the memory to perform the network handover method in any one of the twenty-first aspect or the possible implementations of the twenty-first aspect.

According to a twenty-fourth aspect, a computer readable storage medium is disclosed. The computer readable storage medium stores an instruction, and when the computer readable storage medium runs on the mobility management network element in any one of the twenty-second aspect or the possible implementations of the twenty-second aspect, the mobility management network element is enabled to perform the network handover method in any one of the twenty-first aspect or the possible implementations of the twenty-first aspect.

According to a twenty-fifth aspect, a wireless communications apparatus is disclosed. The wireless communications apparatus stores an instruction, and when the wireless communications apparatus runs on the mobility management network element in any one of the twenty-second aspect or the possible implementations of the twenty-second aspect, the mobility management network element is enabled to perform the network handover method in any one of the twenty-first aspect or the possible implementations of the twenty-first aspect. The wireless communications apparatus may be a chip.

According to a twenty-sixth aspect, a network handover method is disclosed, including: determining, by a terminal, that a voice service is executed after the terminal falls back from a first network to a second network; and returning, by the terminal, from the second network to the first network after the voice service ends.

In the network handover method provided in this embodiment of this application, the terminal device may proactively trigger a handover to the first network after the terminal device falls back from the first network (for example, an NG RAN) to the second network (for example, an E-UTRAN) to execute the voice service. In this way, the terminal device can make full use of a wider variety of higher-rate services that are more stable and reliable and that are provided by an NG RAN network newly deployed by an operator, to obtain better service experience.

With reference to the twenty-sixth aspect, in a first possible implementation of the twenty-sixth aspect, the determining, by a terminal, that a voice service is executed after the terminal falls back from a first network to a second network specifically includes: camping, by the terminal, on the first network, and initiating an IMS voice call setup request or receiving an IMS voice call setup request by using the first network; and handing over, by the terminal UE, from the first network to the second network before setup of an IMS voice call is completed.

With reference to the twenty-sixth aspect or the first possible implementation of the twenty-sixth aspect, in a second possible implementation of the twenty-sixth aspect, the method further includes: after handing over to the second network, determining, by the terminal, that the IMS voice call is set up by using the second network.

With reference to any one of the twenty-sixth aspect or the foregoing possible implementations of the twenty-sixth aspect, in a third possible implementation of the twenty-sixth aspect, before the returning from the second network to the first network, the method further includes: storing, by the terminal, a network identifier of the first network.

With reference to any one of the twenty-sixth aspect or the foregoing possible implementations of the twenty-sixth aspect, in a fourth possible implementation of the twenty-sixth aspect, the returning, by the terminal, from the second network to the first network after the voice service ends specifically includes: returning, by the terminal, to the first network based on the network identifier of the first network.

With reference to any one of the twenty-sixth aspect or the foregoing possible implementations of the twenty-sixth aspect, in a fifth possible implementation of the twenty-sixth aspect, the returning, by the terminal, from the second network to the first network after the voice service ends includes: returning, by the terminal, from the second network to the first network through cell reselection or network reselection after the voice service ends.

According to a twenty-seventh aspect, a terminal device is disclosed, including: a determining unit, configured to determine that a voice service executed by the terminal device is executed after the terminal device falls back from a first network to a second network; and a processing unit, configured to return the terminal device from the second network to the first network after the voice service ends.

The terminal device provided in this embodiment of this application may proactively trigger a handover to the first network after the terminal device falls back from the first network (for example, an NG RAN) to the second network (for example, an E-UTRAN) to execute the voice service. In this way, the terminal device can make full use of a wider variety of higher-rate services that are more stable and reliable and that are provided by an NG RAN network newly deployed by an operator, to obtain better service experience.

With reference to the twenty-seventh aspect, in a first possible implementation of the twenty-seventh aspect, the determining unit is specifically configured to: determine that the terminal camps on the first network and that the terminal initiates an IMS voice call setup request or receives an IMS voice call setup request by using the first network; and when the terminal UE is handed over from the first network to the second network before setup of an IMS voice call is completed, determine that the voice service executed by the terminal device is executed after the terminal device falls back from the first network to the second network.

With reference to the twenty-seventh aspect or the first possible implementation of the twenty-seventh aspect, in a second possible implementation of the twenty-seventh aspect, the determining unit is further configured to: when determining that the IMS voice call is set up by using the second network after the terminal is handed over to the second network, determine that the voice service executed by the terminal device is executed after the terminal device falls back from the first network to the second network.

With reference to any one of the twenty-seventh aspect or the foregoing possible implementations of the twenty-seventh aspect, in a third possible implementation of the twenty-seventh aspect, the processing unit is further configured to store a network identifier of the first network before the terminal device returns from the second network to the first network.

With reference to any one of the twenty-seventh aspect or the foregoing possible implementations of the twenty-seventh aspect, in a fourth possible implementation of the twenty-seventh aspect, the processing unit is configured to return the terminal device to the first network based on the network identifier of the first network.

With reference to any one of the twenty-seventh aspect or the foregoing possible implementations of the twenty-seventh aspect, in a fifth possible implementation of the twenty-seventh aspect, the processing unit is configured to return the terminal from the second network to the first network through cell reselection or network reselection after the voice service ends.

According to a twenty-eighth aspect, a terminal device is disclosed, including a transceiver, a processor, and a memory, where the memory stores code, and the processor is configured to invoke the code in the memory to perform the network handover method in any one of the twenty-sixth aspect or the possible implementations of the twenty-sixth aspect.

According to a twenty-ninth aspect, a computer readable storage medium is disclosed. The computer readable storage medium stores an instruction, and when the computer readable storage medium runs on the terminal device in any one of the twenty-seventh aspect or the possible implementations of the twenty-seventh aspect, the terminal device is enabled to perform the network handover method in any one of the twenty-sixth aspect or the possible implementations of the twenty-sixth aspect.

According to a thirtieth aspect, a wireless communications apparatus is disclosed. The wireless communications apparatus stores an instruction, and when the wireless communications apparatus runs on the terminal device in any one of the twenty-seventh aspect or the possible implementations of the twenty-seventh aspect, the terminal device is enabled to perform the network handover method in any one of the twenty-sixth aspect or the possible implementations of the twenty-sixth aspect. The wireless communications apparatus may be a chip.

According to a thirty-first aspect, a network handover method is disclosed, including: receiving, by an access network device of a first network, a first message from a core network device of the first network, where the first message is used to request to set up a user plane tunnel of a voice service for a terminal device; sending, by the access network device of the first network, a second message to the core network device of the first network, where the second message is used to respond to the first message; and sending, by the access network device of the first network, a fourth message to the terminal device, where the fourth message is used to instruct the terminal device to be redirected from the first network to a second network. At least one of the second message or the fourth message carries first indication information and/or second indication information, the first indication information is used to indicate that the terminal device moves from the first network to the second network to set up a voice service, and the second indication information is used to indicate that the terminal device needs to return to the first network after the voice service ends.

In this embodiment of the present invention, the terminal device may be redirected, based on the fourth message from the access network device of the first network, to the second network to execute a voice service. In addition, it may be further determined, based on the first indication information or the second indication information, that the terminal device moves to the first network after the voice service in the second network ends, so that the terminal device is prevented from camping on the second network for an excessively long time.

With reference to the thirty-first aspect, in a first possible implementation of the thirty-first aspect, at least one of the second message and the fourth message carries network identifier information of the first network.

With reference to the thirty-first aspect or the first possible implementation of the thirty-first aspect, in a second possible implementation of the thirty-first aspect, a type of a core network of the first network is the same as that of a core network of the second network, and a type of an access network of the first network is different from that of an access network of the second network; or a type of a core network of the first network is different from that of a core network of the second network, and a type of an access network of the first network is different from that of an access network of the second network.

With reference to the second possible implementation of the thirty-first aspect, in a third possible implementation of the thirty-first aspect, that a type of a core network of the first network is the same as that of a core network of the second network, and a type of an access network of the first network is different from that of an access network of the second network includes: the core network of the first network and the core network of the second network are 5G core networks, the access network of the first network is an NG RAN, and the access network of the second network is an evolved universal terrestrial radio access network E-UTRAN.

With reference to the second possible implementation of the thirty-first aspect, in a fourth possible implementation of the thirty-first aspect, that a type of a core network of the first network is different from that of a core network of the second network, and a type of an access network of the first network is different from that of an access network of the second network includes: the core network of the first network is a 5G core network, the core network of the second network is a 4G core network, the access network of the first network is an NG RAN, and the access network of the second network is an E-UTRAN.

According to a thirty-second aspect, a network handover method is disclosed, including:

initiating, by a terminal device, a first voice call setup request in a first network or receiving a second voice call setup request in a first network; receiving, by the terminal device, a fourth message from an access network device of the first network, where the fourth message is used to instruct the terminal device to be redirected from the first network to a second network; accessing, by the terminal device, the second network based on the fourth message, and executing a voice service in the second network; and returning, by the terminal device, to the first network after the voice service ends. The first voice call setup request and the second voice call setup request are used to request to set up a voice service, and the voice service may be an IMS voice service.

In this embodiment of the present invention, the terminal device may be redirected, based on the fourth message from the access network device of the first network, to the second network to execute the voice service. In addition, it may be further determined, based on first indication information or second indication information, that the terminal device moves to the first network after the voice service in the second network ends, so that the terminal device is prevented from camping on the second network for an excessively long time.

With reference to the thirty-second aspect, in a first possible implementation of the thirty-second aspect, the fourth message includes at least one of the first indication information, the second indication information, and network identifier information of the first network, the first indication information is used to indicate that the terminal device moves from the first network to the second network to set up a voice service, and the second indication information is used to indicate that the terminal device needs to return to the first network after the voice service ends.

With reference to the first possible implementation of the thirty-second aspect, in a second possible implementation of the thirty-second aspect, the returning, by the terminal device, to the first network after the voice service ends includes: returning, by the terminal device, to the first network based on at least one of the first indication information, the second indication information, and the network identifier information of the first network after the voice service ends.

With reference to any one of the thirty-second aspect, or the first to the second possible implementations of the thirty-second aspect, in a third possible implementation of the thirty-second aspect, the executing, by the terminal device, a voice service in the second network includes: executing, by the terminal device, a voice service corresponding to the first voice call setup request or a voice service corresponding to the second voice call setup request in the second network; or initiating, by the terminal device, a third voice call setup request in the second network and executing a voice service corresponding to the third voice call setup request, or receiving a fourth voice call setup request in the second network and executing a voice service corresponding to the fourth voice call setup request.

With reference to any one of the thirty-second aspect, or the first to the third possible implementations of the thirty-second aspect, in a fourth possible implementation of the thirty-second aspect, a type of a core network of the first network is the same as that of a core network of the second network, and a type of an access network of the first network is different from that of an access network of the second network; or a type of a core network of the first network is different from that of a core network of the second network, and a type of an access network of the first network is different from that of an access network of the second network.

With reference to the fourth possible implementation of the thirty-second aspect, in a fifth possible implementation of the thirty-second aspect, that a type of a core network of the first network is the same as that of a core network of the second network, and a type of an access network of the first network is different from that of an access network of the second network includes: the core network of the first network and the core network of the second network are 5G core networks, the access network of the first network is an NG RAN, and the access network of the second network is an evolved universal terrestrial radio access network E-UTRAN.

With reference to the fourth possible implementation of the thirty-second aspect, in a sixth possible implementation of the thirty-second aspect, that a type of a core network of the first network is different from that of a core network of the second network, and a type of an access network of the first network is different from that of an access network of the second network includes: the core network of the first network is a 5G core network, the core network of the second network is a 4G core network, the access network of the first network is an NG RAN, and the access network of the second network is an E-UTRAN.

According to a thirty-third aspect, an access network device is disclosed, and the access network device is an access network device of a first network and includes: a receiving unit, configured to receive a first message from a core network device of the first network, where the first message is used to request to set up a user plane tunnel of a voice service for a terminal device; and a sending unit, configured to send a second message to the core network device of the first network, where the second message is used to respond to the first message. The sending unit is further configured to send a fourth message to the terminal, where the fourth message is used to instruct the terminal device to be redirected from the first network to a second network. At least one of the second message or the fourth message carries first indication information and/or second indication information, the first indication information is used to indicate that the terminal device moves from the first network to the second network to set up a voice service, and the second indication information is used to indicate that the terminal device needs to return to the first network after the voice service ends.

With reference to the thirty-third aspect, in a first possible implementation of the thirty-third aspect, at least one of the second message and the fourth message carries network identifier information of the first network.

With reference to the thirty-third aspect or the first possible implementation of the thirty-third aspect, in a second possible implementation of the thirty-third aspect, a type of a core network of the first network is the same as that of a core network of the second network, and a type of an access network of the first network is different from that of an access network of the second network; or a type of a core network of the first network is different from that of a core network of the second network, and a type of an access network of the first network is different from that of an access network of the second network.

With reference to the second possible implementation of the thirty-third aspect, in a third possible implementation of the thirty-third aspect, that a type of a core network of the first network is the same as that of a core network of the second network, and a type of an access network of the first network is different from that of an access network of the second network includes: the core network of the first network and the core network of the second network are 5G core networks, the access network of the first network is an NG RAN, and the access network of the second network is an evolved universal terrestrial radio access network E-UTRAN.

With reference to the second possible implementation of the thirty-third aspect, in a fourth possible implementation of the thirty-third aspect, that a type of a core network of the first network is different from that of a core network of the second network, and a type of an access network of the first network is different from that of an access network of the second network includes: the core network of the first network is a 5G core network, the core network of the second network is a 4G core network, the access network of the first network is an NG RAN, and the access network of the second network is an E-UTRAN.

According to a thirty-fourth aspect, a terminal device is disclosed, including: a sending unit, configured to initiate a first voice call setup request in a first network, or a receiving unit, configured to receive a second voice call setup request in a first network, where the receiving unit is further configured to receive a fourth message from an access network device of the first network, where the fourth message is used to instruct the terminal device to be redirected from the first network to a second network; and a processing unit, configured to: access the second network based on the fourth message, and execute a voice service in the second network, where the processing unit is further configured to return the terminal device to the first network after the voice service ends.

With reference to the thirty-fourth aspect, in a first possible implementation of the thirty-fourth aspect, the fourth message includes at least one of first indication information, second indication information, and network identifier information of the first network, the first indication information is used to indicate that the terminal device moves from the first network to the second network to set up a voice service, and the second indication information is used to indicate that the terminal device needs to return to the first network after the voice service ends.

With reference to the first possible implementation of the thirty-fourth aspect, in a second possible implementation of the thirty-fourth aspect, the processing unit is specifically configured to return the terminal device to the first network based on at least one of the first indication information, the second indication information, and the network identifier information of the first network after the voice service ends.

With reference to any one of the thirty-fourth aspect, or the first to the second possible implementations of the thirty-fourth aspect, in a third possible implementation of the thirty-fourth aspect, the processing unit is specifically configured to: execute a voice service corresponding to the first voice call setup request or a voice service corresponding to the second voice call setup request in the second network; or initiate a third voice call setup request in the second network and execute a voice service corresponding to the third voice call setup request, or receive a fourth voice call setup request in the second network and execute a voice service corresponding to the fourth voice call setup request.

With reference to any one of the thirty-fourth aspect, or the first to the third possible implementations of the thirty-fourth aspect, in a fourth possible implementation of the thirty-fourth aspect, a type of a core network of the first network is the same as that of a core network of the second network, and a type of an access network of the first network is different from that of an access network of the second network; or a type of a core network of the first network is different from that of a core network of the second network, and a type of an access network of the first network is different from that of an access network of the second network.

With reference to the fourth possible implementation of the thirty-fourth aspect, in a fifth possible implementation of the thirty-fourth aspect, that a type of a core network of the first network is the same as that of a core network of the second network, and a type of an access network of the first network is different from that of an access network of the second network includes: the core network of the first network and the core network of the second network are 5G core networks, the access network of the first network is an NG RAN, and the access network of the second network is an evolved universal terrestrial radio access network E-UTRAN.

With reference to the fourth possible implementation of the thirty-fourth aspect, in a sixth possible implementation of the thirty-fourth aspect, that a type of a core network of the first network is different from that of a core network of the second network, and a type of an access network of the first network is different from that of an access network of the second network includes: the core network of the first network is a 5G core network, the core network of the second network is a 4G core network, the access network of the first network is an NG RAN, and the access network of the second network is an E-UTRAN.

BRIEF DESCRIPTION OF DRAWINGS

FIG. 10A and FIG. 10B to FIG. 18 are schematic flowcharts of a network handover according to an embodiment of this application;

DESCRIPTION OF EMBODIMENTS

The following describes in detail technical solutions in embodiments of this application with reference to accompanying drawings in the embodiments of this application.

A method provided in the embodiments of this application may be applied to a wireless communications system, for example, a global system for mobile communications (GSM), a wideband code division multiple access (WCDMA) system, a code division multiple access (CDMA) system, a general packet radio service (GPRS) system, a universal mobile telecommunications system (UMTS), an EPS network, and a 5G network, and may be further applied to a future wireless communications system.

Figure 1:
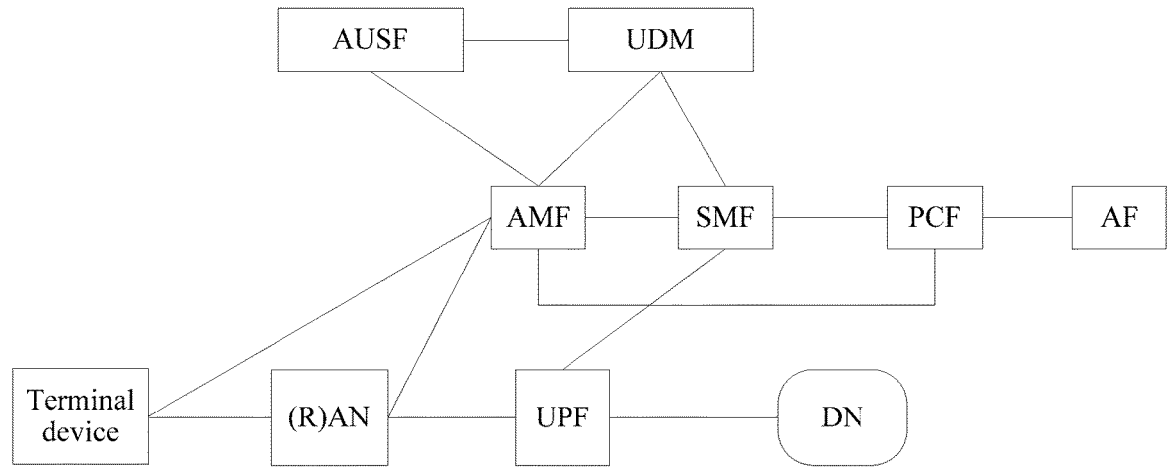
FIG. 1 is a schematic architectural diagram of a 5G network according to an embodiment of this application.

Specifically, the method provided in the embodiments of this application may be applied to a 5G network shown in FIG. 1. As shown in FIG. 1, the 5G network may include an authentication server function (AUSF) network element, an access and mobility management function (AMF) network element, a data network (DN), a unified data management (UDM) network element, a policy control function (PCF) network element, a (radio) access network ((R)AN) device (which may be an NG RAN and an E-UTRAN), a user plane function (UPF) network element, a terminal device, an application function (AF) network element, and a session management function (SMF) network element.

Control plane (CP) function network elements include the UDM network element, the AUSF network element, the PCF network element, the AMF network element, and the SMF network element.

Specifically, a main function of the (R)AN device includes providing a wireless connection. Main functions of the UPF network element include routing and forwarding a data packet, serving as a mobility anchor and an uplink classifier to route a service flow to a DN and a BP to support a multi-homed packet data unit (PDU) session, and the like, where the DN may serve an operator to provide internet access, or serve a third party. Main functions of the AMF network element include user registration management, accessibility detection, SMF node selection, mobile state conversion management, and the like. Main functions of the SMF network element include session setup, modification, and deletion control, user plane node selection, and the like. Main functions of the PCF network element include serving as a policy decision point to provide rules such as service data flow based application detection, gating, quality of service (QoS), and flow-based charging control. A main function of the AF network element includes interacting with a 3rd generation partnership project (3GPP) core network to provide a service and to affect service flow routing, access network capability exposure, policy control, and the like. A main function of the AUSF network element includes providing an authentication service. A main function of the UDM network element includes storing subscription data.

The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be alternatively a station (STA) in a wireless local area network (WLAN), a cellular phone, a cordless phone, a session initiation protocol (SIP) phone, a wireless local loop (WLL)

station, a personal digital assistant (PDA) device, a handheld device having a wireless communication function, a computing device, another processing device connected to a wireless modem, a vehicle-mounted device, or a wearable device (also referred to as a wearable intelligent device). The terminal device may be alternatively a terminal device in a next generation communications system, for example, a terminal device in 5G a terminal device in a future evolved public land mobile network (PLMN), or a terminal device in a new radio (NR) communications system.

Figure 2:
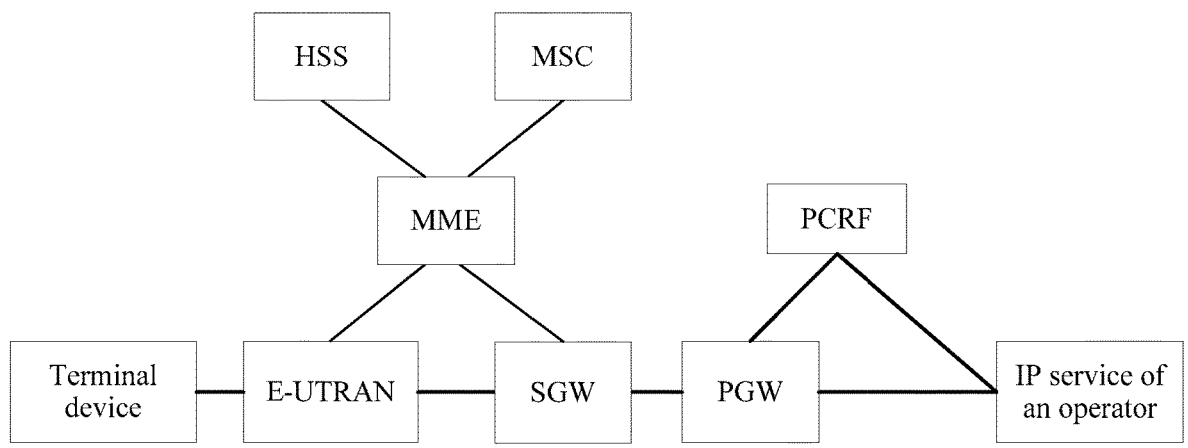
FIG. 2 is a schematic architectural diagram of an EPS network according to an embodiment of this application.

Specifically, the method provided in the embodiments of this application may be further applied to an evolved packet system (EPS) network (commonly referred to as a 4G network) shown in FIG. 2. As shown in FIG. 2, the EPS network may include a plurality of function network elements: a terminal device, an evolved universal terrestrial radio access network (E-UTRAN) (which may be specifically an eNodeB), a serving gateway (SGW), a packet data network gateway (PGW), a mobility management network element (MME), a home subscriber server (HSS), a mobile switching center (MSC), and a policy and charging rules function (PCRF) network element.

If both the 5G network and the EPS network are deployed, the function network elements in the 5G network and the function network elements in the EPS network may be integrated, so that the 5G network and the EPS network can interact with each other. Referring to 5G and 4G interactive networking shown in FIG. 3, function network elements in an integrated network include an HSS+UDM function network element (a function network element that has a function of an HSS and a function of a UDM), a PCF+PCRF function network element (a function network element that has a function of a PCF and a function of a PCRF), an SMF+PGW-C function network element (a function network element that has a function of an SMF and a function of a packet data network gateway-control plane (PGW-C)), a UPF+PGW-U function network element (a function network element that has a function of a UPF and a function of a packet data network gateway-user plane (PGW-U)), an SGW, an MME, an E-UTRAN, an AMF, a next generation (NG) RAN, and a terminal device. In the embodiments of this application, the HSS+UDM function network element, the PCF+PCRF function network element, the SMF+PGW-C function network element, and the UPF+PGW-U are merely examples for description. Each network element may be alternatively two separate network elements. This is not limited herein.

In the embodiments of this application, a core network device may be a physical entity device or a virtual function network element. This is not limited herein.

Figure 4:
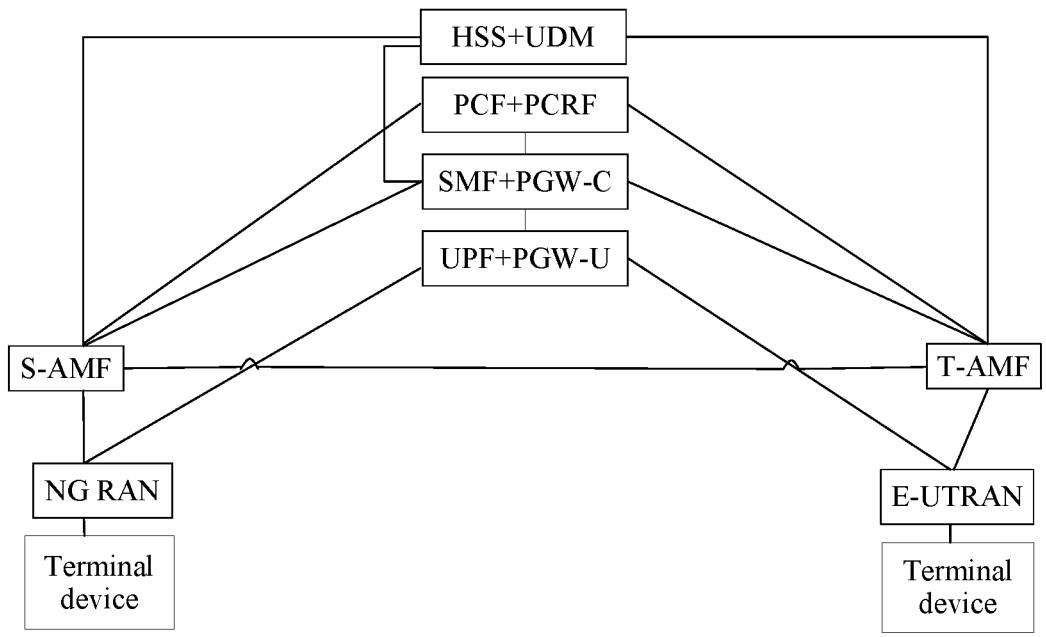
FIG. 4 is a schematic architectural diagram of another 5G network according to an embodiment of this application.

In addition, as shown in FIG. 4, an E-UTRAN may be deployed in a 5G core network. Specifically, the E-UTRAN may be connected to the 5G core network. For descriptions of other network elements, refer to the descriptions of FIG. 1 in the embodiments of this application. Details are not described herein again.

Currently, relatively mature voice service solutions include an internet protocol multimedia subsystem (IMS) voice service solution in an EPS network and a circuit switching (CS) voice service solution in a 2G/3G network. In the prior art, the 5G network does not support an IMS service or a CS voice service. Therefore, the embodiments of this application provide a network handover method, so that when a terminal device needs to execute a voice service, the terminal device can move from the 5G network to the EPS network or the 2G/3G network to execute the voice service.

Figure 5:
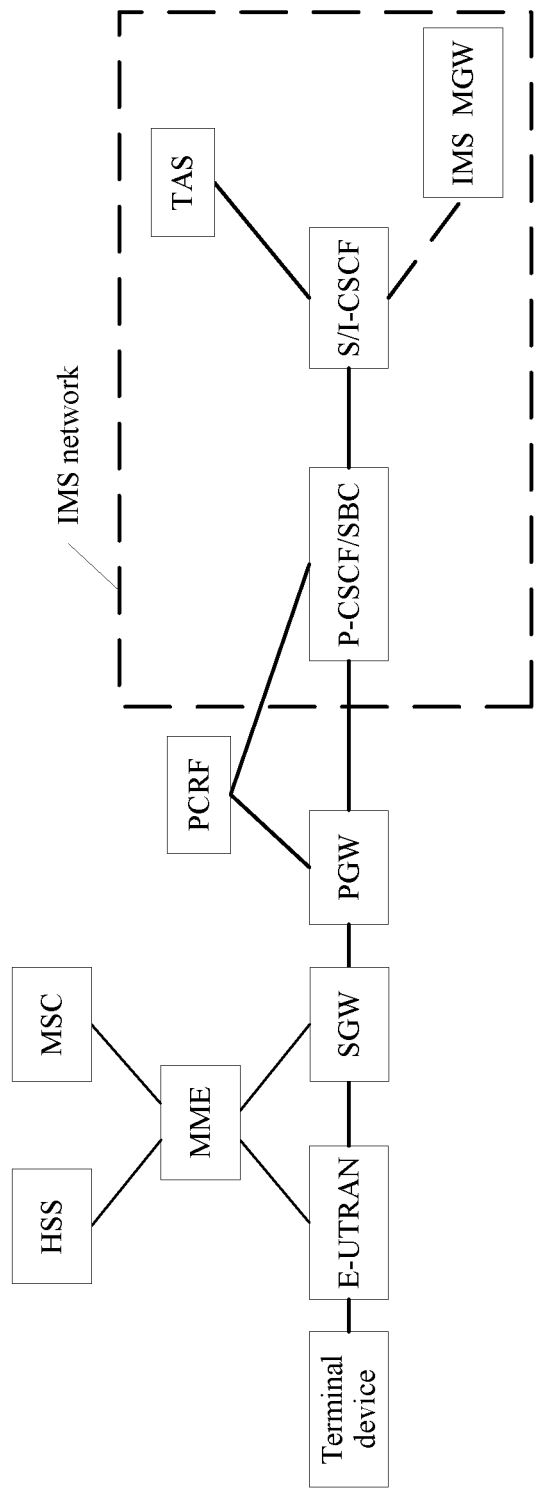
FIG. 5 is a schematic diagram of communication between an EPS network and an IMS network according to an embodiment of this application.

Referring to FIG. 2, if an IP service of an operator is an IMS voice service, a schematic diagram of communication between an EPS network and an IMS network may be shown in FIG. 5. The IMS network includes a proxy-call session control function (P-CSCF)/session border control (SBC), an interrogating-call session control function (I-CSCF)/serving-call session control function (S-CSCF), a telephony application server (TAS), and an IMS media gateway (IMS MGW). A terminating domain selection function module (T-ADS) may be included in the TAS, and therefore a terminating domain selection device below may be considered as the TAS. The TAS may be alternatively a service centralization and continuity application server (SCC AS).

Figure 6:
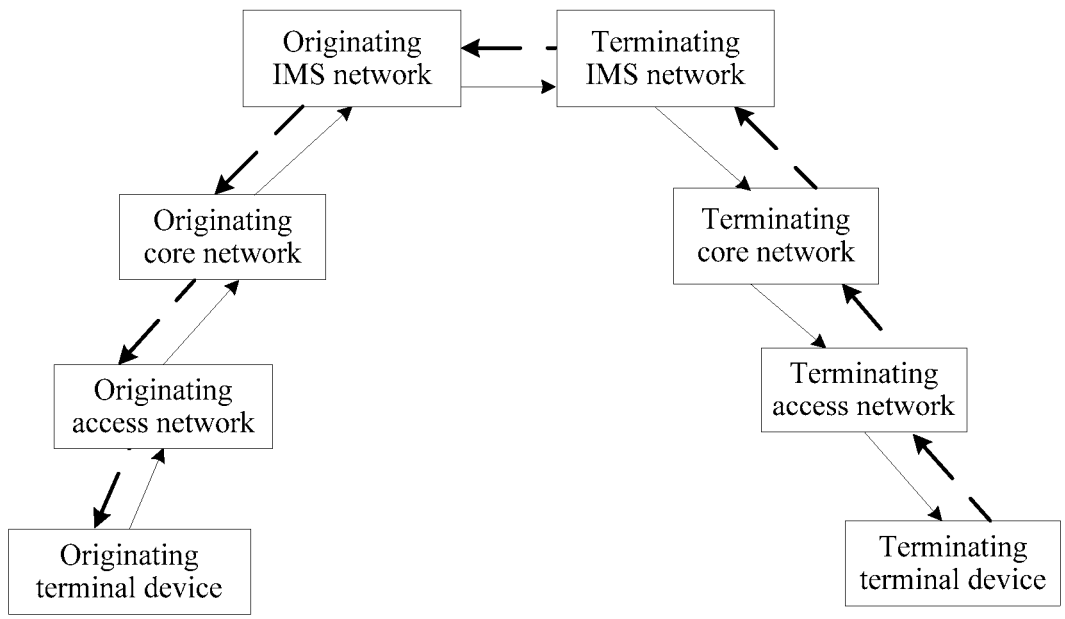
FIG. 6 is a schematic diagram of performing IMS voice communication between terminal devices according to an embodiment of this application.

When a terminal device executes an IMS voice service, a process of communication between an originating terminal device and a terminating terminal device may be shown in FIG. 6. Specifically, the originating terminal device sends call related information to an originating access network, and the call related information arrives at the terminating terminal device through the originating access network, an originating core network, an originating IMS network, a terminating IMS network, a terminating core network, and a terminating access network. Information fed back by the terminating terminal device to the originating terminal device is sent in an opposite direction.

A voice service imposes a high requirement on network coverage, but a spectrum of an NG RAN network is mostly on a high frequency band, and a coverage area of a high frequency signal is small. Therefore, the coverage requirement of the voice service cannot be met. In this case, in an initial or even middle deployment phase of 5G most operator networks probably cannot support a voice service, and prefer to provide a voice service for a user through an EPS fallback or an RAT fallback. Specifically, if UE that camps on an NG RAN cell initiates a voice service, an NG RAN triggers the UE to be handed over to an E-UTRAN cell to continue to execute a voice service setup procedure. If an E-UTRAN to which the UE falls back is connected to a 5GC (namely, a 5G core network), an entire system does not need to be switched in such a fallback, which is referred to as the RAT fallback. For example, the UE is in the network shown in FIG. 4, and falls back from the NG RAN shown in FIG. 4 to the E-UTRAN shown in FIG. 4. It should be noted that, in the embodiments of the present invention, that the UE is handed over from one network to another network may be understood as that the UE moves from one network to another network.

Certainly, if the E-UTRAN to which the UE falls back is connected to an EPC (namely, a 4G core network), the system needs to be switched from a 5GS to an EPS in such a fallback, which is referred to as the EPS fallback. For example, the UE is in the 5G network shown in FIG. 1 and falls back to the E-UTRAN in the network shown in FIG. 2. Alternatively, the UE is in the 5G network shown in FIG. 3, and falls back from the NG RAN shown in FIG. 3 to the E-UTRAN shown in FIG. 3.

Currently, specific signaling designs and specific procedure designs are proposed for the foregoing two fallback solutions in an existing standard. However, there is no solution for quickly returning UE to an NG RAN after the UE falls back to an E-UTRAN to execute a voice service. Consequently, the UE fails to return to the NG RAN, or camps on the E-UTRAN for a long time, and therefore the UE cannot make full use of a wider variety of higher-rate services that are more stable and reliable and that are provided by an NG RAN network newly deployed by an operator and cannot obtain better service experience. In addition, network deployment resources are also wasted, resulting in adverse impact on a 5G network deployment progress.

The embodiments of this application provide a network handover method. When an access network device of a first network (for example, an NG RAN) enables UE to fall back to a second network to execute a voice service, the access network device of the first network may send indication information to an access network device of the second network (for example, an E-UTRAN), and the access network device of the second network may return the UE to the first network based on the received indication information. The indication information may be first indication information and/or second indication information, the first indication information is used to indicate that the terminal device is handed over from the first network to the second network to set up a voice service, and the second indication information is used to indicate that the terminal needs to return to the first network after the voice service ends.

It should be noted that, for ease of description, the foregoing is described only by using an example in which the first network is a 5G network and the second network is a 4G network. Actually, the method in the embodiments of this application is not limited to this scenario, and is applicable to a scenario of any two networks, provided that the two networks are different networks.

In addition, two different names appear in this application: a mobility management network element and an access management network element. For example, an instance of the mobility management network element in the 4G network is an MME, and an instance of the access management network element in the 5G network is an AMF. It should be noted that except different names, functions of the access management network element and the mobility management network element are similar, that is, providing a connection management function for a user to access a network and move in the network. Both the access management network element and the mobility management network element may be referred to as a mobility management network element, or may be referred to as an access management network element. This is not limited in the embodiments of the present invention. It should be noted that, in the embodiments of this application, a network includes a core network and an access network. For any two networks, if one of a core network type and an access network type of one network is different from that of the other, the two networks are considered as different networks. For example, the first network and the second network are different networks. Specifically, a type of a core network of the first network may be the same as that of a core network of the second network, and a type of an access network of the first network may be different from that of an access network of the second network. For example, both the core network of the first network and the core network of the second network are 5G core networks, the access network of the first network is an NG RAN, and the access network of the second network is an E-UTRAN. Alternatively, a type of a core network of the first network is different from that of a core network of the second network, and a type of an access network of the first network is different from that of an access network of the second network. The core network of the first network is a 5G core network, the access network of the first network is an NG RAN, the core network of the second network is a 4G core network, and the access network of the second network is an E-UTRAN.

The network handover method provided in the embodiments of this application may be applied to an access network device, and the access network device may be an access network device of a first network, for example, an NG RAN in a 5G network.

Figure 7:
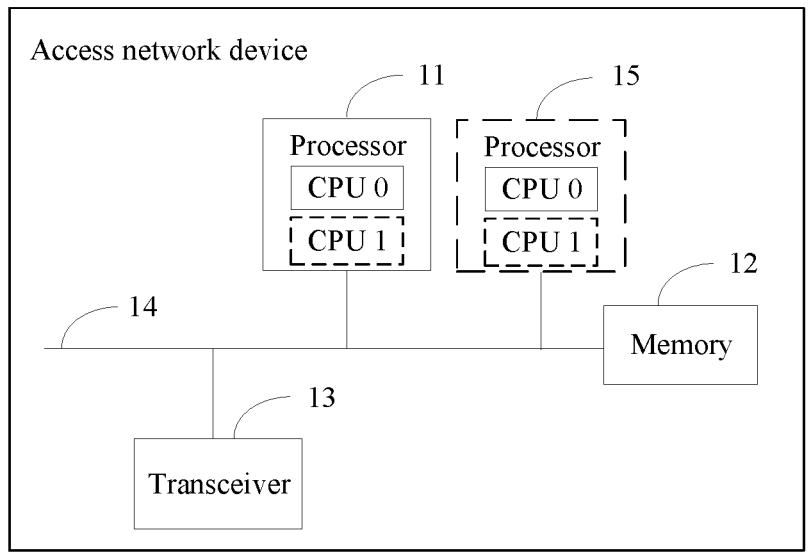
FIG. 7 is a schematic composition diagram of an access network device according to an embodiment of this application.

As shown in FIG. 7, the access network device may include at least one processor 11, a memory 12, a transceiver 13, and a communications bus 14.

The following describes each component of the access network device in detail with reference to FIG. 7.

The processor 11 is a control center of the access network device, and may be one processor, or may be a collective term for a plurality of processing elements. For example, the processor 11 may be a central processing unit (CPU), or an application-specific integrated circuit (ASIC), or may be configured as one or more integrated circuits implementing this embodiment of this application, for example, one or more microprocessors (DSP) or one or more field programmable gate arrays (FPGA).

The processor 11 may perform various functions of the access network device by running or executing a software program stored in the memory 12 and by invoking data stored in the memory 12.

In specific implementation, in an embodiment, the processor 11 may include one or more CPUs, for example, a CPU 0 and a CPU 1 in FIG. 7.

In specific implementation, in an embodiment, the access network device may include a plurality of processors, for example, the processor 11 and a processor 15 in FIG. 7. Each of these processors may be a single-core processor (single-CPU) or a multi-core processor (multi-CPU). The processor herein may be one or more devices, circuits, and/or processing cores used to process data (such as a computer program instruction).

The memory 12 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage, or an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. This is not limited. The memory 12 may exist independently, and is connected to the processor 11 through the communications bus 14. Alternatively, the memory 12 may be integrated with the processor 11.

The memory 12 is configured to store a software program for performing the solution in the present invention, and the processor 11 controls execution of the software program.

The transceiver 13 is any apparatus of a transceiver type, and is configured to communicate with another device in a first network or with another device in a second network. The transceiver 13 may be further configured to communicate with a communications network, such as an Ethernet network, a radio access network (RAN), or a wireless local area network (WLAN). The transceiver 13 may include a receiving unit for implementing a receiving function and a sending unit for implementing a sending function.

The communications bus 14 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 7, but this does not mean that there is only one bus or only one type of bus.

The device structure shown in FIG. 7 does not constitute a limitation on the access network device, and the access network device may include components more or fewer than those shown in the figure, or may combine some components, or may have different component arrangements.

Figure 8:
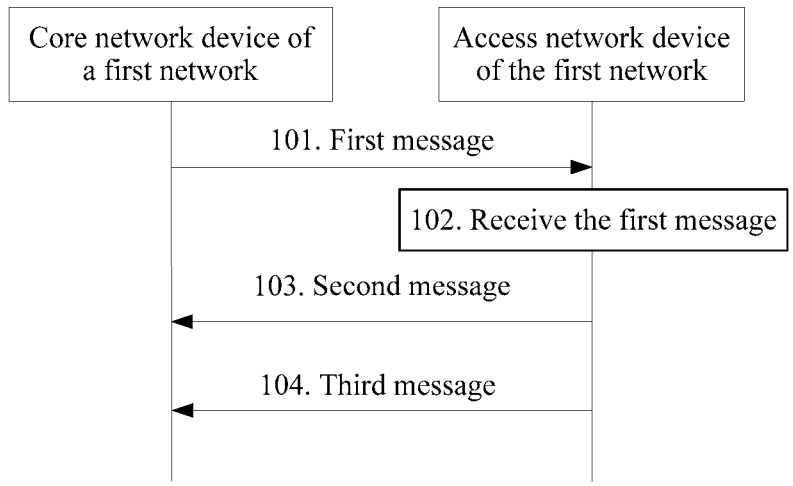
FIG. 8 is a schematic flowchart of a network handover method according to an embodiment of this application.

An embodiment of this application provides a network handover method. As shown in FIG. 8, the method includes the following steps.

101. A core network device of a first network sends a first message to an access network device of the first network, where the first message is used to request to set up a user plane tunnel of a voice service for a terminal device.

In specific implementation, the voice service of the terminal device may be an IMS voice service, and the access network device of the first network may be an NG RAN. When the terminal device initiates an IMS voice service in the first network, the first network probably cannot meet a voice service requirement of the terminal device, and therefore the terminal device needs to fall back to a second network to execute the voice service. Specifically, the terminal sends an invitation message to a P-CSCF in an IMS network. After receiving the invitation message, the P-CSCF in the IMS network triggers the core network device of the first network to send the first message to the access network device of the first network, to request to set up the user plane tunnel for the terminal device. The user plane tunnel may be referred to as a QoS flow in a 5G network.

The first message from the core network device of the first network to the access network device of the first network may be an N2 interface message, and the N2 interface message carries first session management (SM) information. In other words, the core network device of the first network may transparently transmit the first SM information to the access network device of the first network by using the N2 interface message. In addition, the first session management information may include QoS parameters of the user plane tunnel of the IMS voice service of the terminal device, for example, a 5G QoS indicator (5QI)=1, an allocation/retention priority (ARP), a guaranteed bit rate (GBR), and a maximum bit rate (MBR). The first session management information may further include other information. This is not limited in this embodiment of this application.

It should be noted that the terminal device may be an originating terminal device of the voice service, or may be a terminating terminal device of the voice service.

102. The access network device of the first network receives the first message.

In specific implementation, the access network device of the first network may be an E-UTRAN. The access network device of the first network may receive the N2 interface message from the core network device of the first network, and obtain the first message from the N2 interface message. In addition, the core network device in step 101 may be an AMF. In other words, in step 102, the NG RAN receives the N2 interface message from the AMF.

103. The access network device of the first network sends a second message to the core network device of the first network, where the second message is used to respond to the first message.

In specific implementation, the second message from the access network device of the first network to the core network device of the first network may be a session management response from the access network device of the first network to the core network device of the first network through an N2 interface between the access network device of the first network and the core network device of the first network. In addition, the second message may include second SM information. The second SM information may include information indicating that the request for setting up the user plane tunnel of the voice service for the terminal device is accepted. Alternatively, the second SM information includes information indicating that the request for setting up the user plane tunnel of the voice service for the terminal device is rejected, and carries reject cause information.

In addition, the second message from the access network device of the first network to the core network device of the first network may further carry first indication information and/or second indication information. The first indication information is used to indicate that the terminal device is handed over from the first network to the second network to set up a voice service, and the second indication information is used to indicate that the terminal device needs to return to the first network after the voice service ends.

It should be noted that, in an implementation of this embodiment of the present invention, that the terminal device moves from the first network to the second network to set up a voice service may be understood as that the terminal device initiates a voice call setup request in the first network, and then accesses the second network to execute the voice service, or that the terminal device receives a voice call setup request in the first network, and then accesses the second network to execute the voice service.

104. The access network device of the first network sends a third message to the core network device of the first network, where the third message is used to trigger the terminal device to be handed over from the first network to the second network.

In specific implementation, the third message from the access network device of the first network to the core network device of the first network may be a handover request. The third message may also carry the first indication information and/or the second indication information.

In specific implementation, at least one of the second message from the access network device of the first network to the core network device of the first network and the third message from the access network device of the first network to the core network device of the first network or an access network device of the second network carries the first indication information and/or the second indication information.

In some embodiments, the access network device of the first network may directly send the third message to the access network device of the second network through a direct interface (such as an X2 interface or an Xn interface) between base stations, where the third message carries the first indication information and/or the second indication information. Alternatively, the third message carries a transparent container (source to target transparent container), and the transparent container carries the first indication information and/or the second indication information. In addition, when the third message carries the transparent container, and the transparent container carries the first indication information and/or the second indication information, the third message may be alternatively forwarded to the access network device of the second network by using the core network device. However, the core network device cannot parse the transparent container in the third message, but forwards the third message in turn until the third message is sent to the access network device of the second network.

Figure 9:
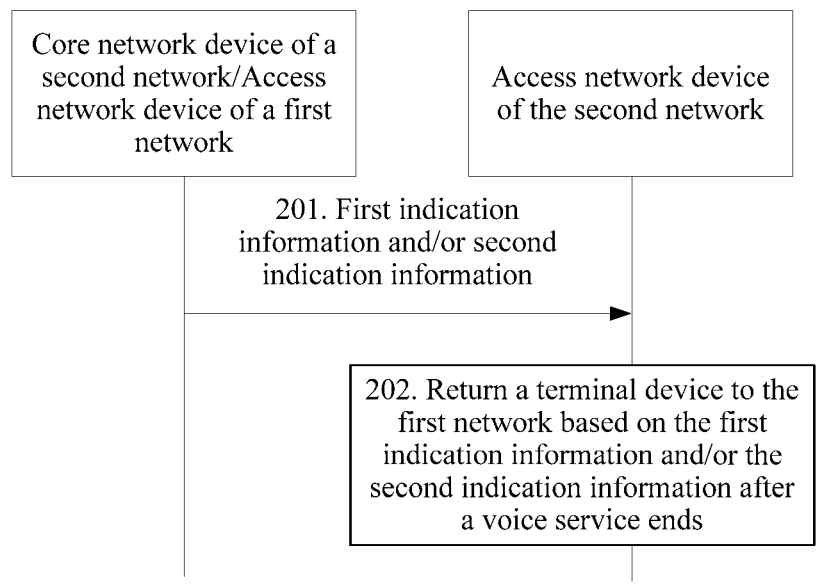
FIG. 9 is another schematic flowchart of a network handover method according to an embodiment of this application.

An embodiment of this application provides a network handover method. As shown in FIG. 9, the method includes the following steps.

201. An access network device of a second network receives first indication information and/or second indication information from an access network device of a first network or a core network device of the second network, where the first indication information is used to indicate that a terminal device is handed over from the first network to the second network to set up a voice service, and the second indication information is used to indicate that the terminal device needs to return to the first network after the voice service ends.

In some other implementations of this application, the first indication information is used to indicate that the terminal device moves from the first network to the second network to set up the voice service. That the terminal device moves from the first network to the second network includes that the terminal device is redirected or handed over from the first network to the second network. In addition, the access network device of the second network may receive the first indication information and/or the second indication information in the following two manners:

Manner 1: A handover request message from the access network device of the first network or a mobility management network element of the second network or an access management network element of the second network is received, where the handover request message carries the first indication information and/or the second indication information, and the handover request message is used to request to hand over UE from the first network to the second network. The access network device of the first network may be an NG RAN, the mobility management network element of the second network may be an MME, and the access management network element of the second network may be an AMF.

Specifically, if the first network is a 5G network connected to an NG RAN, and the second network is a 4G network connected to an E-UTRAN, the access network device of the second network may obtain the first indication information and/or the second indication information by using the handover request message from the mobility management network element of the second network, or the access network device of the second network may obtain the first indication information and/or the second indication information by using the handover request message from the access network device of the first network.

If the first network is a 5G network connected to an NG RAN, and the second network is a 5G network connected to an E-UTRAN, the access network device of the second network may obtain the first indication information and/or the second indication information by using the handover request message from the access management network element of the second network, or may obtain the first indication information and/or the second indication information by using the handover request message from the access network device of the first network.

It should be noted that the access network device of the second network may receive, through a direct interface (such as an X2 interface or an Xn interface) between the access network device of the second network and the access network device of the first network, the handover request message from the access network device of the first network, where the handover request message carries the first indication information and/or the second indication information. Alternatively, a transparent container included in the handover request message carries the first indication information and/or the second indication information, and the access network device of the second network obtains the first indication information and/or the second indication information from the transparent container. Therefore, the access network device of the second network may obtain the first indication information and/or the second indication information by using the handover request message from the access network device of the first network.

Manner 2: A tunnel release request from a mobility management network element or an access management network element of the second network is received, where the tunnel release request carries the first indication information and/or the second indication information, and the tunnel release request is used to request to release a user plane tunnel of a voice service.

Specifically, if the first network is a 5G network connected to an NG RAN, and the second network is a 4G network connected to an E-UTRAN, the access network device of the second network may obtain the first indication information and/or the second indication information by using the tunnel release request from the mobility management network element of the second network.

If the first network is a 5G network connected to an NG RAN, and the second network is a 5G network connected to an E-UTRAN, the access network device of the second network may obtain the first indication information and/or the second indication information by using the tunnel release request from the access management network element of the second network.

In some other embodiments of the present invention, the access network device of the second network may alternatively receive the first indication information and/or the second indication information in the following third manner and the following fourth manner:

Manner 3: A tunnel setup request from a mobility management network element or an access management network element of the second network is received, where the tunnel setup request carries the first indication information and/or the second indication information, and the tunnel setup request is used to request to set up a user plane tunnel for a voice service in the second network.

Specifically, if the first network is a 5G network connected to an NG RAN, and the second network is a 4G network connected to an E-UTRAN, the access network device of the second network may obtain the first indication information and/or the second indication information by using the tunnel setup request from the mobility management network element of the second network. The first indication information and/or the second indication information may be from a session management network element of the second network (for example, an SMF/PGW-C) to the mobility management network element of the second network by using a serving gateway (for example, an SGW).

If the first network is a 5G network connected to an NG RAN, and the second network is a 5G network connected to an E-UTRAN, the access network device of the second network may obtain the first indication information and/or the second indication information by using the tunnel setup request from the access management network element of the second network. The first indication information and/or the second indication information may be from the session management network element of the second network to the access management network element of the second network, and the access management network element transparently transmits the first indication information and/or the second indication information to the access management network element of the second network.

Manner 4: A path setup response message from a mobility management network element or an access management network element of the second network is received, where the path setup response message carries the first indication information and/or the second indication information.

After the terminal device is handed over or redirected from the first network to the second network, the access network device of the second network sends a path setup request to the mobility management network element or the access management network element of the second network, to notify the mobility management network element or the access management network element of the second network that the terminal device has accessed the second network, so as to set up a connection between the access network device of the second network and the mobility management network element or the access management network element of the second network. For the path setup request, the mobility management network element or the access management network element of the second network sends the path setup response to the access network device of the second network, to notify whether the connection between the access network device of the second network and the mobility management network element or the access management network element of the second network is successfully set up.

Specifically, in a scenario in which the terminal device is handed over from the first network to the second network, the path setup response message may be a path handover response message. In a scenario in which the terminal device is redirected from the first network to the second network, the path setup response message may be a path setup complete message or a connection setup complete message.

202. The access network device of the second network returns the terminal device to the first network based on the first indication information and/or the second indication information after the voice service ends.

Specifically, the access network device of the second network returns the terminal device to the first network based on the first indication information and/or the second indication information after the user plane tunnel of the voice service is released.

In some embodiments, when the access network device of the second network receives the first indication information and/or the second indication information from the access network device of the first network or the core network device, the access network device of the second network further receives a network identifier of the first network from the access network device of the first network or the core network device of the second network.

Therefore, after the voice service ends, the access network device of the second network determines, based on the first indication information and/or the second indication information, that the terminal device needs to be returned to the first network. Specifically, the terminal device may be returned to a network corresponding to the network identifier of the first network.

In specific implementation, that the access network device of the second network returns the terminal device to the first network includes:

sending a second handover request message to the core network device of the second network, where the second handover request message is used to trigger the terminal device to be handed over to the first network; or sending redirection information to the terminal device, where the redirection information is used to trigger the terminal device to be redirected to the first network.

It should be noted that in this embodiment of this application, the first network and the second network are different networks. Specifically, a type of a core network of the first network may be the same as that of a core network of the second network, and a type of an access network of the first network may be different from that of an access network of the second network; or a type of a core network of the first network is different from that of a core network of the second network, and a type of an access network of the first network is different from that of an access network of the second network.

For example, the core network of the first network is a 5G core network, and the access network of the first network is an NG RAN, in other words, the first network is a 5G network connected to the NG RAN. In addition, the core network of the second network is a 5G core network, and the access network of the second network is an E-UTRAN, in other words, the second network is a 5G network connected to the E-UTRAN.

Alternatively, the core network of the first network is a 5G core network, and the access network of the first network is an NG RAN, in other words, the first network is a 5G network connected to the NG RAN. In addition, the core network of the second network is a 4G core network, and the access network of the second network is an E-UTRAN, in other words, the second network is a 4G network connected to the E-UTRAN.

The following describes a network handover method provided in an embodiment of this application by using an example in which a terminal device is UE, a first network is a 5G network connected to an NG RAN, and a second network is a 4G network connected to an E-UTRAN.

Figure 3:
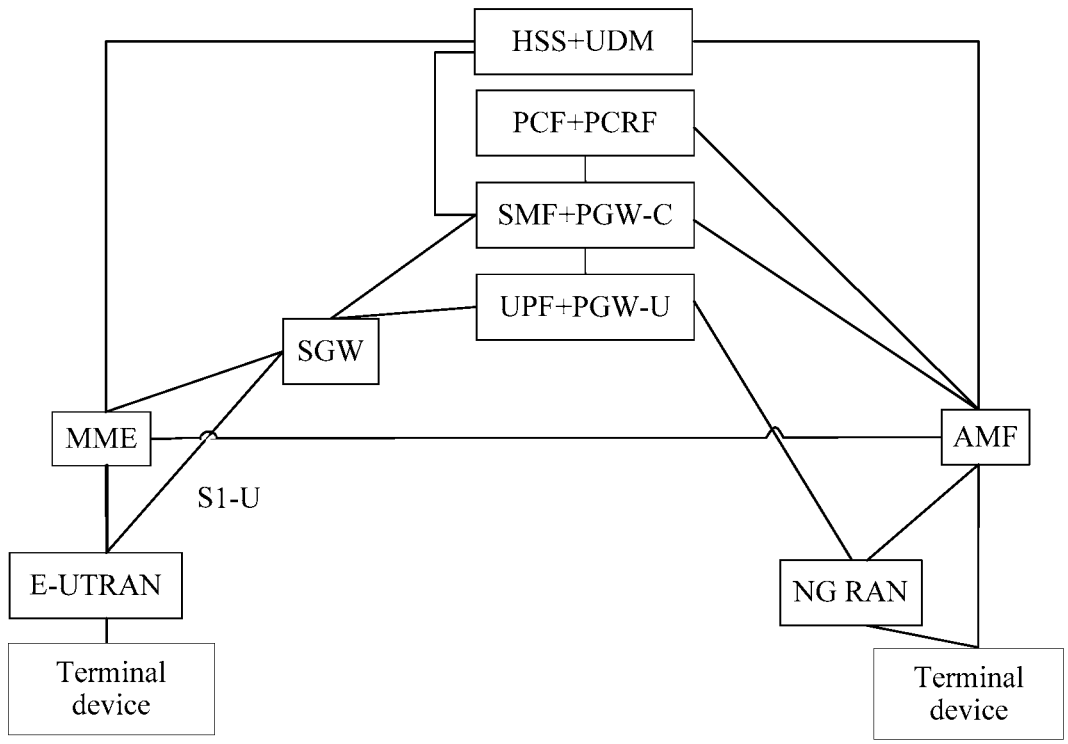
FIG. 3 is a schematic architectural diagram of a network obtained by integrating a 5G network and an EPS network according to an embodiment of this application.
Figure 10A:
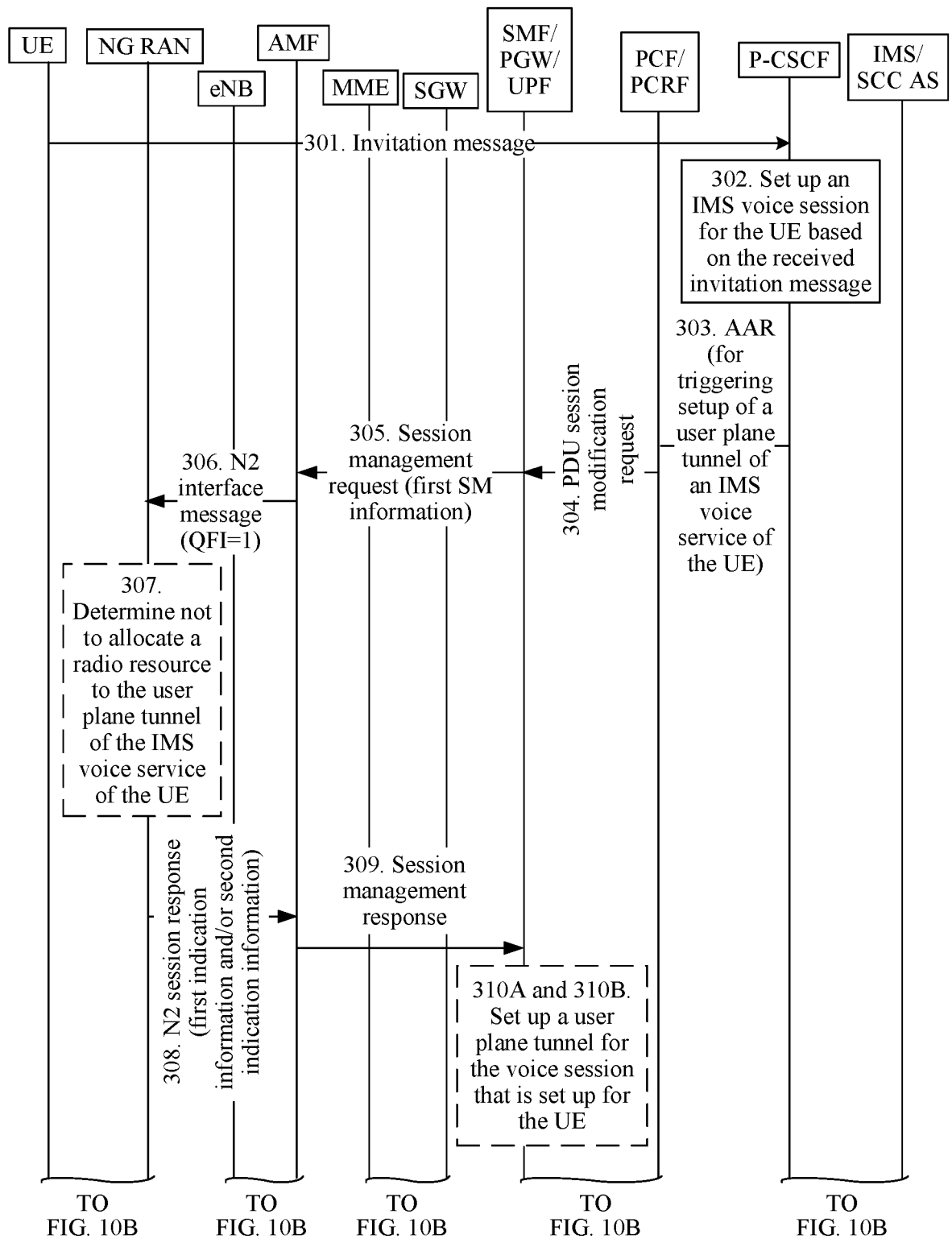
Figure 10B:
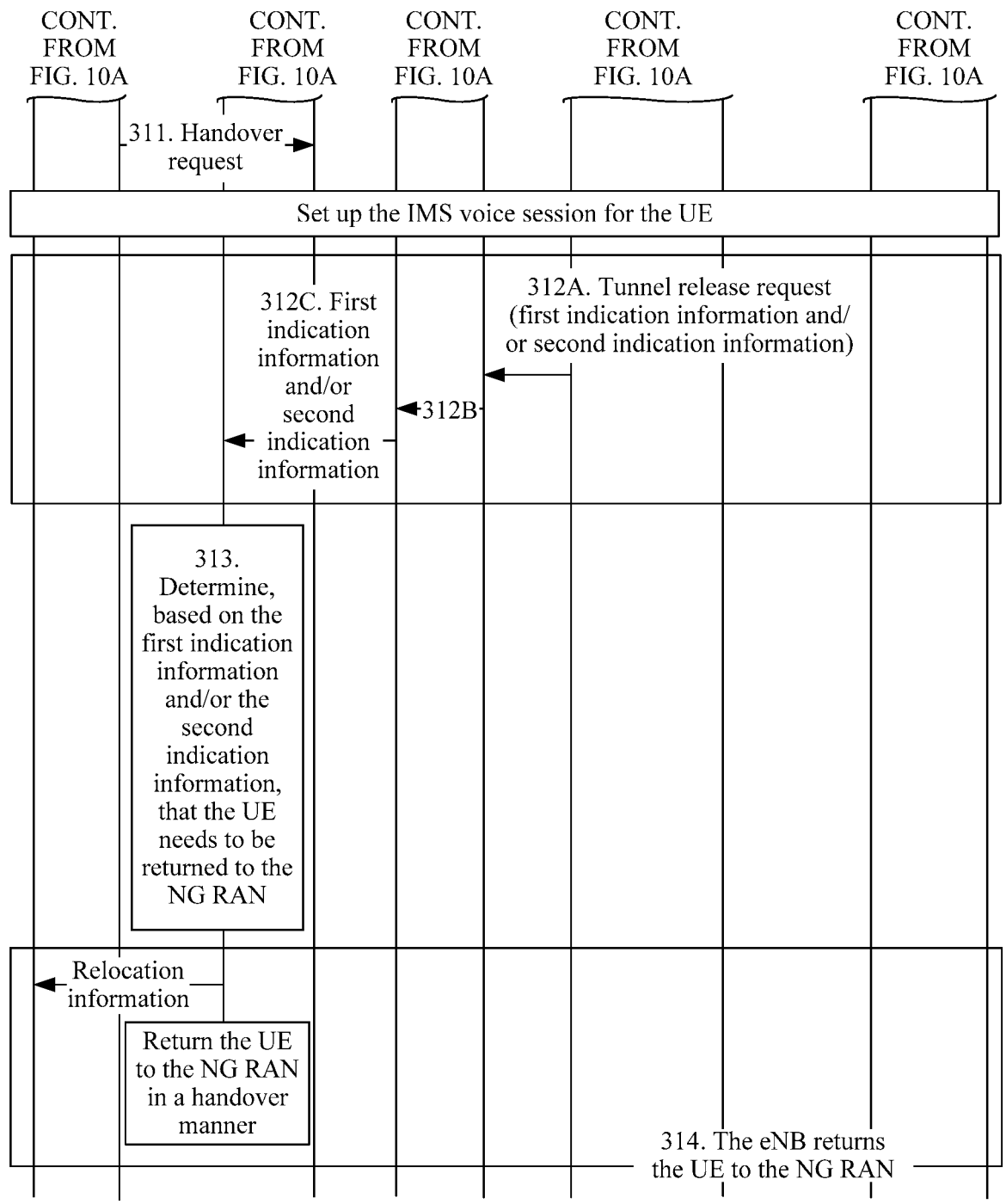

When the network handover method provided in this embodiment of this application is applied to the network shown in FIG. 3 (or applied to the 5G network shown in FIG. 1 and the 4G network shown in FIG. 2), UE may be handed over from a 5G network connected to an NG RAN to an E-UTRAN connected to a 4G core network. Further, as shown in FIG. 10A and FIG. 10B, a network handover method provided in an embodiment of this application specifically includes the following steps.

301. UE sends an invitation message to a P-CSCF, where the invitation message is used to request to set up an IMS voice service.

It should be noted that, the UE is in a cell of a 5G network in this case, and the invitation message is a message used to request to set up an IMS voice service in a PS domain for the UE in the 5G network, that is, the UE is originating UE. The P-CSCF is a network element in an IMS network.

302. The P-CSCF sets up an IMS voice session for the UE based on the received invitation message.

It should be noted that, the voice session that is set up for the UE is a voice session at an application layer in this case. Then, a user plane tunnel of the voice session further needs to be set up for the UE.

Specifically, the P-CSCF further continues to send the invitation message to a subsequent node (for example, an IMS node such as an S-CSCF and a TAS) in an originating IMS network, and the subsequent node in the originating IMS network starts to process the received invitation message. Terminating UE may receive the invitation message from the originating UE that is forwarded by a terminating IMS network.

303. The P-CSCF sends an authentication authorization request (AAR) to a PCF+PCRF to trigger setup of a user plane tunnel of the IMS voice service of the UE.

Specifically, the AAR may carry a user identifier of the UE, an IMS application layer charging identifier, media description information of the IMS voice service, and the like. The media description information may include at least one of the following types of information: a classifier identifier, bandwidth requirement description information, media type description information, and a QoS parameter.

It should be noted that the P-CSCF may directly send the AAR to the PCF+PCRF, or may send the AAR to the PCF+PCRF after receiving a 183 response message from an S-CSCF in the IMS network. The 183 response message is a response message of the terminating UE after the invitation message of the UE is forwarded to the terminating UE, and may be sent to the PCF+PCRF by using the terminating IMS network and the originating IMS network.

304. The PCF+PCRF sends a packet data unit (PDU) session modification request to an SMF+PGW-C based on the media description information carried in the AAR from the P-CSCF, to trigger a network element in the 5G network to set up the user plane tunnel for the IMS voice service of the UE.

The PDU session modification request carries QoS rules. The QoS rules include a QoS parameter set (profile), a packet filter, and the like. The QoS parameter set usually includes one or more of QoS key parameters such as a GBR, an ARP, a 5QI, and an MBR.

Generally, a user plane tunnel in the 5G network is usually a QoS flow used to transmit user plane data. A 5QI of the user plane tunnel of the IMS voice service may be equal to 1, or may be another value. In this embodiment of this application, 5QI=1 of the user plane tunnel of the IMS voice service is used as an example to describe the method provided in this embodiment of this application.

305. After receiving the PDU session modification request from the PCF+PCRF network element, the SMF+PGW-C sends, to an AMF, a session management request that carries the PDU session modification request, where the session management request includes first SM information.

The first SM information is SM information related to the user plane tunnel of the IMS voice service of the UE, the first SM information may include QoS parameters of the user plane tunnel, for example, 5QI=1, an ARP, a GBR, and an MBR. The first SM information may further include other information.

306. The AMF sends an N2 interface message to an NG RAN based on the received first SM information, where the N2 interface message includes the first SM information.

That is, the AMF transparently transmits the first SM information to the NG RAN by using the N2 interface message, so that the NG RAN allocates a corresponding radio resource to the user plane tunnel with 5QI=1 based on the first SM information.

307. The NG RAN determines, based on the received first SM information and a first condition, not to allocate a radio resource to the user plane tunnel of the IMS voice service of the UE.

It should be noted that step 307 may be performed or may not be performed. This is not specifically limited in this embodiment of this application. In addition, the NG RAN may alternatively determine, based on only the received first SM information, not to allocate the radio resource to the user plane tunnel of the IMS voice service of the UE, and the first condition is not considered during the determining.

Specifically, the first condition may include at least one of the following conditions: (1) The IMS voice service cannot be executed in the 5G network. A reason may be that the IMS voice service is not deployed in the 5G network, or current signal coverage of the 5G network is poor and cannot meet a requirement of the IMS voice service, or it is preconfigured that the 5G network does not support the IMS voice service, and the IMS notifies that the 5G network does not support the IMS voice service.

(2) An EPS network supports the voice service, and this condition may be configured on the NG RAN by an operator as a local policy.

(3) Signal quality of the EPS network meets the requirement of the voice service. Specifically, the NG RAN may instruct the UE to measure and report signal quality of a neighboring EPS cell, to determine whether the signal quality of the EPS network meets the requirement of the voice service.

(4) A network device (such as the AMF or the NG RAN) and the UE in the 5G network support a handover between the 5G network and the EPS network. When the UE changes from an idle mode to a connected mode, the AMF may notify, by using an N2 message, the NG RAN whether the UE and the AMF support the handover between the 5G network and the EPS network.

308. The NG RAN sends an N2 session response to the AMF, where the N2 session response includes first indication information and/or second indication information.

The N2 session response includes second SM information, and the second SM information includes information indicating that setup of the user plane tunnel of the IMS voice service of the UE is accepted.

Alternatively, the second SM information includes information indicating that setup of the user plane tunnel of the IMS voice service of the UE is rejected, and carries reject cause information. The cause information may be that the UE is performing a handover procedure. Further, the cause information may be that the UE is performing a handover from the 5G network to the EPS network, so that the SMF+PGW-C determines, based on the cause information after the handover procedure of the UE ends, to re-initiate a request of setting up the user plane tunnel of the IMS voice service of the UE.

In addition, the second SM information further includes the first indication information and/or the second indication information. The first indication information is used to indicate that the UE is handed over from the 5G network to a 4G network to set up a voice service, that is, the first indication information is used to indicate, to the SMF+PGW-C, that a forthcoming handover procedure is initiated to set up the voice service. After the voice service of the UE ends, an eNB may determine, based on the first indication information, that the UE needs to be returned to the 5G network. Certainly, the eNB may alternatively choose not to return the UE to the 5G network. The second indication information is used to indicate that the UE needs to be returned to the 5G network after the voice service ends, and indicate, to the SMF+PGW-C, that the UE needs to be returned to the 5G network after the voice service ends. Specifically, the UE may be returned to an NG RAN connected to a 5G core network, that is, the UE is instructed to be handed over to an RAT in which the UE is previously located. Further, the second indication information may further specifically indicate that the RAT in which the UE is located before the handover is the NG RAN.

In some other implementations of this application, the first indication information is used to indicate that a terminal device moves from a first network to a second network to set up a voice service. In this manner, an access network device of the first network indicates a moving operation of the terminal device based on only the first indication information, but does not specifically indicate that a specific manner of the moving operation is a handover.

309. The AMF sends, to the SMF+PGW-C based on the received N2 session response, a session management response that carries a PDU session modification command, where the second SM information is transparently transmitted to the SMF+PGW-C.

It should be noted that, if a point-to-point interface based interoperation is performed between 5G core network elements, the AMF may send the session management response that carries the PDU session modification command or may send a tunnel setup response message to the SMF+PGW-C. Certainly, if a service interface based interoperation is performed between 5G core network elements, the AMF may send a session management context update service request to the SMF+PGW-C.

In addition, the tunnel setup response message is a first message in the "receiving, by the session management network element, a first message or a first service request from the access management network element" in the embodiments of this application, and the session management context update service request is a first service request in the "receiving, by the session management network element, a first message or a first service request from the access management network element" in the embodiments of this application.

310A. The SMF+PGW-C sends an N4 session modification request to a UPF+PGW-U based on the received session management response that is sent from the AMF and that carries the PDU session modification command, so that the UPF+PGW-U sets up the user plane tunnel for the voice session of the UE.

It should be noted that, if the second SM information includes the information indicating that setup of the user plane tunnel of the IMS voice service is accepted, the SMF+PGW-C performs step 310A of sending the N4 session modification request to the UPF+PGW-U based on the received session management response from the AMF, to set up the user plane tunnel in the 5G network for the UE. Otherwise, the SMF+PGW-C performs step 310B.

N4 herein is an N4 interface between the SMF+PGW-C and the UPF+PGW-U. However, a name of the interface is not limited in this embodiment of this application, that is, the message name is not limited to the N4 session modification request. The N4 session modification request carries packet detection, an enforcement rule, a reporting rule, core network tunnel information, and the like that are related to the user plane tunnel with 5QI=1, so that the UPF+PGW-U can set up a corresponding core network tunnel for the user plane tunnel with 5QI=1.

Further, the UPF+PGW-U receives the N4 session modification request from the SMF+PGW-C, and sets up the corresponding core network tunnel for the user plane tunnel with 5QI=1 based on the N4 session modification request.

It should be noted that a user plane tunnel in the 5G network is usually a QoS flow used to transmit user plane data, and a user plane tunnel in the EPS network (namely, the 4G network) is usually a bearer used to transmit user plane data. After the UPF+PGW-U sets up a corresponding user plane tunnel for the user plane tunnel with 5QI=1, in a process of handing over the UE from the 5G network to the EPS network, the user plane tunnel is also switched, that is, a QoS flow with 5QI=1 is switched to a dedicated bearer with QCI=1.

Specifically, the SMF+PGW-C may determine, by using a received tunnel modification request from an SGW, that the user plane tunnel of the UE has been switched from the QoS flow with 5QI=1 in the 5G network to the bearer with QCI=1 in the EPS network, and that a user plane tunnel with QCI=1 has been successfully set up. After the UE is handed over from the 5G network to the EPS network, and the UE receives signaling that is related to the IMS voice service and that is forwarded by the EPS network, the UE continues to perform a subsequent IMS voice call setup procedure in the EPS network, thereby completely setting up the IMS voice session.

310B. The SMF+PGW-C re-sets up a user plane tunnel for the IMS voice service of the UE in the EPS network.

That is, when the second SM information in step 308 includes the information indicating that setup of the user plane tunnel of the IMS voice service is rejected, if the SMF+PGW-C determines that the reject cause value is that the UE is performing a handover, the SMF+PGW-C does not need to initiate the N4 session modification request to the UPF+PGW-U, but determines, based on the cause value, to re-set up the user plane tunnel for the IMS voice service of the UE in the EPS network after the UE is handed over from the 5G network to the EPS network.

It should be noted that re-setting up the user plane tunnel for the IMS voice service of the UE in the EPS network is setting up the user plane tunnel with QCI=1 for the IMS voice service of the UE.

In the process of handing over the UE from the 5G network to the EPS network, the SMF+PGW-C may determine, by receiving the tunnel modification request from the SGW, that the UE has been successfully handed over from the 5G network to the EPS network. In addition, the SMF+PGW-C may further set a timer to trigger the timer to perform timing starting from a moment of receiving the second SM information. After the timing of the timer ends, the SMF+PGW-C determines that the UE has been successfully handed over from the 5G network to the EPS network.

Step 310A or step 310B is performed, so that the user plane tunnel of the voice service of the UE is either switched to that in the EPS network after being set up in the 5G network or directly set up in the EPS network. However, regardless of whether step 310A or step 310B is performed, the user plane tunnel of the voice service of the UE can be finally set up in the EPS network. This helps the UE subsequently execute the voice service in the EPS network after the UE is handed over to the EPS network.

It should be noted that, in some implementations, step 310B can be performed only after the UE accesses the 4G network.

In some other embodiments of this application, the SMF+PGW-C sends a user plane tunnel setup request message of the voice service to an E-UTRAN by using the SGW and an MME, where the user plane tunnel setup request message carries the first indication information and/or the second indication information. The tunnel setup request may be a bearer setup request. Specifically, the SMF+PGW-C sends, to the SGW based on the first indication information and/or the second indication information received in step 308 and step 309, the tunnel setup request that carries the first indication information and/or the second indication information, so that the first indication information and/or the second indication information can be transmitted to the E-UTRAN (which may be specifically the eNB) by using the SGW and the MME.

In some embodiments, if the 5G network in which the UE initiates the voice service and the EPS network in which the UE actually executes the voice service after the handover do not belong to a same PLMN, the SMF+PGW-C may add a last PLMN ID to the user plane tunnel setup request of the voice service, that is, an ID of a PLMN to which the 5G network that the UE camps on before the UE is handed over to the EPS network belongs, to instruct the eNB to return the UE to the network in which the UE is previously located.

311. The NG RAN sends a handover request to the AMF based on the received first SM information and the first condition, to trigger the UE to be handed over from the 5G network to the EPS network.

In other words, after the user plane tunnel in the EPS network is set up for the voice service of the UE, the NG RAN may trigger the UE to be handed over from the 5G network to the EPS network.

In specific implementation, if the first condition is met, the NG RAN may send the handover request to the AMF when determining, based on the first SM information, that a user plane tunnel with 5QI=1 needs to be set up.

For a handover procedure in which the UE is handed over from the 5G network to the EPS network, refer to a standard protocol. Details are not described herein. After the UE is handed over from the 5G network to the EPS network, and the UE receives signaling that is related to the IMS voice service and that is forwarded by the EPS network, the UE continues to perform a subsequent IMS voice call setup procedure in the EPS network, thereby completely setting up the IMS voice session. It should be noted that, in some other implementations, the NG RAN may send the handover request to the AMF based on only the received first SM information, to trigger the UE to be handed over from the 5G network to the EPS network, in other words, the first condition may not be considered. For example, the NG RAN may send the handover request to the AMF when determining, based on the first SM information, that a user plane tunnel with 5QI=1 needs to be set up.

In some embodiments, after the UE is handed over from the 5G network to the EPS network, the eNB may send handover notification information to the MME to notify the MME that the UE has been handed over to the EPS network, and the eNB may correspondingly receive a path handover response message from the MME, where the path handover response is used to respond to the handover notification information. It should be noted that, in this case, the MME may further send the first indication information and/or the second indication information to the eNB by using the path handover response message, where the first indication information and/or the second indication information are/is received by the SMF/PGW-C in step 308 and are/is sent to the MME by using the SGW.

312. After the IMS voice service of the UE in the EPS network ends, the SMF/PGW-C initiates a dedicated bearer release procedure of the voice service.

The dedicated bearer release procedure may specifically include the following three steps:

312A. The SMF+PGW-C sends a tunnel release request to the SGW, where the tunnel release request carries the first indication information and/or the second indication information.

Specifically, the SMF+PGW-C sends, to the SGW based on the first indication information and/or the second indication information received in step 308 and step 309, the tunnel release request that carries the first indication information and/or the second indication information, so that the first indication information and/or the second indication information can be transmitted to the E-UTRAN (which may be specifically the eNB) by using the SGW and the MME.

In addition, the tunnel release request may be a delete bearer request, and is used to request to release the user plane tunnel of the voice service, that is, request to release the dedicated bearer with QCI=1.

In some embodiments, if the 5G network in which the UE initiates the voice service and the EPS network in which the UE actually executes the voice service after the handover do not belong to a same PLMN, the SMF+PGW-C may add a last PLMN ID to a user plane tunnel release request of the voice service, that is, an ID of a PLMN to which the 5G network that the UE camps on before the UE is handed over to the EPS network belongs, to instruct the eNB to hand over the UE to the network in which the UE is previously located.

312B. The SGW sends the tunnel release request of the voice service to the MME, where the tunnel release request carries the first indication information and/or the second indication information.

312C. The MME sends the tunnel release request of the voice service to the eNB, where the tunnel release request carries the first indication information and/or the second indication information.

In some embodiments, if the 5G network in which the UE initiates the voice service and the EPS network in which the UE actually executes the voice service after the handover do not belong to a same PLMN, and the tunnel release request received by the MME does not include the last PLMN ID, the MME may add the last PLMN ID to the user plane tunnel release request of the voice service, to instruct the eNB to hand over the UE to the network in which the UE is previously located.

313. The eNB receives the tunnel release request from the MME, and releases a radio resource corresponding to the dedicated bearer with QCI=1, and the eNB determines, based on the first indication information and/or the second indication information carried in the tunnel release request message, that the UE needs to be returned to the NG RAN.

Preferably, if the tunnel release request received by the eNB carries the last PLMN ID, the eNB may further determine, based on the last PLMN ID, to specifically return the UE to the NG RAN whose identifier is the last PLMN ID.

In some other embodiments of the present invention, it is not specified that the eNB certainly determines, based on the first indication information and/or the second indication information carried in the tunnel release request message, that the UE needs to be returned to the NG RAN. The eNB may obtain the first indication information and/or the second indication information in another manner to determine that the UE needs to be returned to the NG RAN. For example, the eNB may determine, based on the first indication information and/or the second indication information in the tunnel setup request message, that the UE needs to be returned to the NG RAN.

314. The eNB returns the UE to the NG RAN.

Specific returning manners of the eNB may include but are not limited to the following two manners:

(1) The eNB sends redirection information to the UE, and returns the UE to the NG RAN by using the redirection information. Specifically, the redirection information includes frequency information, cell information, and the like of the NG RAN to which the UE needs to be returned (for details, refer to the 3GPP standard protocol). In some other embodiments, the eNB may further add the redirection information to an RRC connection release message and send the RRC connection release message to the UE.

(2) The eNB returns the UE to the NG RAN in a handover manner. Specifically, for a handover procedure in which the eNB instructs the EPS network side to trigger the UE to be handed over to an NG RAN target cell, refer to the 3GPP protocol. Details are not described herein.

This embodiment provides the network handover method, so that the UE can return to the NG RAN after the UE falls back from the NG RAN to the E-UTRAN to execute the voice service. In this way, a user can make full use of a faster and more stable network provided by the NG RAN, to obtain better PS service user experience. Specifically, in a process of setting up the user plane tunnel for the voice service of the UE, the NG RAN may notify the SMF+PGW-C of the first indication information and/or the second indication information. After the voice service of the UE ends, the SMF+PGW-C notifies the eNB of the first indication information and/or the second indication information in a bearer release process, so that the eNB can return the UE from the 4G network to the 5G network.

In addition, the SMF+PGW-C remains unchanged in the process in which the UE moves from the 5G network to the 4G network. Therefore, in this embodiment, the NG RAN transmits the first indication information and/or the second indication information to the E-UTRAN by using the SMF/PGW-C. This is more conducive to uniform transmission of the returned information and avoids transmission of the returned information between network elements due to the movement of the UE.

Figure 11A:
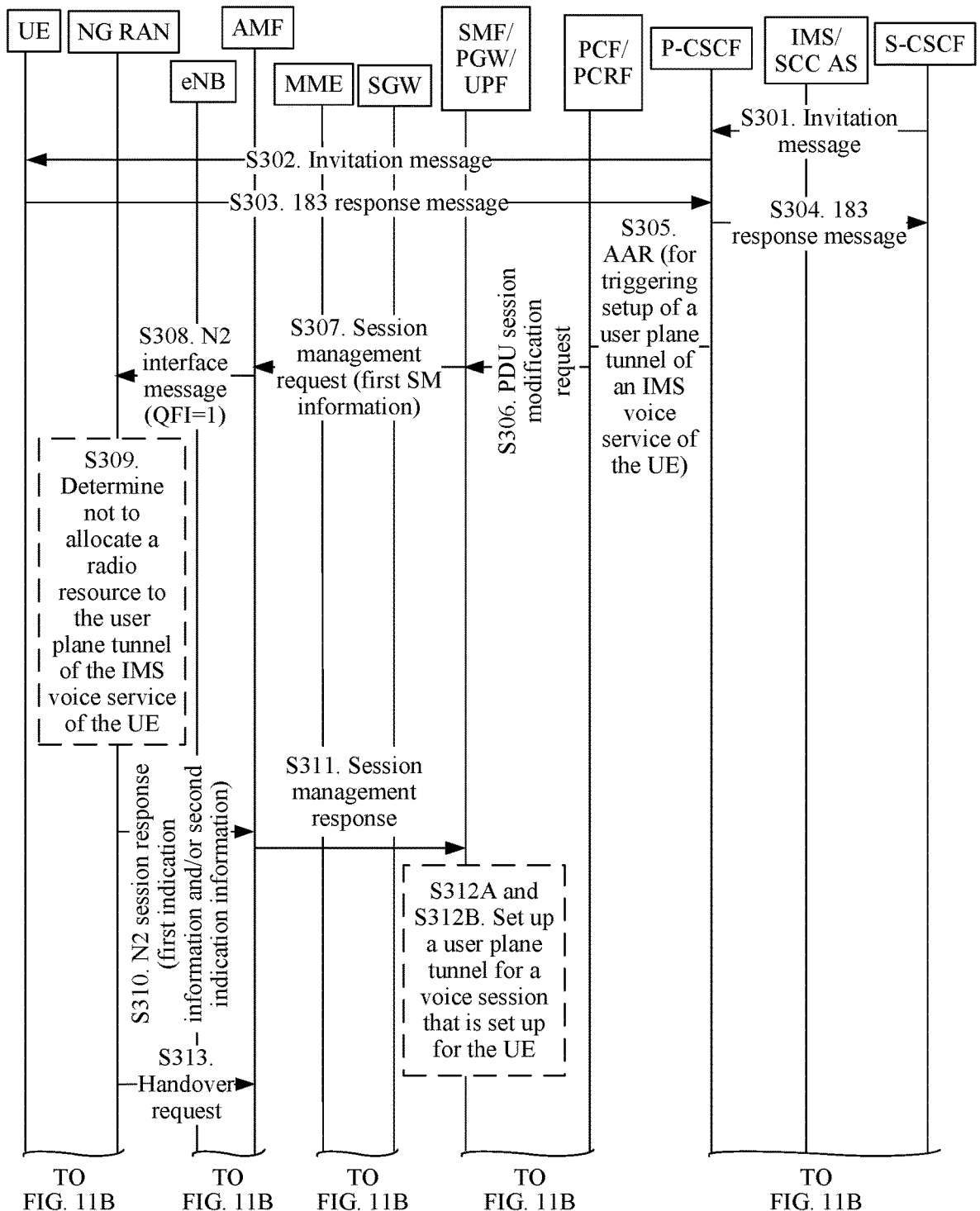
Figure 11B:
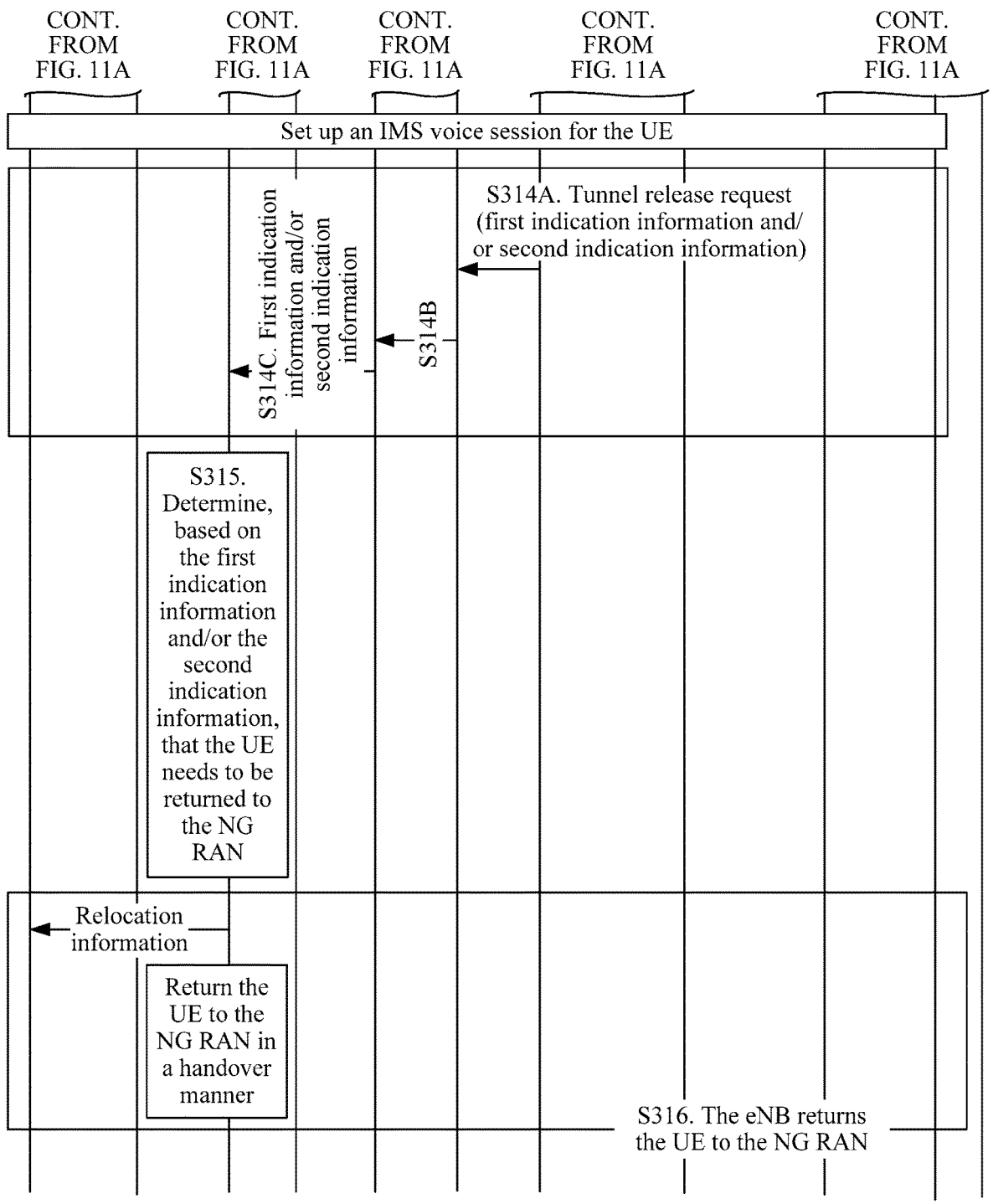

It should be noted that, an embodiment of this application further provides a network handover method, so that terminating UE can be handed over to a 5G network after the terminating UE moves from the 5G network to a 4G network to execute a voice service. As shown in FIG. 11A and FIG. 11B, the method includes the following steps.

S301. A terminating P-CSCF receives an invitation message from a terminating S-CSCF, and sets up an IMS voice session for the UE based on the invitation message.

The invitation message is a message used to request to set up a voice service in a PS domain for the terminating UE in the 5G network.

S302. The terminating P-CSCF sends the invitation message to the UE.

S303. The UE receives the invitation message from the terminating P-CSCF, and returns a 183 response message to the terminating P-CSCF.

S304. The terminating P-CSCF receives the 183 response message from the UE, and sends the 183 response message to the terminating S-CSCF.

It should be noted that the terminating S-CSCF may further send the 183 response message to an originating S-CSCF, and the originating S-CSCF further sends the 183 response message to an originating P-CSCF. If the originating P-CSCF receives the 183 response message from the originating S-CSCF, the originating P-CSCF may forward the 183 response message to originating UE.

Further, the terminating P-CSCF may trigger a procedure of handing over the terminating UE to the 4G network, further set up a dedicated bearer of the 4G network for the voice service of the terminating UE, and return the UE to the 5G network after the voice service ends. Specifically, steps S305 to S316 may be included.

It should be noted that steps S305 to S316 respectively correspond to steps 303 to 314, that is, step S305 is the same as step 303, step S306 is the same as step 304, and by analogy, step S316 is the same as step 314. Meanings of the following similar descriptions are the same.

Figure 12A:
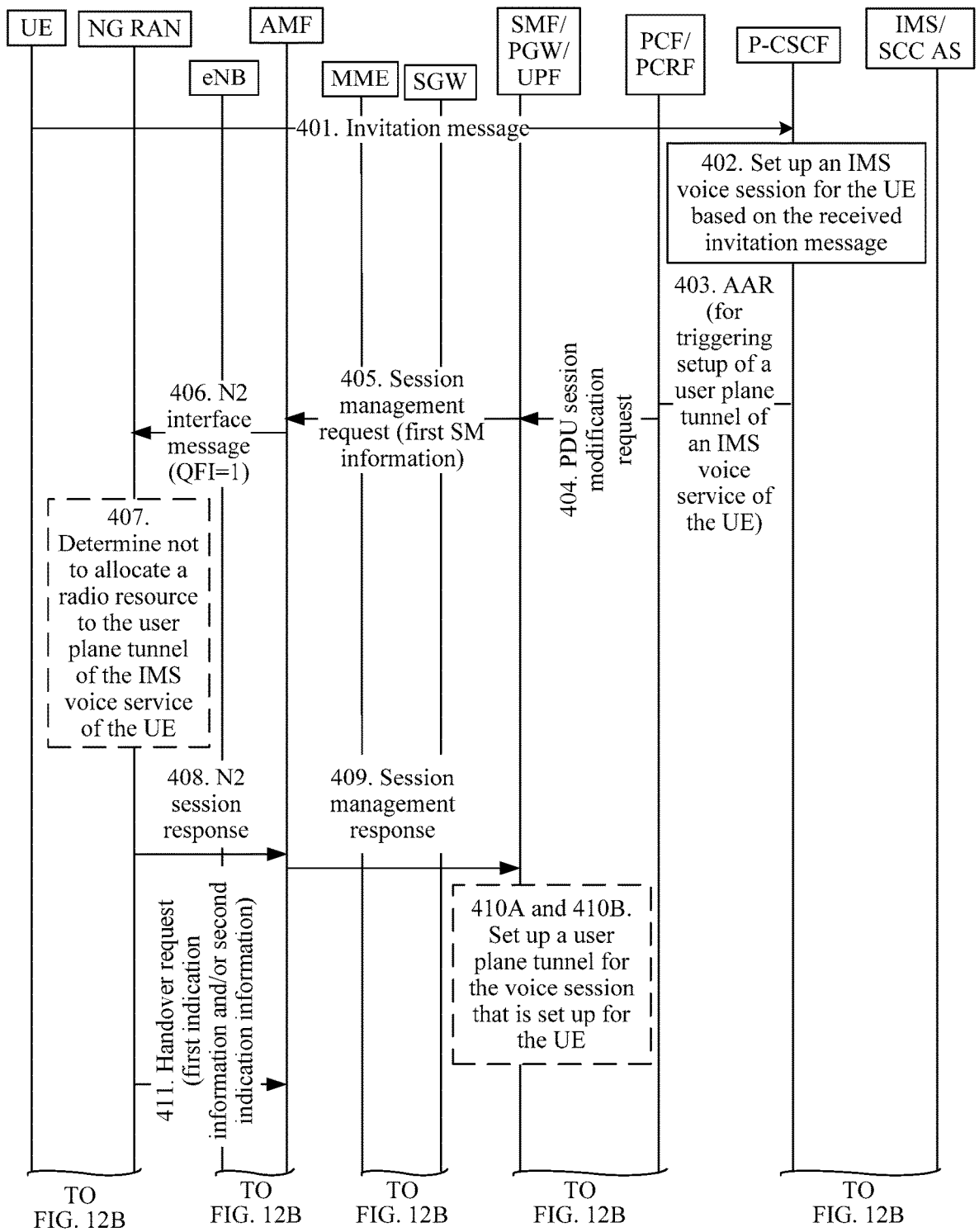
Figure 12B:
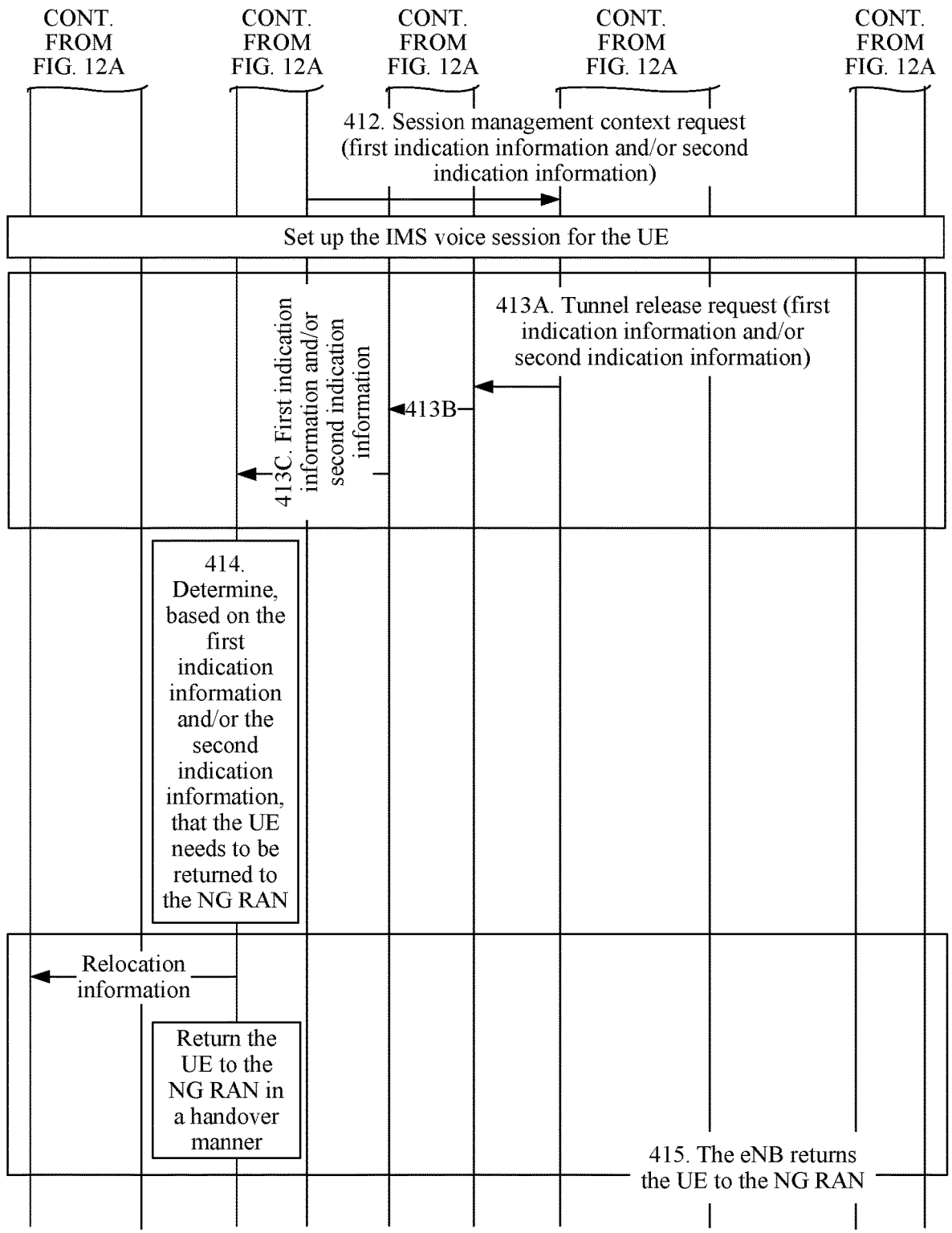

When the network handover method provided in this embodiment of this application is applied to the network shown in FIG. 3 (or applied to the 5G network shown in FIG. 1 and the 4G network shown in FIG. 2), UE (originating UE) may be handed over from an NG RAN connected to a 5G core network to an E-UTRAN connected to a 4G core network. Further, as shown in FIG. 12A and FIG. 12B, a network handover method provided in an embodiment of this application specifically includes the following steps.

Steps 401 to 407 are the same as steps 301 to 307 in the embodiments of this application. That is, step 401 is the same as step 301, step 402 is the same as step 302, and so on.

408. The NG RAN sends an N2 session response to the AMF.

The N2 session response includes second SM information, and the second SM information includes information indicating that setup of the user plane tunnel of the IMS voice service of the UE is accepted.

Alternatively, the second SM information includes information indicating that setup of the user plane tunnel of the IMS voice service of the UE is rejected, and carries reject cause information. The cause information may be that the UE is performing a handover procedure. Further, the cause information may be that the UE is performing a handover from the 5G network to the EPS network, so that the SMF+PGW-C determines, based on the cause information after the handover procedure of the UE ends, to re-initiate a request of setting up the user plane tunnel of the IMS voice service of the UE.

Different from step 308, the N2 session response from the NG RAN to the AMF does not include first indication information and/or second indication information. In some other implementations, the N2 session response may alternatively include the first indication information and/or the second indication information.

Steps 409 and 410 are the same as steps 309 and 310 in the embodiments of this application.

In this case, a user plane tunnel in the EPS network is set up for the voice service of the UE, which may be specifically a dedicated bearer with QCI=1. Then, the UE needs to be handed over from the 5G network to the 4G network (the EPS network) to execute the voice service.

411. The NG RAN sends a handover request to the AMF based on the received first SM information, to trigger the UE to be handed over from the 5G network to the EPS network, where the handover request carries the first indication information and/or the second indication information.

Specifically, it is determined, based on the received first SM information, that the UE needs to be handed over from the 5G network to the 4G network. The first indication information is used to indicate that the UE is handed over from the 5G network to the 4G network to set up a voice service, that is, the first indication information is used to indicate, to the SMF+PGW-C, that a forthcoming handover procedure is initiated to set up the voice service. After the voice service of the UE ends, an eNB may determine, based on the first indication information, that the UE needs to be returned to the 5G network. Certainly, the eNB may alternatively choose not to return the UE to the 5G network. The second indication information is used to indicate that the UE needs to be returned to the 5G network after the voice service ends, and indicate, to the SMF+PGW-C, that the UE needs to be returned to the 5G network after the voice service ends. Specifically, the UE may be returned to an NG RAN connected to a 5G core network, that is, the UE is instructed to be handed over to an RAT in which the UE is previously located. Further, the second indication information may further specifically indicate that the RAT in which the UE is located before the handover is the NG RAN.

Specifically, the second indication information may include a fast return indicator, but does not carry an identifier of the NG RAN that the UE previously camps on. The SMF/PGW-C may determine, based on the fast return indicator, that the UE needs to be returned to the previous NG RAN, and further determine, based on an RAT locally stored in the SMF, a specific NG RAN to which the UE needs to be returned.

Optionally, the NG RAN sends the handover request to the AMF only when determining that the first condition is met.

Specifically, the first condition may include at least one of the following conditions: The IMS voice service cannot be executed in the 5G network. A reason may be that the IMS voice service is not deployed in the 5G network, or current signal coverage of the 5G network is poor and cannot meet a requirement of the IMS voice service, or it is preconfigured that the 5G network does not support the IMS voice service, and the IMS notifies that the 5G network does not support the IMS voice service.

412. After receiving the handover request message, the AMF sends a session management context request to the SMF+PGW-C, where the session management context request carries the first indication information and/or the second indication information.

Specifically, in a scenario in which a point-to-point interface based interoperation is performed between 5G core network elements, the AMF may send the session management context request to the SMF+PGW-C, where the session management context request carries the first indication information and/or the second indication information.

In a scenario in which a service interface based interoperation is performed between 5G core network elements, the AMF may send a session management context service provision request to the SMF+PGW-C, where the session management context service provision request carries the first indication information and/or the second indication information.

It should be noted that the session management context request is a second message in the "receiving, by the session management network element, a second message or a second service request from the access management network element" in the embodiments of this application, and the session management context service provision request is a second service request in the "receiving, by the session management network element, a second message or a second service request from the access management network element" in the embodiments of this application.

Then, the UE is handed over from the 5G network to the EPS network to execute the voice service. For another operation step of the handover procedure of the UE, refer to a standard protocol. Details are not described herein. After the UE is handed over from the 5G network to the EPS network, and the UE receives signaling that is related to the IMS voice service and that is forwarded by the EPS network, the UE continues to perform a subsequent IMS voice call setup procedure in the EPS network, thereby completely setting up the IMS voice session.

In some other possible implementations, after the UE is handed over from the 5G network to the EPS network, the eNB may send handover notification information to the MME to notify the MME that the UE has been handed over to the EPS network, and the eNB may correspondingly receive a path handover response message from the MME, where the path handover response is used to respond to the handover notification information. It should be noted that, in this case, the MME may further send the first indication information and/or the second indication information to the eNB by using the path handover response message, where the first indication information and/or the second indication information are/is received by the SMF/PGW-C in step 412 and are/is sent to the MME by using the SGW.

In some other possible implementations, after the UE accesses the EPS network, the SMF/PGW-C re-triggers, in the EPS network, a procedure of setting up a voice user plane tunnel for the UE.

The SMF+PGW-C sends a user plane tunnel setup request message of the voice service to an E-UTRAN by using the SGW and the MME, where the user plane tunnel setup request message carries the first indication information and/or the second indication information. Specifically, the SMF+PGW-C sends, to the SGW based on the first indication information and/or the second indication information received in step 412, the tunnel setup request that carries the first indication information and/or the second indication information, so that the first indication information and/or the second indication information can be transmitted to the E-UTRAN (which may be specifically the eNB) by using the SGW and the MME. In addition, the tunnel setup request may be a bearer setup request. It should be noted that re-setting up the user plane tunnel for the IMS voice service of the UE in the EPS network is setting up the user plane tunnel with QCI=1 for the IMS voice service of the UE.

In some embodiments, if the 5G network in which the UE initiates the voice service and the EPS network in which the UE actually executes the voice service after the handover do not belong to a same PLMN, the SMF+PGW-C may add a last PLMN ID to the user plane tunnel setup request of the voice service, that is, an ID of a PLMN to which the 5G network that the UE camps on before the UE is handed over to the EPS network belongs, to instruct the eNB to return the UE to the network in which the UE is previously located.

413. After the IMS voice service of the UE in the EPS network ends, the SMF/PGW-C initiates a release procedure of the dedicated bearer with QCI=1.

The dedicated bearer release procedure may specifically include the following three steps:

413A. The SMF+PGW-C sends a tunnel release request to the SGW, where the tunnel release request carries the first indication information and/or the second indication information.

Specifically, the SMF+PGW-C sends, to the SGW based on the first indication information and/or the second indication information received in step 412, the tunnel release request that carries the first indication information and/or the second indication information, so that the first indication information and/or the second indication information can be transmitted to the E-UTRAN (which may be specifically the eNB) by using the SGW and the MME.

In addition, the tunnel release request may be a delete bearer request, and is used to request to release the user plane tunnel with QCI=1, that is, request to release the dedicated bearer with QCI=1.

In some embodiments, if the 5G network in which the UE initiates the voice service and the EPS network in which the UE actually executes the voice service after the handover do not belong to a same PLMN, the SMF+PGW-C may add a last PLMN ID to a user plane tunnel release request of the voice service, that is, an ID of a PLMN to which the 5G network that the UE camps on before the UE is handed over to the EPS network belongs, to instruct the eNB to hand over the UE to the network in which the UE is previously located.

413B. The SGW sends the tunnel release request of the voice service to the MME, where the tunnel release request carries the first indication information and/or the second indication information.

413C. The MME sends the tunnel release request of the voice service to the eNB, where the tunnel release request carries the first indication information and/or the second indication information.

In some embodiments, if the 5G network in which the UE initiates the voice service and the EPS network in which the UE actually executes the voice service after the handover do not belong to a same PLMN, and the tunnel release request received by the MME does not include the last PLMN ID, the MME may add the last PLMN ID to the user plane tunnel release request of the voice service, to instruct the eNB to hand over the UE to the network in which the UE is previously located.

414. The eNB receives the tunnel release request from the MME, and releases a radio resource corresponding to the dedicated bearer with QCI=1, and the eNB determines, based on the first indication information and/or the second indication information carried in the tunnel release request message, that the UE needs to be returned to the NG RAN.

Preferably, if the tunnel release request received by the eNB carries the last PLMN ID, the eNB may further determine, based on the last PLMN ID, to specifically return the UE to the NG RAN whose identifier is the last PLMN ID.

415. The eNB returns the UE to the NG RAN.

Specific returning manners of the eNB may include but are not limited to the following two manners:

(1) The eNB sends redirection information to the UE, and returns the UE to the NG RAN by using the redirection information. Specifically, the redirection information includes frequency information, cell information, and the like of the NG RAN to which the UE needs to be returned (for details, refer to the 3GPP standard protocol). In some other embodiments, the eNB may further add the redirection information to an RRC connection release message and send the RRC connection release message to the UE.

(2) The eNB returns the UE to the NG RAN in a handover manner. Specifically, for a handover procedure in which the eNB instructs the EPS network side to trigger the UE to be handed over to an NG RAN target cell, refer to the 3GPP protocol. Details are not described herein.

In the network handover method provided in this embodiment of this application, in the process of handing over the UE from the 5G network to the 4G network, the NG RAN may notify the SMF+PGW-C of the first indication information and/or the second indication information by using the handover request. After the voice service of the UE ends, the SMF+PGW-C notifies the eNB of the first indication information and/or the second indication information in a bearer release process, so that the eNB can return the UE from the 4G network to the 5G network.

It should be noted that in a scenario in which the UE falls back from a 5G network connected to an NG RAN to a 4G network connected to an E-UTRAN to execute a voice service, after the voice service of the UE ends, the UE may be handed over, by using the method shown in FIG. 12A and FIG. 12B, to the 5G network connected to the NG RAN. Different from steps 401 to 414, in step 411, the NG RAN sends the handover request to a T-AMF (that is, the AMF connected to the E-UTRAN in the 5G network). In step 412, after receiving the handover request message, the T-AMF forwards the first indication information and/or the second indication information to the SMF+PGW-C.

Figure 13A:
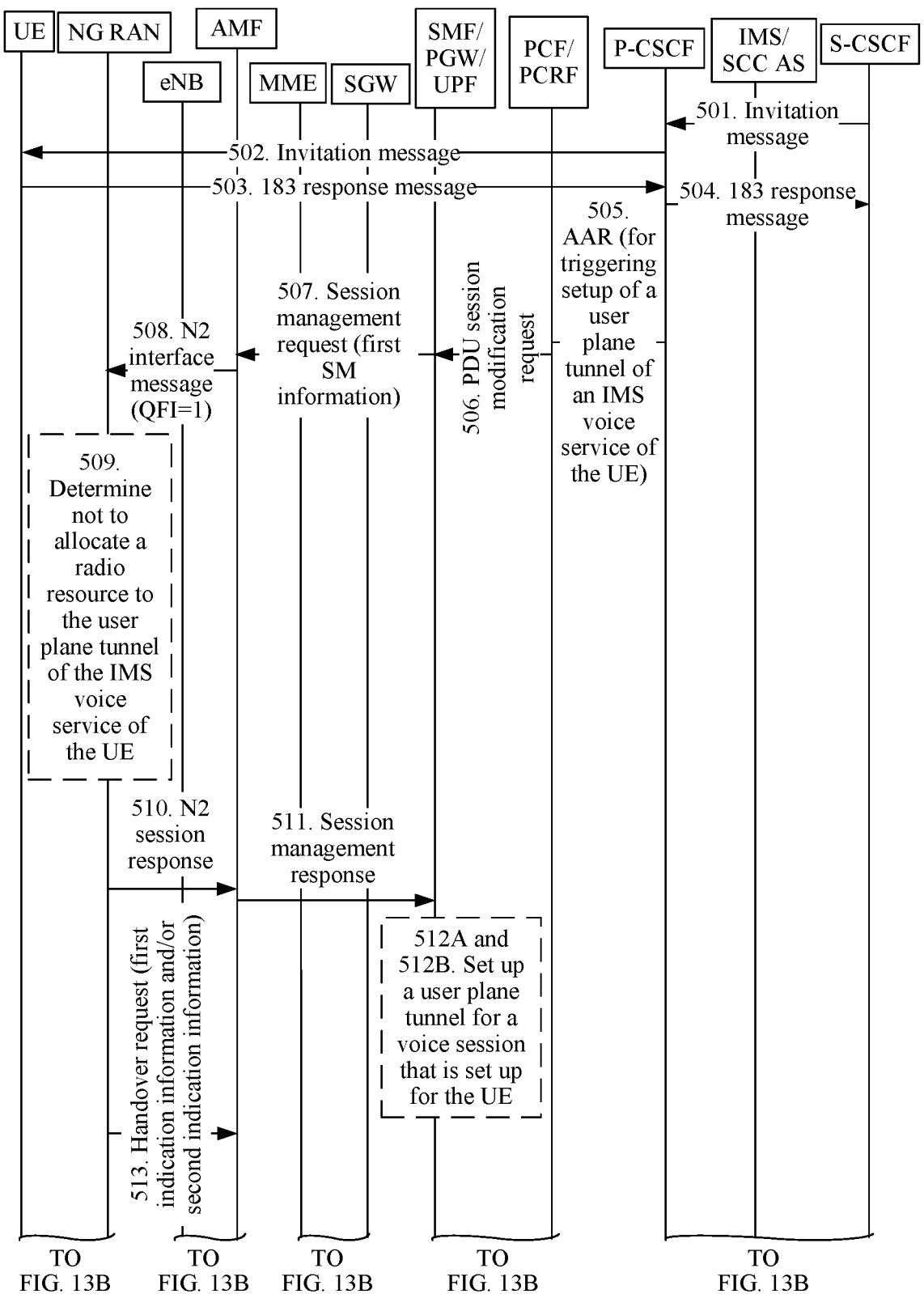
Figure 13B:
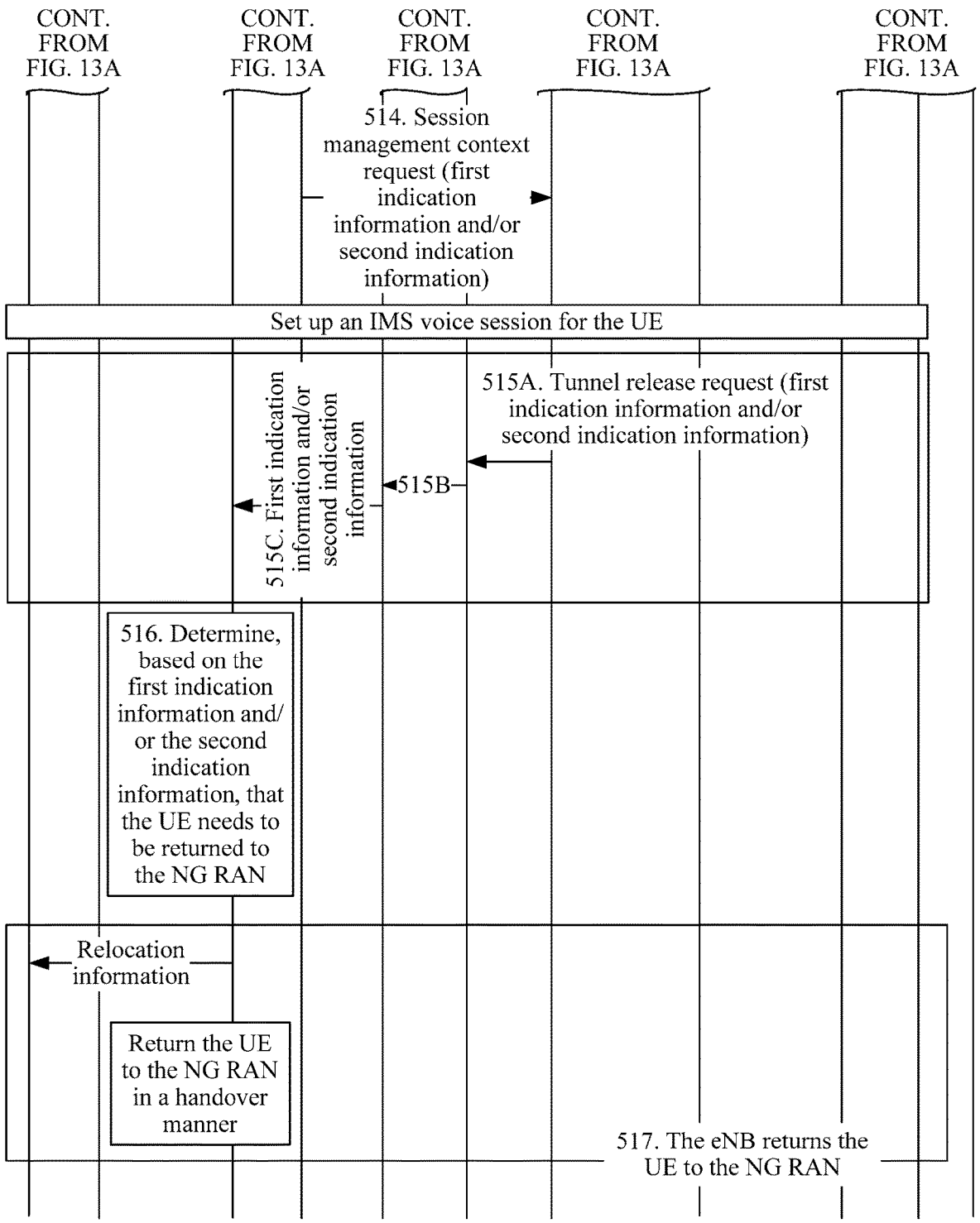

An embodiment of this application further provides a network handover method, so that terminating UE can be handed over to a 5G network after the terminating UE is handed over from the 5G network to a 4G network to execute a voice service. As shown in FIG. 13A and FIG. 13B, the method includes the following steps.

501. A terminating P-CSCF receives an invitation message from a terminating S-CSCF, and sets up an IMS voice session for the UE based on the invitation message.

The invitation message is a message used to request to set up a voice service in a PS domain for the terminating UE in the 5G network.

502. The terminating P-CSCF sends the invitation message to the UE.

503. The UE receives the invitation message from the terminating P-CSCF, and returns a 183 response message to the terminating P-CSCF.

504. The terminating P-CSCF receives the 183 response message from the UE, and sends the 183 response message to the terminating S-CSCF.

It should be noted that the terminating S-CSCF may further send the 183 response message to an originating S-CSCF, and the originating S-CSCF further sends the 183 response message to an originating P-CSCF. If the originating P-CSCF receives the 183 response message from the originating S-CSCF, the originating P-CSCF may forward the 183 response message to originating UE.

Further, the terminating P-CSCF may trigger a procedure of handing over the terminating UE to the 4G network, further set up a dedicated bearer of the 4G network for the voice service of the terminating UE, and return the UE to the 5G network after the voice service ends. Specifically, steps 505 to 517 may be included.

It should be noted that steps 505 to 517 respectively correspond to steps 403 to 415, that is, step 505 is the same as step 403, step 506 is the same as step 404, and by analogy, step 517 is the same as step 415. Meanings of the following similar descriptions are the same.

Figure 14A:
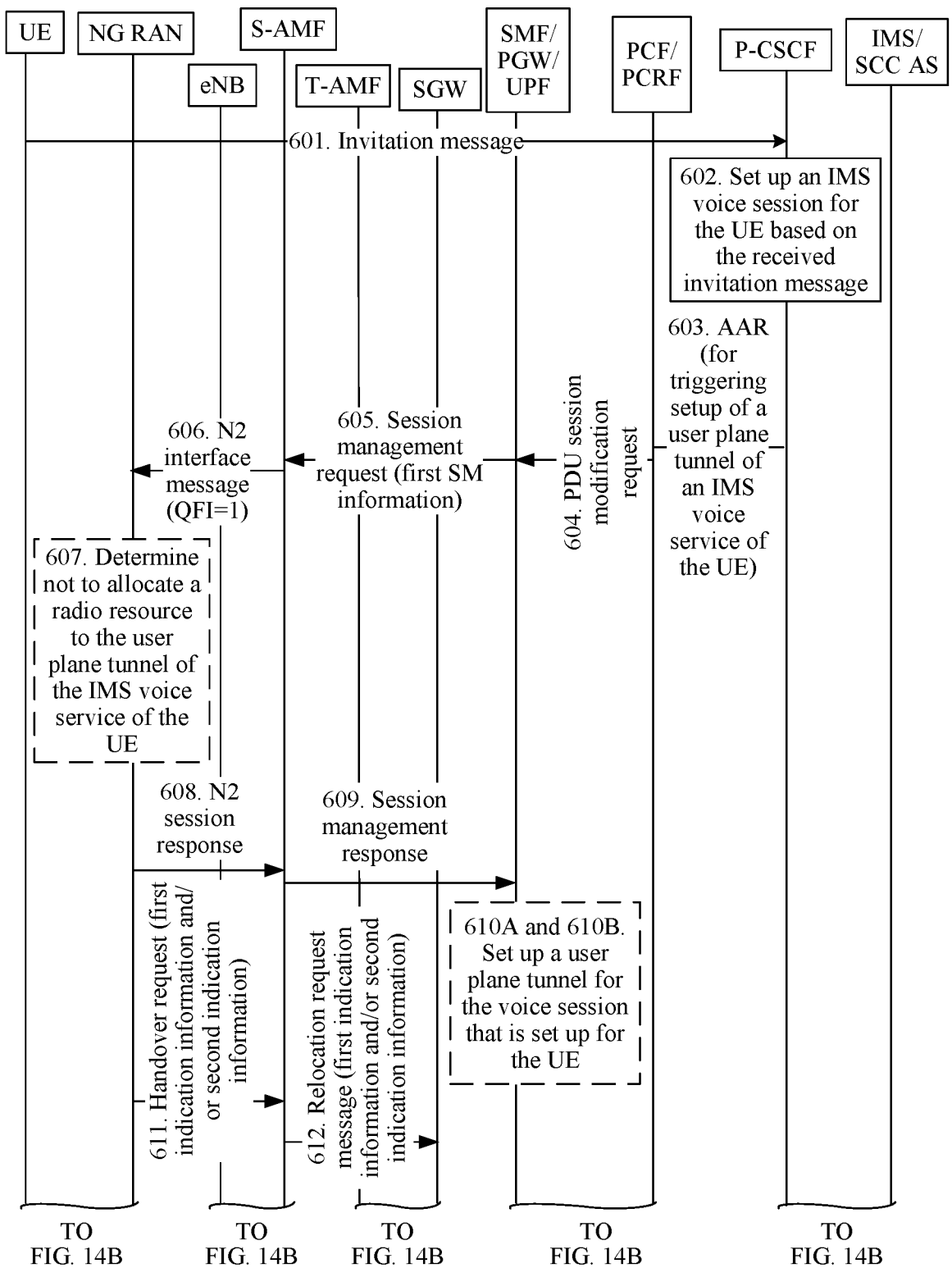
Figure 14B:
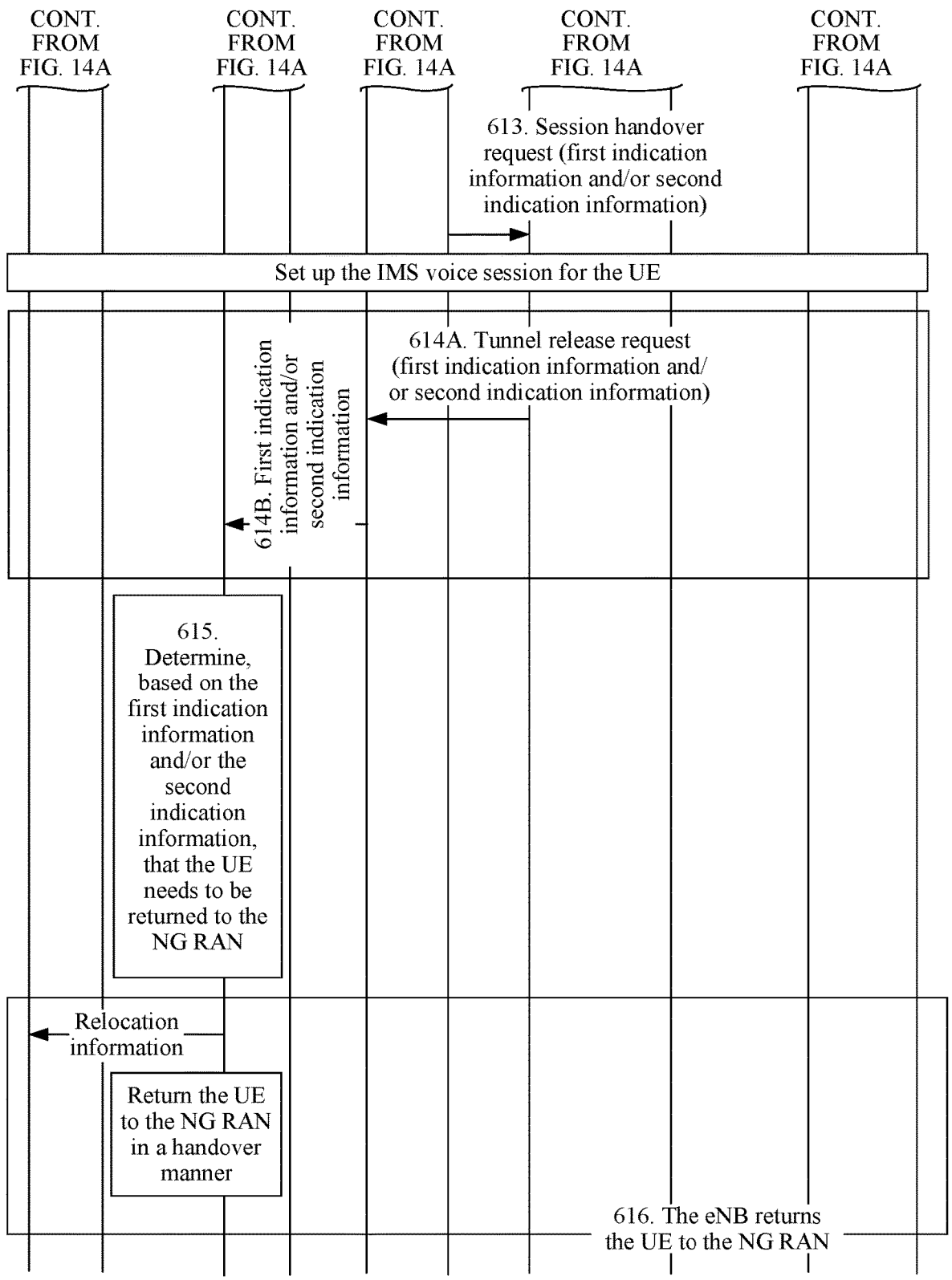

When the network handover method provided in this embodiment of this application is applied to the network shown in FIG. 4, UE (originating UE) may be handed over from an NG RAN connected to a 5G core network to an E-UTRAN connected to a 5G core network. Further, as shown in FIG. 14A and FIG. 14B, a network handover method provided in an embodiment of this application specifically includes the following steps.

Steps 601 to 607 are the same as steps 301 to 307 in the embodiments of this application. That is, step 601 is the same as step 301, step 602 is the same as step 302, and so on.

608. The NG RAN sends an N2 session response to the AMF.

The N2 session response includes second SM information, and the second SM information includes information indicating that setup of the user plane tunnel of the IMS voice service of the UE is accepted.

Alternatively, the second SM information includes information indicating that setup of the user plane tunnel of the IMS voice service of the UE is rejected, and carries reject cause information. The cause information may be that the UE is performing a handover procedure. Further, the cause information may be that the UE is performing an inter-5G network handover, so that the SMF+PGW-C determines, based on the cause information after the handover procedure of the UE ends, to re-initiate a request of setting up the user plane tunnel of the IMS voice service of the UE.

Different from step 308, the N2 session response from the NG RAN to the AMF does not include first indication information and/or second indication information.

Steps 609 and 610 are the same as steps 309 and 310 in the embodiments of this application.

In this case, a user plane tunnel in the 5G network is set up for the voice service of the UE, which may be specifically a dedicated bearer with 5QI=1. Subsequently, the UE needs to perform an inter-5G network handover procedure.

611. The NG RAN sends a handover request to an S-AMF based on the received first SM information, to trigger the UE to perform the inter-5G network handover procedure, where the handover request carries the first indication information and/or the second indication information.

Specifically, it is determined, based on the received first SM information, that the UE needs to perform the inter-5G network handover. The first indication information is used to indicate that the handover procedure of the UE is used to set up a voice service, that is, the first indication information is used to indicate, to the SMF+PGW-C, that a forthcoming handover procedure is initiated to set up the voice service. After the voice service of the UE ends, an eNB may determine, based on the first indication information, that the UE needs to be returned to the NG RAN (which may be specifically a gNB). The second indication information is used to indicate that the UE needs to be returned to the NG RAN after the voice service ends, and indicate, to the SMF+PGW-C, that the UE needs to be returned to the NG RAN after the voice service ends. Specifically, the UE may be returned to an NG RAN connected to a 5G core network, that is, the UE is instructed to be handed over to an RAT in which the UE is previously located. Further, the second indication information may further specifically indicate that the RAT in which the UE is located before the handover is the NG RAN.

Specifically, the second indication information may include a fast return indicator, but does not carry an identifier of the NG RAN that the UE previously camps on. The SMF/PGW-C may determine, based on the fast return indicator, that the UE needs to be returned to the previous NG RAN, and further determine, based on an RAT locally stored in the SMF, a specific NG RAN to which the UE needs to be returned.

Optionally, the NG RAN sends the handover request to the S-AMF only when determining that the first condition is met.

Specifically, the first condition may include at least one of the following conditions: The IMS voice service cannot be executed in the 5G network. A reason may be that the IMS voice service is not deployed in the 5G network, or current signal coverage of the 5G network is poor and cannot meet a requirement of the IMS voice service, or it is preconfigured that the 5G network does not support the IMS voice service, and the IMS notifies that the 5G network does not support the IMS voice service.

612. After receiving the handover request message, the S-AMF sends a relocation request message to a T-AMF, where the relocation request message includes the first indication information and/or the second indication information.

It should be noted that the S-AMF (source AMF) is an AMF connected to the NG RAN (connected to the 5G core network), and the T-AMF (target AMF) is an AMF connected to the E-UTRAN (connected to the 5G core network). In a scenario in which a point-to-point interface based interoperation is performed between 5G core network elements, the S-AMF may send the first indication information and/or the second indication information to the T-AMF by using the relocation request message.

In a scenario in which a service interface based interoperation is performed between 5G core network elements, the S-AMF may send the first indication information and/or the second indication information to the T-AMF by using a relocation service request, that is, the first indication information and/or the second indication information are/is included in the relocation service request to be sent to the T-AMF.

613. The T-AMF sends a session handover request (PDU handover request) to the SMF/PGW-C, where the session handover request includes the first indication information and/or the second indication information.

In a scenario in which a point-to-point interface based interoperation is performed between 5G core network elements, the T-AMF may send the first indication information and/or the second indication information to the SMF/PGW-C by using the session handover request.

In a scenario in which a service interface based interoperation is performed between 5G core network elements, the T-AMF may send the first indication information and/or the second indication information to the SMF/PGW-C by using a session handover service request.

It should be noted that, the session handover request from the T-AMF to the SMF/PGW-C in step 613 is a third message in the "receiving, by the session management network element, a third message from the access management network element" in the embodiments of this application, and the session handover service request is a third service request in the "receiving, by the session management network element, a third service request from the access management network element" in the embodiments of this application. The session management network element is the SMF/PGW-C, and the access management network element is the T-AMF.

Then, the UE is handed over from the NG RAN to the E-UTRAN of the 5G network to execute the voice service. For another operation step of the handover procedure of the UE, refer to the standard protocol 3GPP TS 23.502. Details are not described herein. After the UE is handed over from the NG RAN to the E-UTRAN, and the UE receives signaling that is related to the IMS voice service and that is forwarded by the 5G network, the UE continues to perform a subsequent IMS voice call setup procedure in the access network for the 5G network of the E-UTRAN, thereby completely setting up the IMS voice session.

In some other possible implementations, after the UE is handed over from the NG RAN to the EUTRAN, the eNB may send handover notification information to the T-AMF to notify the T-AMF that the UE has been handed over to the EUTRAN network, and the eNB may correspondingly receive a path handover response message from the T-AMF, where the path handover response is used to respond to the handover notification information. It should be noted that, in this case, the T-AMF may further send the first indication information and/or the second indication information to the eNB by using the path handover response message, where the first indication information and/or the second indication information may be received by the SMF/PGW-C in step 613 and sent to the MME, or may be received by the T-AMF from the NG RAN in step 612.

In some other possible implementations, after the UE accesses the EUTRAN, the SMF/PGW-C re-triggers, in the 5G network, a procedure of setting up a voice user plane tunnel for the UE.

The SMF+PGW-C sends a user plane tunnel setup request message of the voice service to the E-UTRAN by using the T-AMF, where the user plane tunnel setup request message carries the first indication information and/or the second indication information. Specifically, the SMF+PGW-C sends, to the T-AMF based on the first indication information and/or the second indication information received in step 613, the tunnel setup request that carries the first indication information and/or the second indication information, so that the first indication information and/or the second indication information can be transmitted to the E-UTRAN (which may be specifically the eNB) by using the T-AMF. It should be noted that re-setting up the user plane tunnel for the IMS voice service of the UE in the 5G network is setting up the QoS flow with 5QI=1 for the IMS voice service of the UE.

In some embodiments, if the 5G network in which the UE initiates the voice service and the 5G in which the UE actually executes the voice service after the handover do not belong to a same PLMN, the SMF+PGW-C may add a last PLMN ID to the user plane tunnel setup request of the voice service, that is, an ID of a PLMN to which the 5G network that the UE camps on before the UE is handed over to the EUTRAN network belongs, to instruct the eNB to return the UE to the 5G network in which the UE is previously located.

614. After the IMS voice service of the UE in the 5G network ends, the SMF/PGW-C initiates a PDU session modification procedure to release the QoS flow corresponding to the voice service.

A procedure of releasing the QoS flow of the voice service may specifically include the following two steps:

614A. The SMF+PGW-C sends a tunnel release request to the T-AMF, where the tunnel release request carries the first indication information and/or the second indication information.

Specifically, that the SMF+PGW-C sends a tunnel release request to the T-AMF includes: the SMF+PGW-C sends a PDU session modification request or a session management information transfer service request to the T-AMF, where the PDU session modification request or the session management information transfer service request is used to release the QoS flow corresponding to the voice service.

It should be noted that the T-AMF in step 614A may be the same as or different from the T-AMF in step 612. When the UE moves in the E-UTRAN, the T-AMF in step 613A may be different from the T-AMF in step 612.

614B. The T-AMF sends the tunnel release request to the eNB, where the tunnel release request carries the first indication information and/or the second indication information.

Specifically, that the T-AMF sends the tunnel release request to the eNB includes: the T-AMF sends an N2 interface message to the eNB, where the N2 interface message is used to request the eNB to release the user plane tunnel related to the voice service of the UE.

615. The eNB receives the tunnel release request from the T-AMF, and releases a radio resource corresponding to the QoS flow with 5QI=1, and the eNB determines, based on the first indication information and/or the second indication information carried in the tunnel release request message, that the UE needs to be returned to the NG RAN.

Preferably, if the tunnel release request received by the eNB carries the last PLMN ID, the eNB may further determine, based on the last PLMN ID, to specifically return the UE to the NG RAN whose identifier is the last PLMN ID.

616. The eNB returns the UE to the NG RAN.

Specific returning manners of the eNB may include but are not limited to the following two manners:

(1) The eNB sends redirection information to the UE, and returns the UE to the NG RAN by using the redirection information. Specifically, the redirection information includes frequency information, cell information, and the like of the NG RAN to which the UE needs to be returned (for details, refer to the 3GPP standard protocol). In some other embodiments, the eNB may further add the redirection information to an RRC connection release message and send the RRC connection release message to the UE.

(2) The eNB returns the UE to the NG RAN in a handover manner. Specifically, for a handover procedure in which the eNB instructs the 5G core network side to trigger the UE to be handed over to an NG RAN target cell, refer to the 3GPP protocol. Details are not described herein.

In the network handover method provided in this embodiment of this application, in the process of handing over the UE from the NG RAN to the E-UTRAN of the 5G core network, the NG RAN of the 5G core network may notify the SMF+PGW-C of the first indication information and/or the second indication information by using the handover request. After the voice service of the UE ends, the SMF+PGW-C notifies the eNB of the first indication information and/or the second indication information in a tunnel release process of the voice service, so that the eNB can return the UE to an NG RAN cell of the 5G network.

It should be noted that, in some other implementations, the method in this embodiment of the present invention is also applicable to a scenario in which after receiving a voice setup call request in a first network (for example, a 5G network), a terminal device falls back to a second network (for example, a 4G network) to set up a voice service, and moves to the first network after the voice service ends. A difference lies only in that in this scenario, the terminal device is a terminating terminal device of the voice service, an IMS network device such as a P-CSCF is a terminating IMS network device, and steps 601 and 602 that are originally applicable to an originating voice service are replaced with steps corresponding to a terminating voice service. For example, steps 601 and 602 are replaced with steps 501 to 504, and other steps are the same.

Figure 15A:
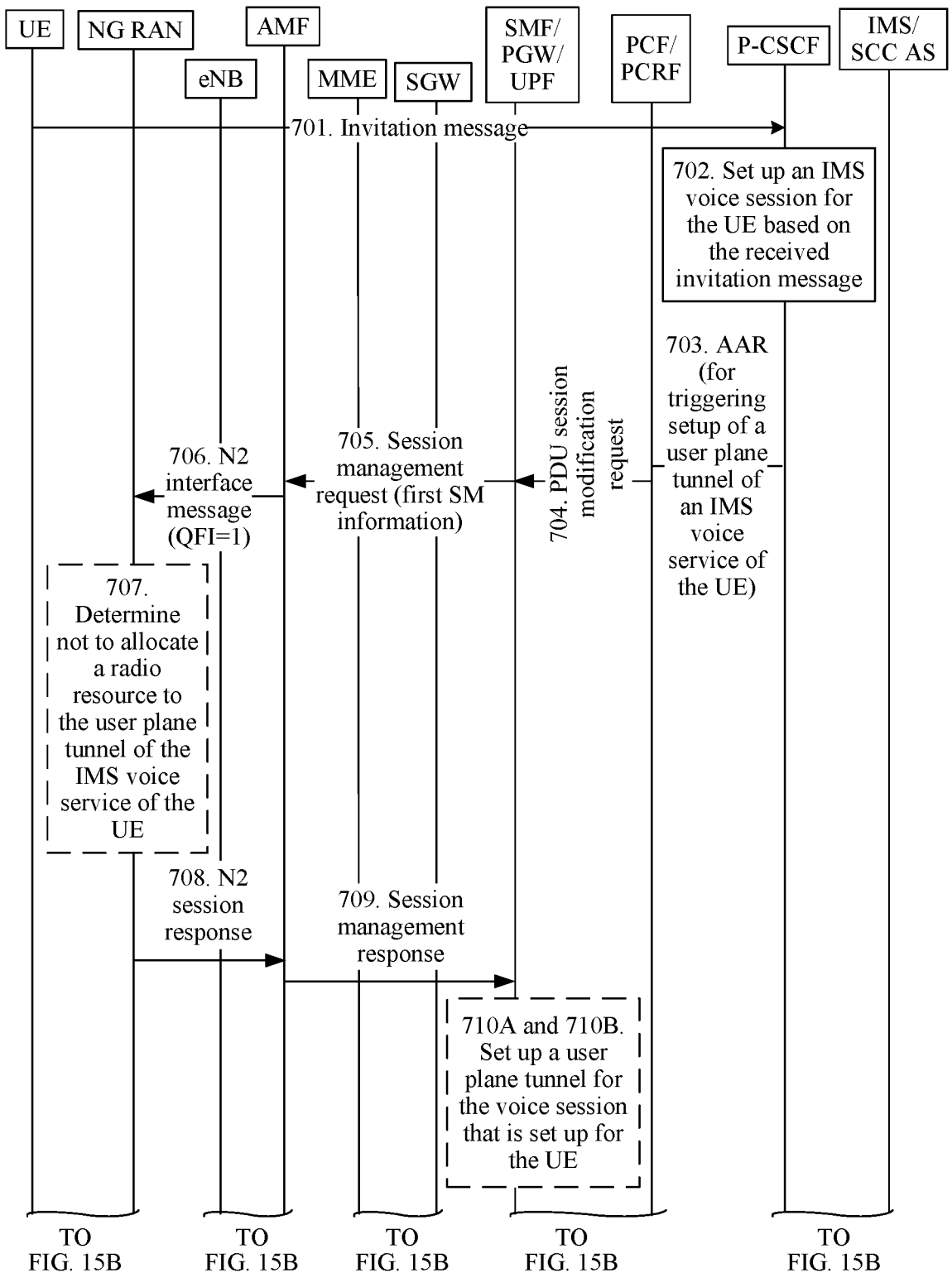
Figure 15B:
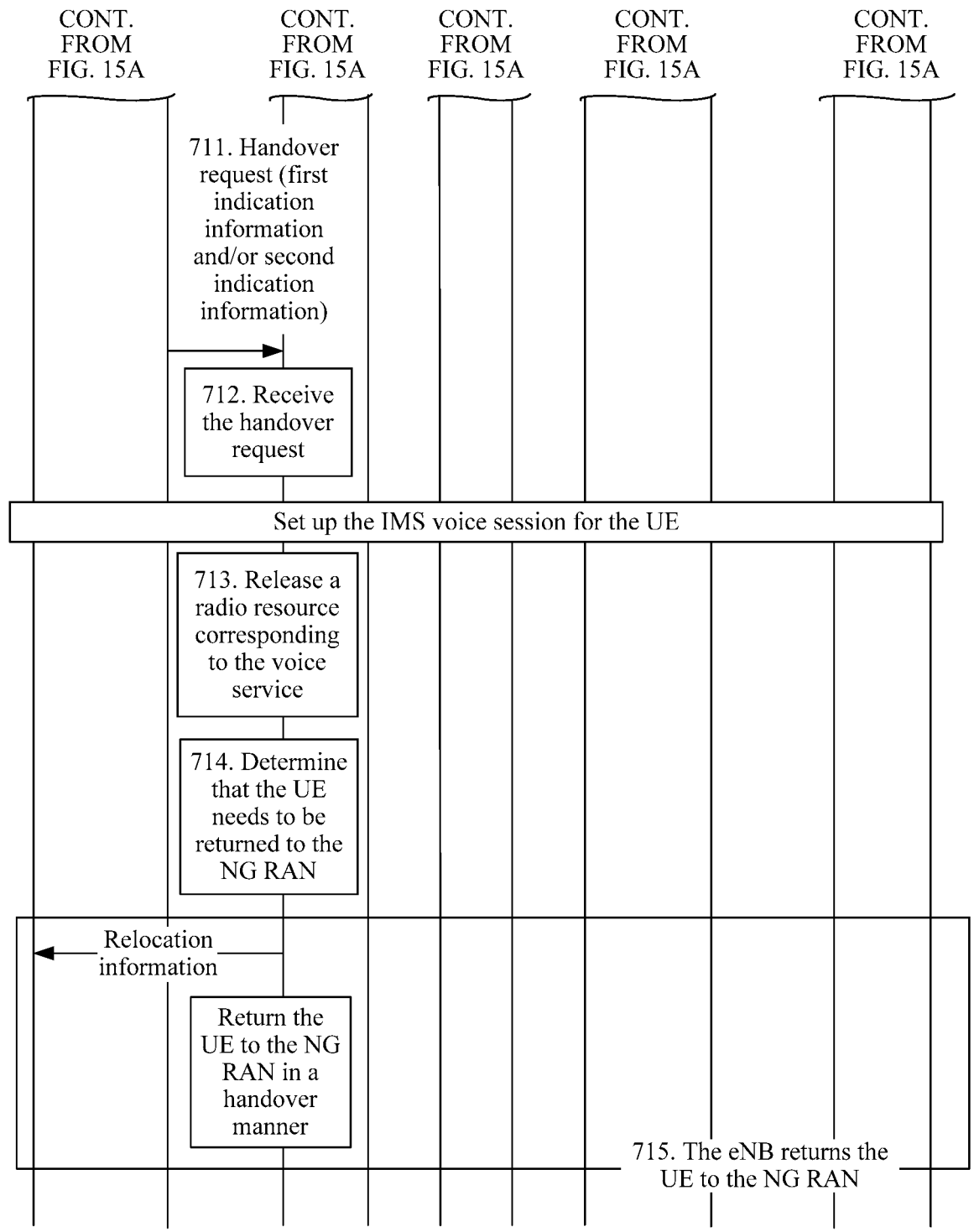

When the network handover method provided in this embodiment of this application is applied to the network shown in FIG. 3 (or applied to the 5G network shown in FIG. 1 and the 4G network shown in FIG. 2), UE may be handed over from an NG RAN connected to a 5G core network to an E-UTRAN connected to a 4G core network or may be handed over from an NG RAN connected to a 5G core network to an E-UTRAN connected to a 5G core network. Further, as shown in FIG. 15A and FIG. 15B, a network handover method provided in an embodiment of this application specifically includes the following steps.

Steps 701 to 707 are the same as steps 301 to 307 in the embodiments of this application. That is, step 701 is the same as step 301, step 702 is the same as step 302, and so on.

708. The NG RAN sends an N2 session response to the AMF.

The N2 session response includes second SM information, and the second SM information includes information indicating that setup of the user plane tunnel of the IMS voice service of the UE is accepted.

Alternatively, the second SM information includes information indicating that setup of the user plane tunnel of the IMS voice service of the UE is rejected, and carries reject cause information. The cause information may be that the UE is performing a handover procedure. Further, if the UE is being handed over to the 4G E-UTRAN, the cause information may be that the UE is performing a handover from the 5G network to the EPS network, or if the UE is being handed over to the 5G E-UTRAN, the cause information may be that the UE is performing an inter-5G network handover, so that the SMF+PGW-C determines, based on the cause information after the handover procedure of the UE ends, to re-initiate a request of setting up the user plane tunnel of the IMS voice service of the UE.

Different from step 308, the N2 session response from the NG RAN to the AMF does not include first indication information and/or second indication information.

Steps 709 and 710 are the same as steps 309 and 310 in the embodiments of this application.

711. The NG RAN sends a handover request to the eNB to trigger the UE to be handed over from the 5G network to the EPS network or trigger the UE to be handed over between 5G networks, where the handover request carries the first indication information and/or the second indication information.

The first indication information is used to indicate that the handover procedure of the UE is used to set up a voice service. After the voice service of the UE ends, the eNB may determine, based on the first indication information, that the UE needs to be returned to the NG RAN network. The second indication information is used to indicate that the UE needs to be returned to the NG RAN network after the voice service ends. Further, the second indication information may further specifically indicate that an RAT in which the UE is located before the handover is the NG RAN.

In addition, the NG RAN may add the first indication information and/or the second indication information to a transparent container (source to target transparent container) in the handover request, and send the handover request to the eNB through an interface between base stations.

712. The eNB receives the handover request from the NG RAN.

Then, the UE executes the voice service in an E-UTRAN cell after the handover. For another operation step of the handover procedure of the UE, refer to a standard protocol. Details are not described herein. After the UE is handed over from an NG RAN cell to the E-UTRAN cell, and the UE receives signaling that is related to the IMS voice service and that is forwarded by the E-UTRAN cell and a core network (a 5GC or an EPC), the UE continues to perform a subsequent IMS voice call setup procedure in the E-UTRAN cell, thereby completely setting up the IMS voice session.

713. After the IMS voice service of the UE in the EPS network ends, the eNB releases a radio resource corresponding to the voice service.

714. The eNB determines, based on the first indication information and/or the second indication information carried in the handover request received in step 712, that the UE needs to be returned to the NG RAN.

Preferably, if the handover request received by the eNB carries a last PLMN ID, the eNB may further determine, based on the last PLMN ID, to specifically return the UE to the NG RAN whose identifier is the last PLMN ID.

715. The eNB returns the UE to the NG RAN.

Specific returning manners of the eNB may include but are not limited to the following two manners:

(1) The eNB sends redirection information to the UE, and returns the UE to the NG RAN by using the redirection information. Specifically, the redirection information includes frequency information, cell information, and the like of the NG RAN to which the UE needs to be returned (for details, refer to the 3GPP standard protocol). In some other embodiments, the eNB may further add the redirection information to an RRC connection release message and send the RRC connection release message to the UE.

(2) The eNB returns the UE to the NG RAN in a handover manner. Specifically, for a handover procedure in which the eNB instructs the EPS or the 5GS core network side to trigger the UE to be handed over to an NG RAN target cell, refer to the 3GPP protocol. Details are not described herein.

In the network handover method provided in this embodiment of this application, in the process of handing over the UE to the E-UTRAN, the NG RAN may notify the eNB of the first indication information and/or the second indication information by using the handover request, so that the eNB can return the UE from the 4G network to the 5G network.

It should be noted that in a scenario in which the UE falls back from a 5G network connected to an NG RAN to a 4G network connected to an E-UTRAN to execute a voice service, after the voice service of the UE ends, the UE may be handed over, by using the method shown in FIG. 15A and FIG. 15B, to the 5G network connected to the NG RAN.

It should be noted that, the method including steps 701 to 715 in this embodiment of the present invention is also applicable to a scenario in which after receiving a voice setup call request in a first network (for example, a 5G network), a terminal device falls back to a second network (for example, a 4G network) to set up a voice service, and moves to the first network after the voice service ends. A difference lies in that in this scenario, the terminal device is a terminating terminal device of the voice service, an IMS network device such as a P-CSCF is a terminating IMS network device, and steps 701 and 702 that are originally applicable to an originating voice service are replaced with steps corresponding to a terminating voice service. For example, steps 701 and 702 are replaced with steps 501 to 504, and other steps are the same.

Figure 16A:
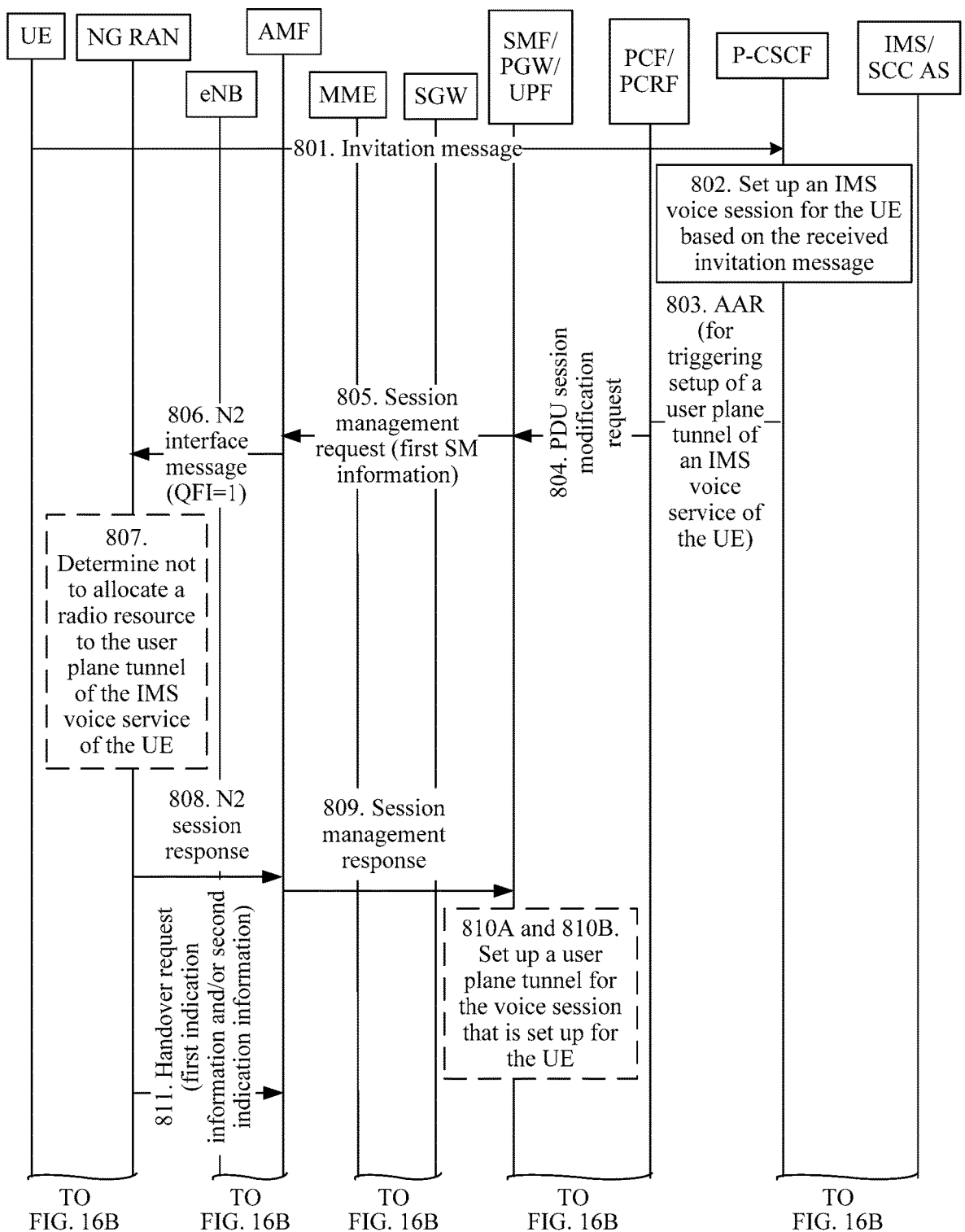
Figure 16B:
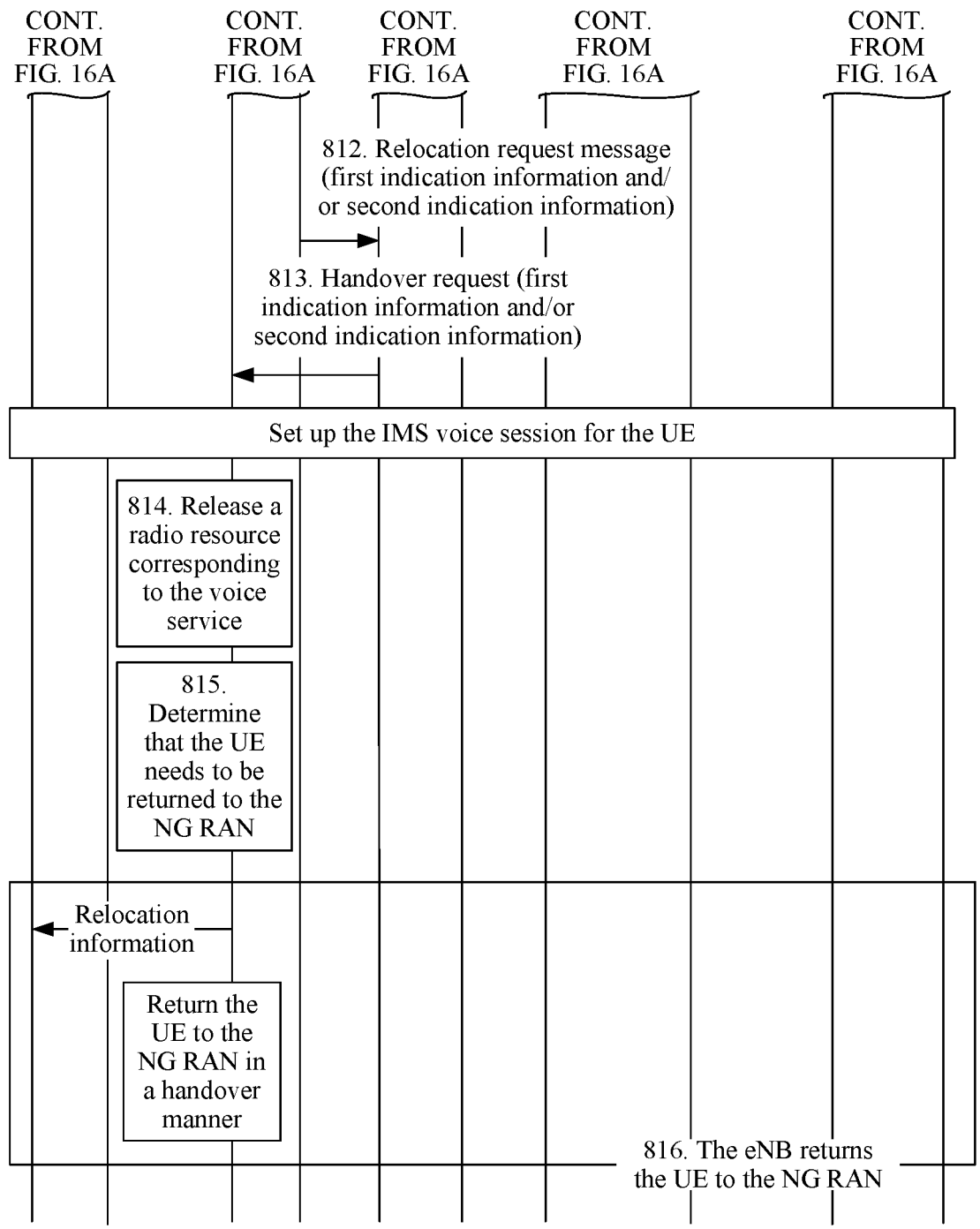

When the network handover method provided in this embodiment of this application is applied to the network shown in FIG. 3 (or applied to the 5G network shown in FIG. 1 and the 4G network shown in FIG. 2), UE may be handed over from an NG RAN connected to a 5G core network to an E-UTRAN connected to a 4G core network. Further, as shown in FIG. 16A and FIG. 16B, a network handover method provided in an embodiment of this application specifically includes the following steps.

Steps 801 to 807 are the same as steps 301 to 307 in the embodiments of this application. That is, step 801 is the same as step 301, step 802 is the same as step 302, and so on.

808. The NG RAN sends an N2 session response to the AMF.

The N2 session response includes second SM information, and the second SM information includes information indicating that setup of the user plane tunnel of the IMS voice service of the UE is accepted.

Alternatively, the second SM information includes information indicating that setup of the user plane tunnel of the IMS voice service of the UE is rejected, and carries reject cause information. The cause information may be that the UE is performing a handover procedure. Further, the cause information may be that the UE is performing a handover from the 5G network to the EPS network, so that the SMF+PGW-C determines, based on the cause information after the handover procedure of the UE ends, to re-initiate a request of setting up the user plane tunnel of the IMS voice service of the UE.

Different from step 308, the N2 session response from the NG RAN to the AMF does not include first indication information and/or second indication information.

Steps 809 and 810 are the same as steps 309 and 310 in the embodiments of this application.

811. The NG RAN sends a handover request to the AMF, where the handover request carries the first indication information and/or the second indication information.

812. The AMF sends a relocation request message to the MME, where the relocation request message carries the first indication information and/or the second indication information.

813. The MME sends the handover request to the eNB, where the handover request carries the first indication information and/or the second indication information.

Then, the UE is handed over from the 5G network to the EPS network to execute the voice service. For another operation step of the handover procedure of the UE, refer to a standard protocol. Details are not described herein. After the UE is handed over from the 5G network to the EPS network, and the UE receives signaling that is related to the IMS voice service and that is forwarded by the EPS network, the UE continues to perform a subsequent IMS voice call setup procedure in the EPS network, thereby completely setting up the IMS voice session.

In some other possible implementations, step 813 in which the handover request carries the first indication information and/or the second indication information is an optional step, that is, the handover request may carry or may not carry the first indication information and/or the second indication information. In another possible implementation, after determining that the UE has accessed the EPS network, the MME may send the first indication information and/or the second indication information to the eNB, so that the eNB returns, based on the first indication information and/or the second indication information, the UE to the NG RAN after the voice service ends. Specifically, after the UE is handed over from the NG RAN to the EUTRAN, the eNB may send handover notification information to the MME to notify the MME that the UE has been handed over to the EUTRAN network, and the eNB may correspondingly receive a path handover response message from the MME, where the path handover response is used to respond to the handover notification information. In this case, the MME may send the first indication information and/or the second indication information to the eNB by using the path handover response message. The first indication information and/or the second indication information are/is received by the MME from the AMF in step 812.

814. After the IMS voice service of the UE in the EPS network ends, release a dedicated bearer with QCI=1.

815. The eNB determines, based on the first indication information and/or the second indication information received in step 813, that the UE needs to be returned to the NG RAN.

816. The eNB returns the UE to the NG RAN.

It should be noted that, the method including steps 801 to 816 in this embodiment of the present invention is also applicable to a scenario in which after receiving a voice setup call request in a first network (for example, a 5G network), a terminal device falls back to a second network (for example, a 4G network) to set up a voice service, and moves to the first network after the voice service ends. A difference lies in that in this scenario, the terminal device is a terminating terminal device of the voice service, an IMS network device such as a P-CSCF is a terminating IMS network device, and steps 801 and 802 that are originally applicable to an originating voice service are replaced with steps corresponding to a terminating voice service. For example, steps 801 and 802 are replaced with steps 501 to 504, and other steps are the same.

Figure 17A:
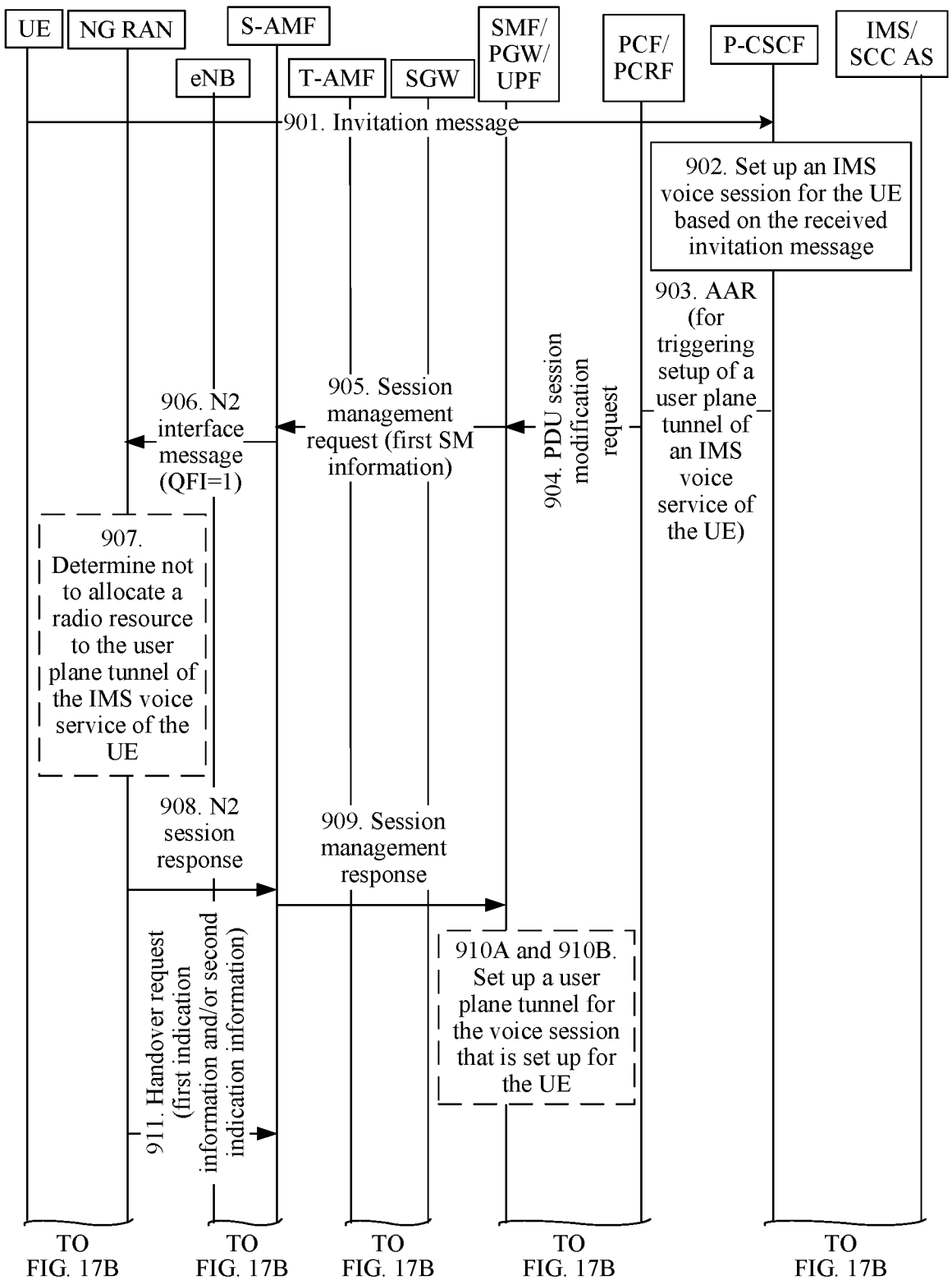
Figure 17B:
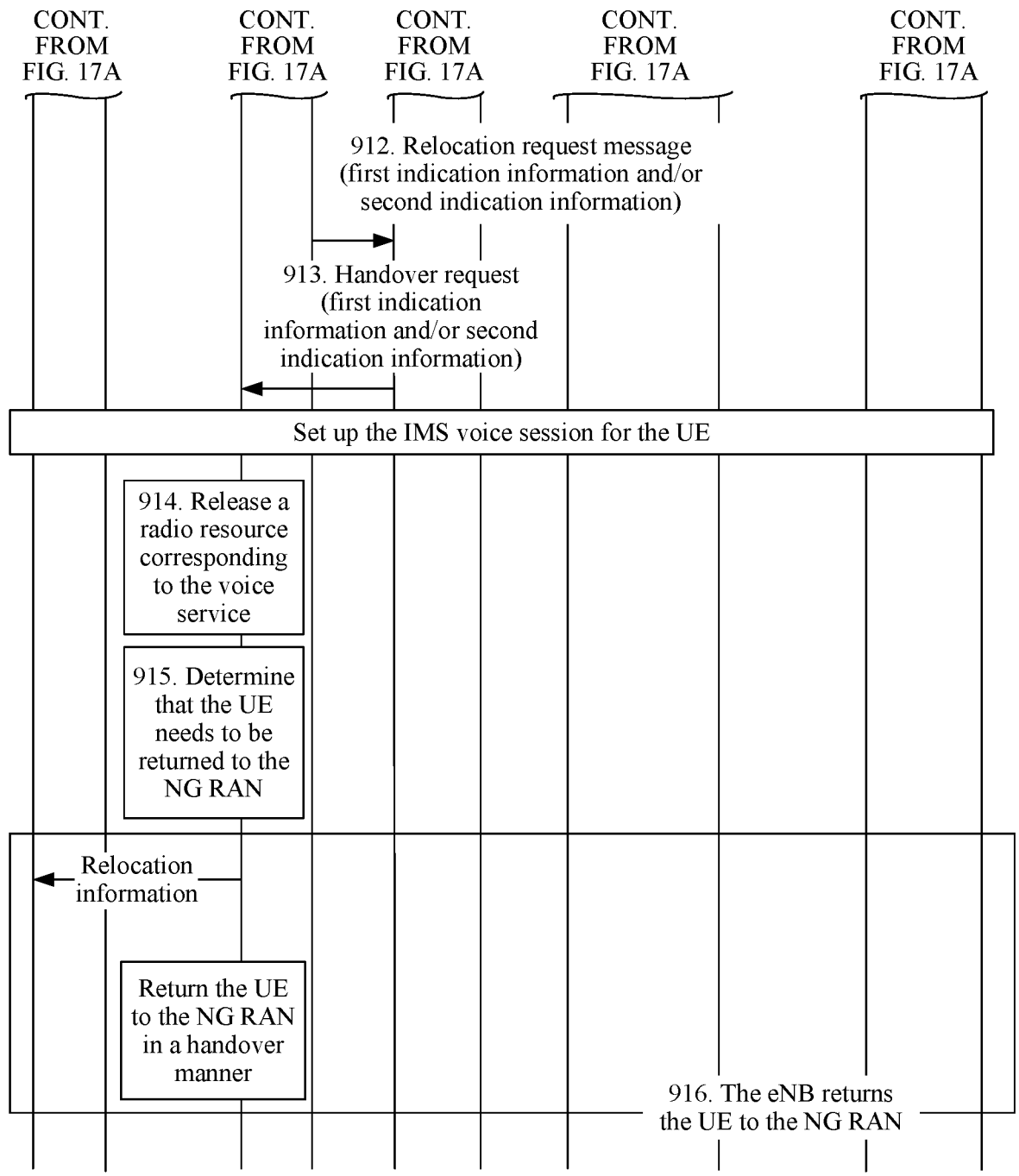

When the network handover method provided in this embodiment of this application is applied to the network shown in FIG. 4, UE (originating UE) may move from an NG RAN connected to a 5G core network to an E-UTRAN connected to a 5G core network. Further, as shown in FIG. 17A and FIG. 17B, a network handover method provided in an embodiment of this application specifically includes the following steps.

Steps 901 to 907 are the same as steps 301 to 307 in the embodiments of this application. That is, step 901 is the same as step 301, step 902 is the same as step 302, and so on.

908. The NG RAN sends an N2 session response to the AMF.

The N2 session response includes second SM information, and the second SM information includes information indicating that setup of the user plane tunnel of the IMS voice service of the UE is accepted.

Alternatively, the second SM information includes information indicating that setup of the user plane tunnel of the IMS voice service of the UE is rejected, and carries reject cause information. The cause information may be that the UE is performing a handover procedure. Further, the cause information may be that the UE is performing an inter-5G network handover, so that the SMF+PGW-C determines, based on the cause information after the handover procedure of the UE ends, to re-initiate a request of setting up the user plane tunnel of the IMS voice service of the UE.

Different from step 308, the N2 session response from the NG RAN to the AMF does not include first indication information and/or second indication information.

Steps 909 and 910 are the same as steps 309 and 310 in the embodiments of this application.

911. The NG RAN sends a handover request to an S-AMF, where the handover request carries the first indication information and/or the second indication information.

The S-AMF is connected to the NG RAN of the 5G core network.

912. The S-AMF sends a relocation request message to a T-AMF, where the relocation request message carries the first indication information and/or the second indication information.

913. The T-AMF sends the handover request to the eNB, where the handover request carries the first indication information and/or the second indication information.

Then, the UE is handed over from the NG RAN of the 5G network to the E-UTRAN of the 5G network to execute the voice service. For another operation step of the handover procedure of the UE, refer to a standard protocol. Details are not described herein. After the UE is handed over from the NG RAN to the E-UTRAN, and the UE receives signaling that is related to the IMS voice service and that is forwarded by the NG RAN and the 5GC network, the UE continues to perform a subsequent IMS voice call setup procedure in the NG RAN and the 5GC network, thereby completely setting up the IMS voice session.

It should be noted that, step 913 in which the handover request carries the first indication information and/or the second indication information is an optional step, that is, the handover request may carry or may not carry the first indication information and/or the second indication information. In another possible implementation, after determining that the UE has accessed the EUTRAN network, the T-AMF may send the first indication information and/or the second indication information to the eNB, so that the eNB returns, based on the first indication information and/or the second indication information, the UE to the NG RAN after the voice service ends. Specifically, after the UE is handed over from the NG RAN to the EUTRAN, the eNB may send handover notification information to the T-AMF to notify the T-AMF that the UE has been handed over to the EUTRAN network, and the eNB may correspondingly receive a path handover response message from the T-AMF, where the path handover response is used to respond to the handover notification information. In this case, the T-AMF may send the first indication information and/or the second indication information to the eNB by using the path handover response message. The first indication information and/or the second indication information are/is received by the T-AMF from the AMF in step 812.

914. After the IMS voice service of the UE in the NG RAN and the 5GC ends, the eNB releases a QoS flow related to the voice service.

Specifically, the eNB releases a QoS flow corresponding to a user plane of the voice service, that is, a QoS flow with 5QI=1.

915. The eNB determines, based on the first indication information and/or the second indication information received in step 913, that the UE needs to be returned to the NG RAN.

916. The eNB returns the UE to the NG RAN.

It should be noted that, the method including steps 901 to 916 in this embodiment of the present invention is also applicable to a scenario in which after receiving a voice setup call request in a first network (for example, a 5G network), a terminal device falls back to a second network (for example, a 4G network) to set up a voice service, and moves to the first network after the voice service ends. A difference lies only in that in this scenario, the terminal device is a terminating terminal device of the voice service, an IMS network device such as a P-CSCF is a terminating IMS network device, and steps 901 and 902 that are originally applicable to an originating voice service are replaced with steps corresponding to a terminating voice service. For example, steps 901 and 902 are replaced with steps 501 to 504, and other steps are the same.

Figure 18:
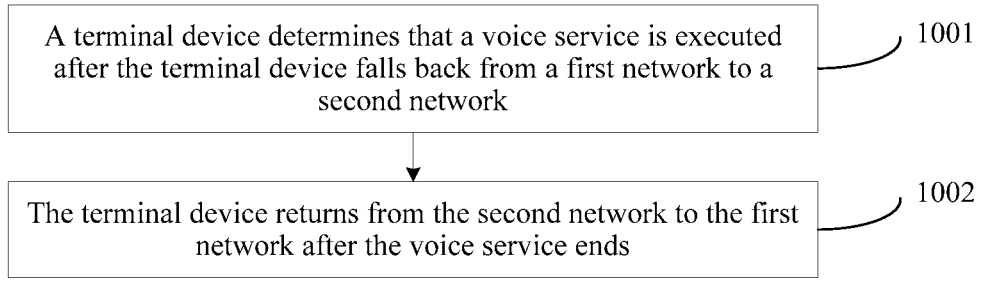

An embodiment of this application further provides a network handover method. After a terminal device falls back from an NG RAN to an E-UTRAN cell to execute a voice service, the terminal device itself may trigger a return procedure to be handed over from a 4G network to a 5G network. As shown in FIG. 18, the network handover method includes the following steps.

1001. The terminal device determines that the voice service is executed after the terminal device falls back from a first network to a second network.

A type of a core network of the first network is the same as that of a core network of the second network, and a type of an access network of the first network is different from that of an access network of the second network; or a type of a core network of the first network is different from that of a core network of the second network, and a type of an access network of the first network is different from that of an access network of the second network.

It should be noted that in this embodiment of this application, the first network and the second network are different networks. Specifically, the type of the core network of the first network may be the same as that of the core network of the second network, and the type of the access network of the first network may be different from that of the access network of the second network; or the type of the core network of the first network is different from that of the core network of the second network, and the type of the access network of the first network is different from that of the access network of the second network.

For example, the core network of the first network is a 5G core network, and the access network of the first network is an NG RAN, in other words, the first network is a 5G network connected to the NG RAN. In addition, the core network of the second network is a 5G core network, and the access network of the second network is an E-UTRAN, in other words, the second network is a 5G network connected to the E-UTRAN.

Alternatively, the core network of the first network is a 5G core network, and the access network of the first network is an NG RAN, in other words, the first network is a 5G network connected to the NG RAN. In addition, the core network of the second network is a 4G core network, and the access network of the second network is an E-UTRAN, in other words, the second network is a 4G network connected to the E-UTRAN.

In specific implementation, the terminal device may determine, based on the following two conditions, that the executed voice service is executed after the terminal device falls back from the first network to the second network:

(1) The terminal device camps on the first network, and initiates an IMS voice call setup request or receives an IMS voice call setup request by using the first network.

(2) Before setup of an IMS voice call is completed, the terminal device UE is handed over from the first network to the second network.

The terminal device determines, only when the foregoing two conditions are met, that the executed voice service is executed after the terminal device falls back from the first network to the second network.

In some embodiments, after determining that the foregoing two conditions are met, the terminal may further determine whether the following condition (3) is met. The terminal device determines, only when the condition (3) is met, that the executed voice service is executed after the terminal device falls back from the first network to the second network.

(3) After handing over to the second network, the terminal device determines that the IMS voice call is set up by using the second network.

1002. The terminal device returns from the second network to the first network after the voice service ends.

Specifically, after the voice service ends, the terminal device returns from the second network to the first network through cell reselection or network reselection.

In some embodiments, before returning from the second network to the first network, the terminal device further stores a network identifier of the first network. The network identifier may be a last PLMN ID.

In this case, after the voice service ends, the terminal device may return to the first network based on the network identifier of the first network.

In the network handover method provided in this embodiment of this application, the terminal device may proactively trigger a handover to the first network after the terminal device falls back from the first network (for example, an NG RAN) to the second network (for example, an E-UTRAN) to execute the voice service. In this way, the terminal device can make full use of a wider variety of higher-rate services that are more stable and reliable and that are provided by an NG RAN network newly deployed by an operator, to obtain better service experience.

Figure 19:
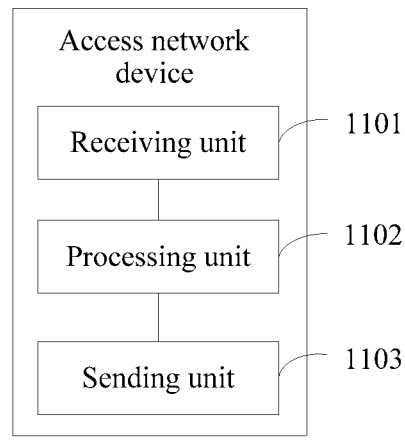
FIG. 19 and FIG. 20 are other schematic composition diagrams of an access network device according to an embodiment of this application.

An embodiment of this application provides an access network device, and the access network device is an access network device of a first network, such as an NG RAN in a 5G network. When each function module is obtained through division based on each corresponding function, FIG. 19 is a possible schematic structural diagram of the foregoing access network device. As shown in FIG. 19, the access network device includes a receiving unit 1101, a processing unit 1102, and a sending unit 1103.

The receiving unit 1101 is configured to support the access network device in performing step 102 in the foregoing embodiment, and/or another process of the technology described in this specification, for example, interaction between the access network device and a core network device AMF of the first network.

The processing unit 1102 is configured to support the access network device in performing steps 307, 407, 509, 607, 707, 807, and 907 and step 3401 in the embodiments of the present invention, and/or another process of the technology described in this specification.

The sending unit 1103 is configured to support the access network device in performing steps 103 and 104 and steps 3402 and 3403 in the embodiments of the present invention, and/or another process of the technology described in this specification, for example, interaction between the access network device and the core network device AMF of the first network.

It should be noted that all related content of the steps in the foregoing method embodiments can be cited in function descriptions of the corresponding function modules. Details are not described herein again.

Figure 20:
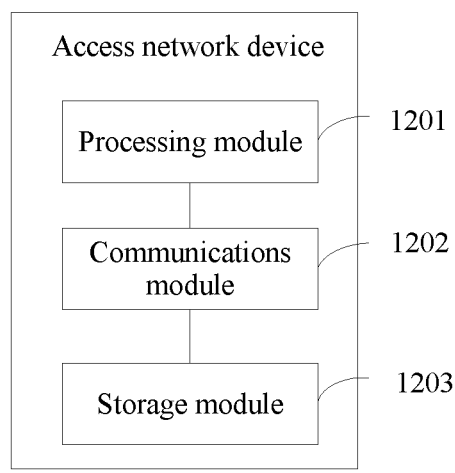

For example, when an integrated unit is used, FIG. 20 is a schematic structural diagram of an access network device according to an embodiment of this application. In FIG. 20, the access network device includes a processing module 1201 and a communications module 1202. The processing module 1201 is configured to control and manage actions of the access network device, for example, performing the step performed by the processing unit 1102, and/or another process of the technology described in this specification. The communications module 1202 is configured to support interaction between the access network device and another device, for example, performing the steps performed by the receiving unit 1101 and the sending unit 1103. As shown in FIG. 20, the access network device may further include a storage module 1203, and the storage module 1203 is configured to store program code and data of the access network device.

When the processing module 1201 is a processor, the communications module 1202 is a transceiver, and the storage module 1203 is a memory, the access network device may be the access network device shown in FIG. 7. If the transceiver is a receiver and a transmitter, the receiver performs the step performed by the receiving unit 1101, and the transmitter performs the step performed by the sending unit 1103.

An embodiment of this application further provides a computer readable storage medium. The computer readable storage medium stores an instruction, and when the computer readable storage medium runs on the access network device shown in FIG. 7, FIG. 19, and FIG. 20, the access network device is enabled to perform steps 101 to 104 in the embodiments of this application and the network handover method shown in FIG. 8 and FIG. 10A and FIG. 10B to FIG. 17A and FIG. 17B.

An embodiment of this application further provides a wireless communications apparatus. The wireless communications apparatus stores an instruction, and when the wireless communications apparatus runs on the access network device shown in FIG. 7, FIG. 19, and FIG. 20, the access network device is enabled to perform steps 101 to 104 in the embodiments of this application and the network handover method shown in FIG. 8 and FIG. 10A and FIG. 10B to FIG. 17A and FIG. 17B. Specifically, the wireless communications apparatus may be a chip.

Figure 21:
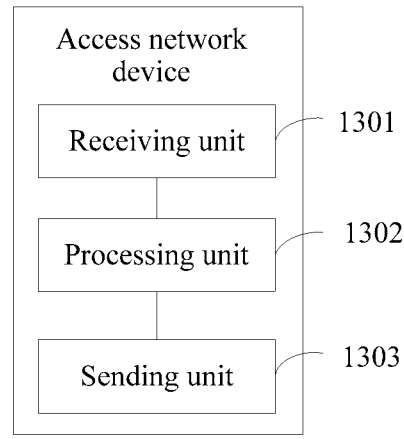
FIG. 21 to FIG. 23 are schematic composition diagrams of another access network device according to an embodiment of this application.

An embodiment of this application provides an access network device, and the access network device is an access network device of a second network, such as an E-UTRAN in a 5G network or an E-UTRAN in a 4G network. When each function module is obtained through division based on each corresponding function, FIG. 21 is a possible schematic structural diagram of the foregoing access network device. As shown in FIG. 21, the access network device includes a receiving unit 1301, a processing unit 1302, and a sending unit 1303.

The receiving unit 1301 is configured to support the access network device in performing step 201 in the foregoing embodiment, and/or another process of the technology described in this specification, for example, interaction between the access network device and a core network device AMF of the second network.

The processing unit 1302 is configured to support the access network device in performing steps 202, 313, S315, 414, 516, 615, 714, 815, and 915 in the embodiments of the present invention, and/or another process of the technology described in this specification.

The sending unit 1303 is configured to support interaction between the access network device and a terminal device, for example, sending redirection information to the terminal device to instruct the terminal device to return to a first network in the foregoing embodiment.

It should be noted that all related content of the steps in the foregoing method embodiments can be cited in function descriptions of the corresponding function modules. Details are not described herein again.

Figure 22:
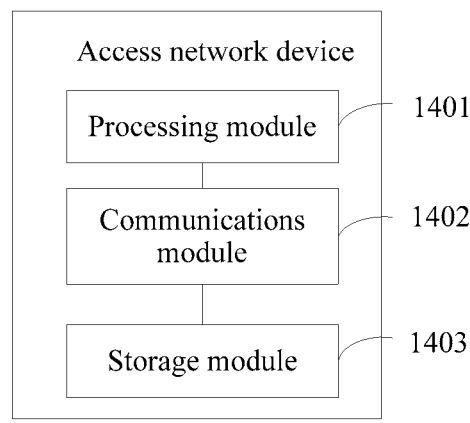

For example, when an integrated unit is used, FIG. 22 is a schematic structural diagram of an access network device according to an embodiment of this application. In FIG. 22, the access network device includes a processing module 1401 and a communications module 1402. The processing module 1401 is configured to control and manage actions of the access network device, for example, performing the step performed by the processing unit 1302, and/or another process of the technology described in this specification. The communications module 1402 is configured to support interaction between the access network device and another device, for example, performing the steps performed by the receiving unit 1301 and the sending unit 1303. As shown in FIG. 22, the access network device may further include a storage module 1403, and the storage module 1403 is configured to store program code and data of the access network device.

Figure 23:
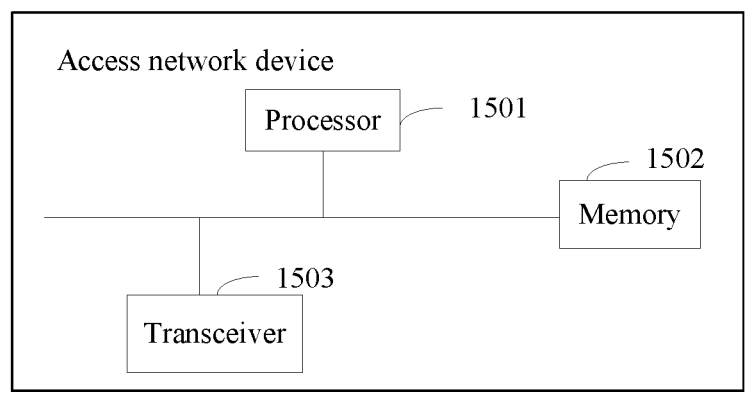

When the processing module 1401 is a processor, the communications module 1402 is a transceiver, and the storage module 1403 is a memory, the access network device may be an access network device shown in FIG. 23. Referring to FIG. 23, the access network device includes at least one processor 1501, a memory 1502, and a transceiver 1503. The memory 1502 stores a group of code, and the processor 1501 invokes the code stored in the memory 1502, to support the access network device in performing the network handover method provided in the embodiments of this application. If the transceiver is a receiver and a transmitter, the receiver performs the step performed by the receiving unit 1301, and the transmitter performs the step performed by the sending unit 1303.

An embodiment of this application further provides a computer readable storage medium. The computer readable storage medium stores an instruction, and when the computer readable storage medium runs on the access network device shown in FIG. 21, FIG. 22, and FIG. 23, the access network device is enabled to perform steps 201 and 202 in the embodiments of this application and the network handover method shown in FIG. 9 to FIG. 17A and FIG. 17B.

An embodiment of this application further provides a wireless communications apparatus. The wireless communications apparatus stores an instruction, and when the wireless communications apparatus runs on the access network device shown in FIG. 21, FIG. 22, and FIG. 23, the access network device is enabled to perform steps 201 and 202 in the embodiments of this application and the network handover method shown in FIG. 9 to FIG. 17A and FIG. 17B. Specifically, the wireless communications apparatus may be a chip.

Figure 24:
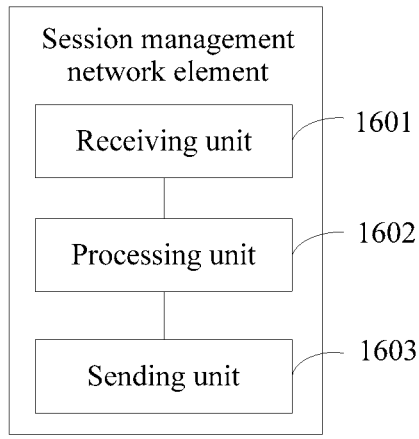
FIG. 24 to FIG. 26 are schematic composition diagrams of a session management network element according to an embodiment of this application.

An embodiment of this application provides a session management network element, and the session management network element may be an SMF or an SMF+PGW-C. When each function module is obtained through division based on each corresponding function, FIG. 24 is a possible schematic structural diagram of the foregoing session management network element. As shown in FIG. 24, the session management network element includes a receiving unit 1601, a processing unit 1602, and a sending unit 1603.

The receiving unit 1601 is configured to support the session management network element in performing steps 304, 308, S306, S311, 404, 409, 506, 511, 514, 604, 609, 613, 704, 709, 804, 809, 904, and 909 and step 3301 in the embodiments of the present invention, and/or another process of the technology described in this specification, for example, interaction between the session management network element and a core network device AMF of a second network.

The processing unit 1602 is configured to support the session management network element in performing steps 310, S312, 410, 512, 610, 710, 810, and 910 in the embodiments of the present invention, and/or another process of the technology described in this specification.

The sending unit 1603 is configured to support the session management network element in performing step 3302 in the embodiments of the present invention and interaction between the session management network element and an SGW, for example, sending a tunnel release request to the SGW.

It should be noted that all related content of the steps in the foregoing method embodiments can be cited in function descriptions of the corresponding function modules. Details are not described herein again.

Figure 25:
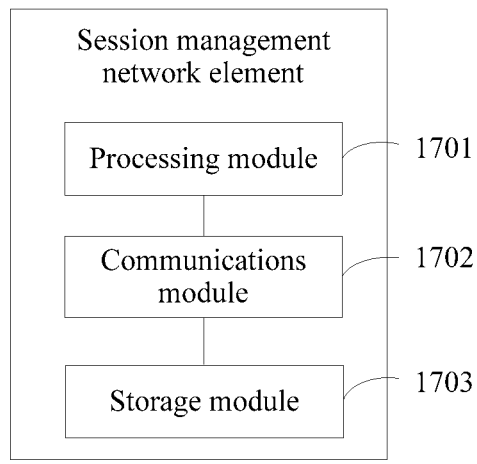

For example, when an integrated unit is used, FIG. 25 is a schematic structural diagram of a session management network element according to an embodiment of this application. In FIG. 25, the session management network element includes a processing module 1701 and a communications module 1702. The processing module 1701 is configured to control and manage actions of the session management network element, for example, performing the step performed by the processing unit 1602, and/or another process of the technology described in this specification. The communications module 1702 is configured to support interaction between the session management network element and another device, for example, performing the steps performed by the receiving unit 1601 and the sending unit 1603. As shown in FIG. 25, the session management network element may further include a storage module 1703, and the storage module 1703 is configured to store program code and data of the session management network element.

Figure 26:
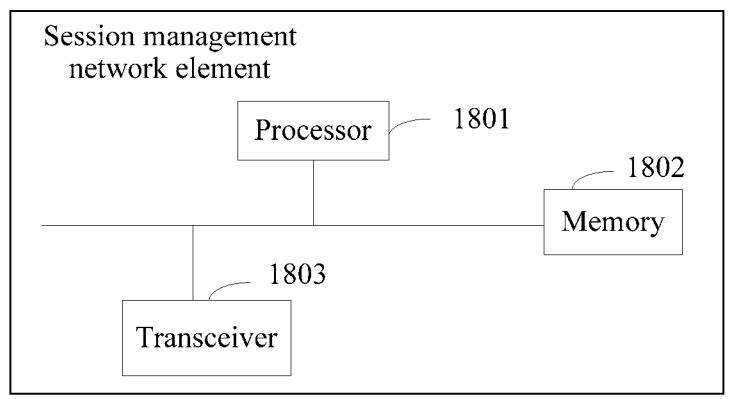

When the processing module 1701 is a processor, the communications module 1702 is a transceiver, and the storage module 1703 is a memory, the session management network element may be a session management network element shown in FIG. 26. Referring to FIG. 26, the session management network element includes at least one processor 1801, a memory 1802, and a transceiver 1803. The memory 1802 stores a group of code, and the processor 1801 invokes the code stored in the memory 1802, to support the network device in performing the network handover method provided in the embodiments of this application. If the transceiver is a receiver and a transmitter, the transmitter performs the step performed by the sending unit 1603. If the transceiver is a receiver and a transmitter, the receiver performs the step performed by the receiving unit 1601, and the transmitter performs the step performed by the sending unit 1603.

An embodiment of this application further provides a computer readable storage medium. The computer readable storage medium stores an instruction, and when the computer readable storage medium runs on the session management network element shown in FIG. 24, FIG. 25, and FIG. 26, the session management network element is enabled to perform the network handover method shown in FIG. 10A and FIG. 10B to FIG. 17A and FIG. 17B in the embodiments of this application.

An embodiment of this application further provides a wireless communications apparatus. The wireless communications apparatus stores an instruction, and when the wireless communications apparatus runs on the session management network element shown in FIG. 24, FIG. 25, and FIG. 26, the session management network element is enabled to perform the network handover method shown in FIG. 10A and FIG. 10B to FIG. 17A and FIG. 17B in the embodiments of this application. Specifically, the wireless communications apparatus may be a chip.

Figure 27:
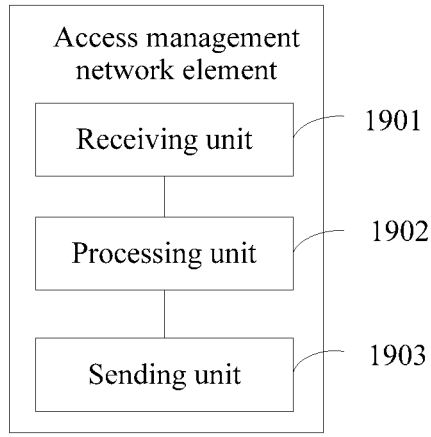
FIG. 27 to FIG. 29 are schematic composition diagrams of an access management network element according to an embodiment of this application.

An embodiment of this application provides an access management network element, and the access management network element may be specifically the AMF or the S-AMF described in the embodiments of this application. When each function module is obtained through division based on each corresponding function, FIG. 27 is a possible schematic structural diagram of the foregoing access management network element. As shown in FIG. 27, the access management network element includes a receiving unit 1901, a processing unit 1902, and a sending unit 1903.

The receiving unit 1901 is configured to support the access management network element in performing steps 305, 308, 311, 307, S310, S313, 405/408/411/507, 510, 513, 605, 608, 611, 705, 708, 711, 805, 808, 811, 905, 908, and 911 in the foregoing embodiments, and/or another process of the technology described in this specification, for example, interaction between the access management network element and an SMF.

The processing unit 1902 is configured to support the access management network element in processing received information to obtain required information, and/or another process of the technology described in this specification.

The sending unit 1903 is configured to support interaction between the access management network element and an SGW, for example, steps 309, S311, 409, 412, 511, 514, 609, 612, 709, 809, 812, 909, and 912 in the foregoing embodiments.

It should be noted that all related content of the steps in the foregoing method embodiments can be cited in function descriptions of the corresponding function modules. Details are not described herein again.

Figure 28:
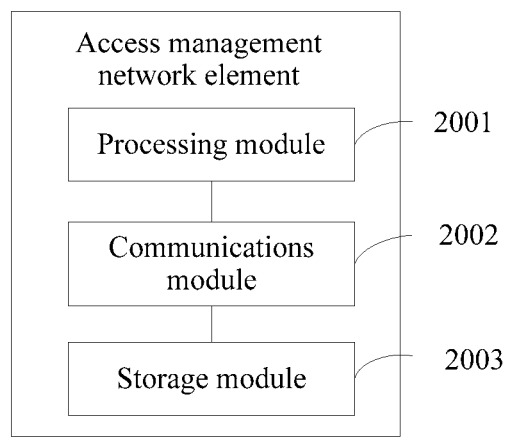

For example, when an integrated unit is used, FIG. 28 is a schematic structural diagram of an access management network element according to an embodiment of this application. In FIG. 28, the access management network element includes a processing module 2001 and a communications module 2002. The processing module 2001 is configured to control and manage actions of the access management network element, for example, performing the step performed by the processing unit 1902, and/or another process of the technology described in this specification. The communications module 2002 is configured to support interaction between the access management network element and another device, for example, performing the steps performed by the receiving unit 1901 and the sending unit 1903. As shown in FIG. 28, the access management network element may further include a storage module 2003, and the storage module 2003 is configured to store program code and data of the access management network element.

Figure 29:
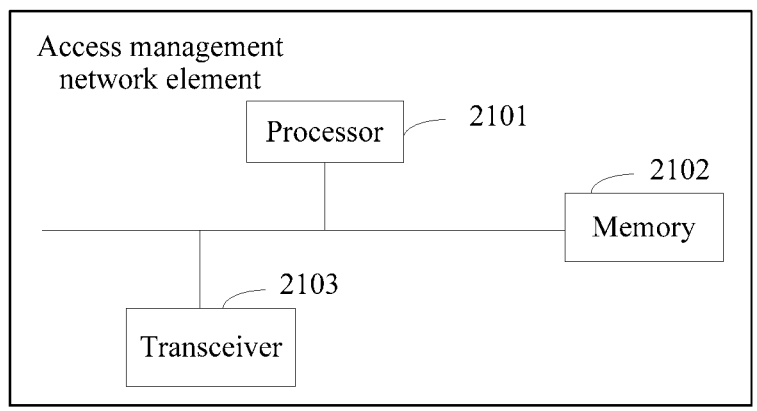

When the processing module 2001 is a processor, the communications module 2002 is a transceiver, and the storage module 2003 is a memory, the access management network element may be an access management network element shown in FIG. 29. Referring to FIG. 29, the access management network element includes at least one processor 2101, a memory 2102, and a transceiver 2103. The memory 2102 stores a group of code, and the processor 2101 invokes the code stored in the memory 2102, to support the network device in performing the network handover method provided in the embodiments of this application. If the transceiver is a receiver and a transmitter, the transmitter performs the step performed by the sending unit 1902. If the transceiver is a receiver and a transmitter, the receiver performs the step performed by the receiving unit 1901, and the transmitter performs the step performed by the sending unit 1903.

An embodiment of this application further provides a computer readable storage medium. The computer readable storage medium stores an instruction, and when the computer readable storage medium runs on the access management network element shown in FIG. 27, FIG. 28, and FIG. 29, the access management network element is enabled to perform the network handover method shown in FIG. 10A and FIG. 10B to FIG. 17A and FIG. 17B in the embodiments of this application.

An embodiment of this application further provides a wireless communications apparatus. The wireless communications apparatus stores an instruction, and when the wireless communications apparatus runs on the access management network element shown in FIG. 27, FIG. 28, and FIG. 29, the access management network element is enabled to perform the network handover method shown in FIG. 10A and FIG. 10B to FIG. 17A and FIG. 17B in the embodiments of this application. Specifically, the wireless communications apparatus may be a chip.

Figure 30:
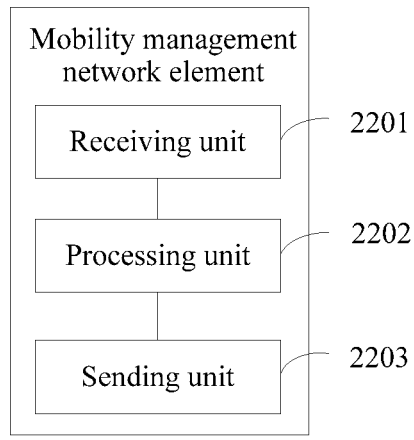
FIG. 30 to FIG. 32 are schematic composition diagrams of a mobility management network element according to an embodiment of this application.

An embodiment of this application provides a mobility management network element, and the mobility management network element may be specifically the MME described in the embodiments of this application. When each function module is obtained through division based on each corresponding function, FIG. 30 is a possible schematic structural diagram of the foregoing mobility management network element. As shown in FIG. 30, the mobility management network element includes a receiving unit 2201, a processing unit 2202, and a sending unit 2203.

The receiving unit 2201 is configured to support the mobility management network element in performing steps 312B, 314B, 413B, 513B, and 812 in the foregoing embodiments, and/or another process of the technology described in this specification, for example, interaction between the mobility management network element and an SMF. When the mobility management network element is the T-AMF described in the embodiments of this application, the receiving unit 2201 is further configured to support the mobility management network element in performing steps 614A and 912 in the foregoing embodiments.

The processing unit 2202 is configured to support the mobility management network element in processing received information to obtain required information, and/or another process of the technology described in this specification.

The sending unit 2203 is configured to support the mobility management network element in performing steps 312C, S314C, 413C, 515C, and 813 in the foregoing embodiments. When the mobility management network element is the T-AMF described in the embodiments of this application, the sending unit 2203 is further configured to support the mobility management network element in performing steps 614B and 913 in the foregoing embodiments.

It should be noted that all related content of the steps in the foregoing method embodiments can be cited in function descriptions of the corresponding function modules. Details are not described herein again.

Figure 31:
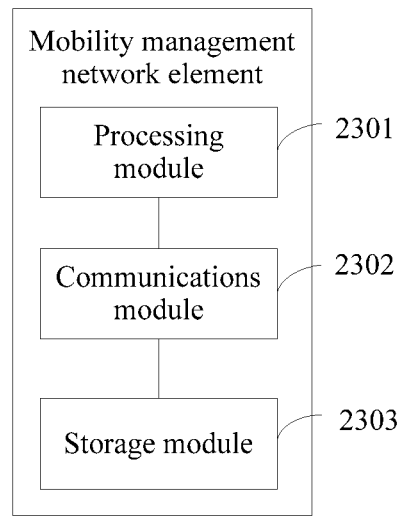

For example, when an integrated unit is used, FIG. 31 is a schematic structural diagram of a mobility management network element according to an embodiment of this application. In FIG. 31, the mobility management network element includes a processing module 2301 and a communications module 2302. The processing module 2301 is configured to control and manage actions of the mobility management network element, for example, performing the step performed by the processing unit 1902, and/or another process of the technology described in this specification. The communications module 2302 is configured to support interaction between the mobility management network element and another device, for example, performing the steps performed by the receiving unit 2201 and the sending unit 2203. As shown in FIG. 31, the mobility management network element may further include a storage module 2303, and the storage module 2303 is configured to store program code and data of the mobility management network element.

Figure 32:
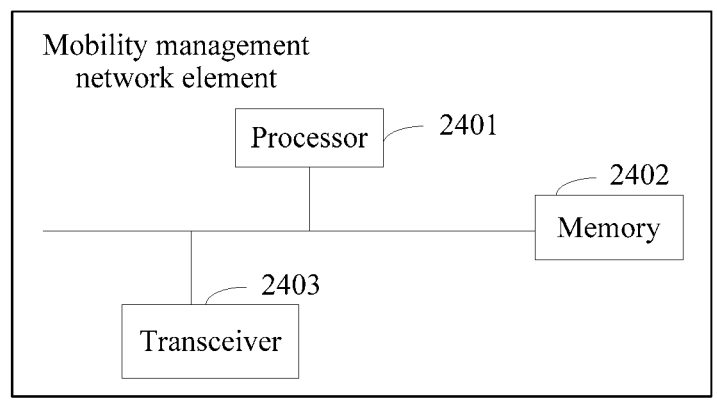

When the processing module 2301 is a processor, the communications module 2302 is a transceiver, and the storage module 2303 is a memory, the mobility management network element may be a mobility management network element shown in FIG. 32. Referring to FIG. 32, the mobility management network element includes at least one processor 2401, a memory 2402, and a transceiver 2403. The memory 2402 stores a group of code, and the processor 2401 invokes the code stored in the memory 2402, to support the network device in performing the network handover method provided in the embodiments of this application. If the transceiver is a receiver and a transmitter, the transmitter performs the step performed by the sending unit 2203. If the transceiver is a receiver and a transmitter, the receiver performs the step performed by the receiving unit 2201, and the transmitter performs the step performed by the sending unit 2203.

An embodiment of this application further provides a computer readable storage medium. The computer readable storage medium stores an instruction, and when the computer readable storage medium runs on the mobility management network element shown in FIG. 30, FIG. 31, and FIG. 32, the mobility management network element is enabled to perform the network handover method shown in FIG. 10A and FIG. 10B to FIG. 17A and FIG. 17B in the embodiments of this application.

An embodiment of this application further provides a wireless communications apparatus. The wireless communications apparatus stores an instruction, and when the wireless communications apparatus runs on the mobility management network element shown in FIG. 30, FIG. 31, and FIG. 32, the mobility management network element is enabled to perform the network handover method shown in FIG. 10A and FIG. 10B to FIG. 17A and FIG. 17B in the embodiments of this application. Specifically, the wireless communications apparatus may be a chip.

Figure 33:
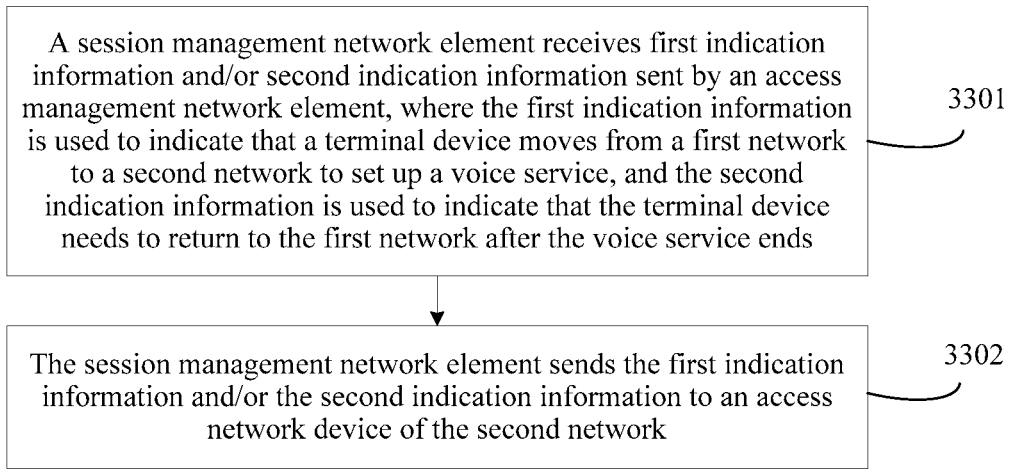
FIG. 33 is another schematic flowchart of a network handover method according to an embodiment of the present invention.

An embodiment of the present invention provides a network handover method. As shown in FIG. 33, the method includes the following steps.

3301. A session management network element receives first indication information and/or second indication information from an access management network element, where the first indication information is used to indicate that a terminal device moves from a first network to a second network to set up a voice service, and the second indication information is used to indicate that the terminal device needs to return to the first network after the voice service ends.

The access management network element is an access management device of the first network, and the session management network element is a session management device of the first network, or the session management network element is a session management device shared by the first network and the second network. In specific implementation, the session management network element receives a first message or a first service request from the access management network element, where the first message or the first service request includes first session management information from an access network device of the first network, and the first session management information is used to indicate, to the session management network element, whether setup of a user plane tunnel of the voice service is completed. In addition, the first session management information includes the first indication information and/or the second indication information. In this way, the session management network element obtains the first indication information and/or the second indication information.

In some embodiments, the session management network element receives a second message or a second service request from the access management network element, where the second message or the second service request is used to request a session management context of the terminal device from the session management network element. In addition, the second message or the second service request includes the first indication information and/or the second indication information from an access network device of the first network. After receiving the second message or the second service request, the session management network element obtains the first indication information and/or the second indication information.

In some embodiments, the session management network element receives a third message or a third service request from the access management network element, where the third message or the third service request is used to request the session management network element to hand over a session of the terminal device. In addition, the third message or the third service request includes the first indication information and/or the second indication information from an access network device of the first network. After receiving the third message or the third service request, the session management network element obtains the first indication information and/or the second indication information.

3302. The session management network element sends the first indication information and/or the second indication information to an access network device of the second network.

In specific implementation, the session management network element may send the first indication information and/or the second indication information to the access network device of the second network by sending a tunnel setup request to a serving gateway. For example, the session management network element sends the tunnel setup request to the serving gateway, where the tunnel setup request is used to request to set up a user plane tunnel of a voice service, and the tunnel setup request includes the first indication information and/or the second indication information, so that after receiving the tunnel setup request, the serving gateway can forward the first indication information and/or the second indication information to the access network device of the second network by using a mobility management network element.

In some other embodiments, the session management network element may further send third session management information to the access network device of the second network, where the third session management information is used to set up a user plane tunnel of a voice service, and the third session management information includes the first indication information and/or the second indication information. In other words, the session management network element may send the first indication information and/or the second indication information to the access network device of the second network by using the third session management information.

In some other embodiments, the session management network element may transmit the first indication information and/or the second indication information to the access network device of the second network by sending a tunnel release request to a serving gateway. Specifically, the session management network element sends the first indication information and/or the second indication information to the serving gateway by using the tunnel release request. After receiving the tunnel release request, the serving gateway forwards the first indication information and/or the second indication information to the access network device of the second network by using a mobility management network element. Specifically, the tunnel release request is used to release a user plane tunnel of a voice service, and the tunnel release request includes the first indication information and/or the second indication information.

In some embodiments, the user plane tunnel that is of the voice service and that is released by using the tunnel release request from the session management network element includes a user plane bearer of the voice service.

In some embodiments, the session management network element may directly send the first indication information and/or the second indication information to the access network device of the second network. Specifically, the session management network element sends second session management information to the access network device of the second network, where the second session management information is used to release a user plane tunnel of a voice service, and the second session management information includes the first indication information and/or the second indication information. The session management network element may send the second session management information to an access management network element of the second network, and the access management network element of the second network transparently transmits the second session management information to the access network device of the second network.

In some embodiments, the user plane tunnel that is of the voice service and that is released by using the second session management information from the session management network element includes a user plane quality of service flow of the voice service.

In some embodiments, before the session management network element sends the first indication information and/or the second indication information to the access network device of the second network, the session management network element determines that the voice service ends.

In some embodiments, when sending the first indication information and/or the second indication information to the access network device of the second network, the session management network element sends network identifier information of the first network to the access network device of the second network.

It should be noted that a type of a core network of the first network is the same as that of a core network of the second network, and a type of an access network of the first network is different from that of an access network of the second network; or a type of a core network of the first network is different from that of a core network of the second network, and a type of an access network of the first network is different from that of an access network of the second network.

For example, the core network of the first network and the core network of the second network are 5G core networks, the access network of the first network is an NG RAN, and the access network of the second network is an evolved universal terrestrial radio access network E-UTRAN.

Alternatively, the core network of the first network is a 5G core network, the core network of the second network is a 4G core network, the access network of the first network is an NG RAN, and the access network of the second network is an E-UTRAN.

Figure 34:
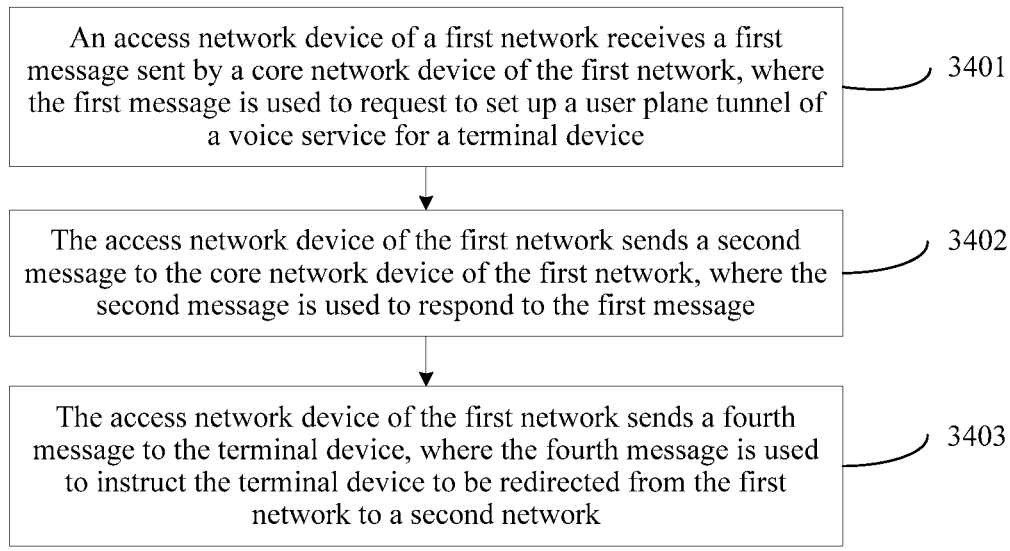
FIG. 34 is another schematic flowchart of a network handover method according to an embodiment of the present invention.

An embodiment of the present invention further provides a network handover method. As shown in FIG. 34, the method includes the following steps.

3401. An access network device of a first network receives a first message from a core network device of the first network, where the first message is used to request to set up a user plane tunnel of a voice service for a terminal device.

In specific implementation, the voice service of the terminal device may be an IMS voice service, and the access network device of the first network may be an NG RAN. When the terminal device initiates an IMS voice service in the first network, the first network probably cannot meet a voice service requirement of the terminal device, and therefore the terminal device needs to fall back to a second network to execute the voice service. Specifically, the terminal sends an invitation message to a P-CSCF in an IMS network. After receiving the invitation message, the P-CSCF in the IMS network triggers the core network device of the first network to send the first message to the access network device of the first network, to request to set up the user plane tunnel for the terminal device. The user plane tunnel may be referred to as a QoS flow in a 5G network.

The first message from the core network device of the first network to the access network device of the first network may be an N2 interface message, and the N2 interface message carries first session management (SM) information. In other words, the core network device of the first network may transparently transmit the first SM information to the access network device of the first network by using the N2 interface message. In addition, the first session management information may include a QoS parameter of the user plane tunnel of the IMS voice service of the terminal device.

It should be noted that the terminal device may be an originating terminal device of the voice service, or may be a terminating terminal device of the voice service. When the terminal device is a terminating terminal device, specifically, the terminal device receives an invitation message from a P-CSCF in a terminating IMS network, and the P-CSCF in the terminating IMS network triggers the core network device of the first network to send the first message to the access network device of the first network, to request to set up a user plane tunnel for the terminating terminal device.

3402. The access network device of the first network sends a second message to the core network device of the first network, where the second message is used to respond to the first message.

In specific implementation, the access network device of the first network may be an E-UTRAN. The access network device of the first network may receive the N2 interface message from the core network of the first network, and obtain the first message from the N2 interface message. In addition, the core network device in step 3401 may be an AMF. In other words, in step 3402, the NG RAN receives the N2 interface message from the AMF.

3403. The access network device of the first network sends a fourth message to the terminal device, where the fourth message is used to instruct the terminal device to be redirected from the first network to the second network.

At least one of the second message or the fourth message carries first indication information and/or second indication information, the first indication information is used to indicate that the terminal device moves from the first network to the second network to set up a voice service, and the second indication information is used to indicate that the terminal device needs to return to the first network after the voice service ends.

In specific implementation, the fourth message from the access network device of the first network to the terminal device may be a radio connection release (RRC) message. The fourth message may include redirection information. The terminal device may be redirected, based on the fourth message, from the first network to the second network to execute the voice service. Specifically, the redirection information includes frequency information, cell information, and the like that are of the second network that the terminal device needs to access (for details, refer to the 3GPP standard protocol), and the terminal device may access the second network based on the redirection information in the fourth message.

In some embodiments, the fourth message may also carry the first indication information and/or the second indication information.

In specific implementation, at least one of the second message from the access network device of the first network to the core network device of the first network and the fourth message from the access network device of the first network to the terminal device carries the first indication information and/or the second indication information.

In some embodiments, at least one of the second message and the fourth message carries network identifier information of the first network.

It should be noted that a type of a core network of the first network is the same as that of a core network of the second network, and a type of an access network of the first network is different from that of an access network of the second network; or a type of a core network of the first network is different from that of a core network of the second network, and a type of an access network of the first network is different from that of an access network of the second network.

For example, the core network of the first network and the core network of the second network are 5G core networks, the access network of the first network is an NG RAN, and the access network of the second network is an evolved universal terrestrial radio access network E-UTRAN.

Alternatively, the core network of the first network is a 5G core network, the core network of the second network is a 4G core network, the access network of the first network is an NG RAN, and the access network of the second network is an E-UTRAN.

Figure 35:
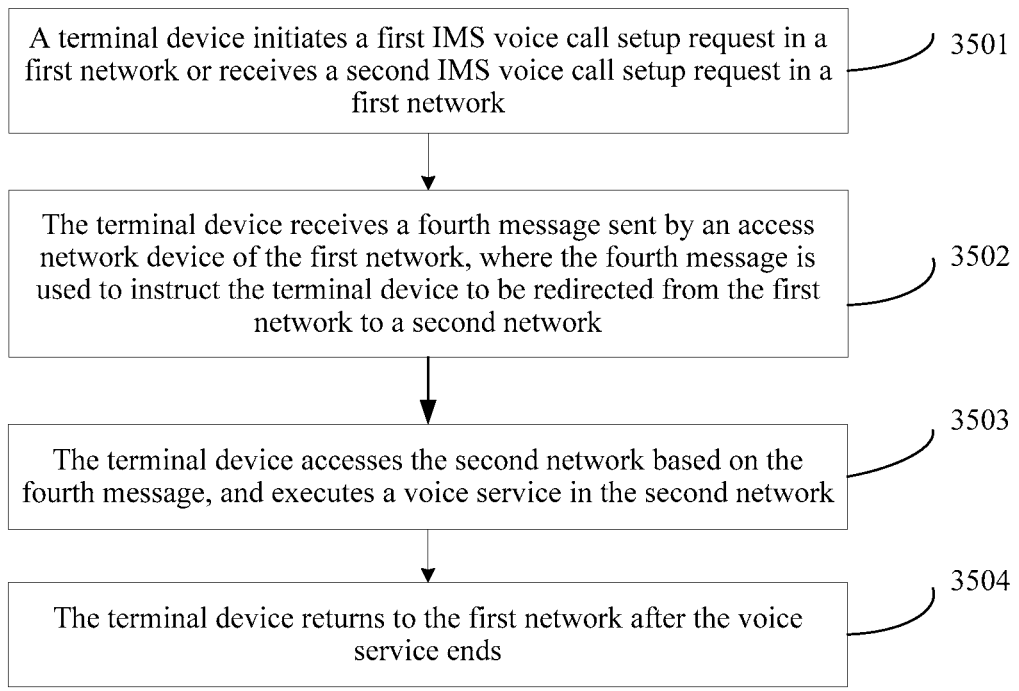
FIG. 35 is another schematic flowchart of a network handover method according to an embodiment of the present invention.

An embodiment of the present invention further provides a network handover method. As shown in FIG. 35, the method includes the following steps.

3501. A terminal device initiates a first voice call setup request in a first network or receives a second voice call setup request in a first network.

In this embodiment of the present invention, the terminal device may be a terminating terminal device of a voice service, and receives a voice call setup request in the first network. The terminal device may be alternatively an originating terminal device of a voice service, and initiates a voice call setup request in the first network. The voice service herein may be an IMS voice service or another similar voice service.

3502. The terminal device receives a fourth message from an access network device of the first network, where the fourth message is used to instruct the terminal device to be redirected from the first network to a second network.

In this embodiment of the present invention, after initiating the first voice call setup request in the first network or receiving the second voice call setup request in the first network, the terminal device may be redirected to the second network based on the fourth message to execute the voice service.

3503. The terminal device accesses the second network based on the fourth message, and executes the voice service in the second network.

In specific implementation, the fourth message includes redirection information, and the redirection information includes frequency information, cell information, and the like that are of the second network that the terminal device needs to access (for details, refer to the 3GPP standard protocol), and the terminal device may access the second network based on the redirection information in the fourth message.

In addition, that the terminal device executes the voice service in the second network means that the terminal device executes, in the second network, a voice service corresponding to the first voice call setup request or a voice service corresponding to the second voice call setup request; or the terminal device re-initiates a third voice call setup request in the second network and executes a voice service corresponding to the third voice call setup request, or re-receives a fourth voice call setup request in the second network and executes a voice service corresponding to the fourth voice call setup request.

3504. The terminal device returns to the first network after the voice service ends.

It should be noted that the fourth message may further include first indication information and/or second indication information and/or network identifier information of the first network. The first indication information is used to indicate that the terminal device moves from the first network to the second network to set up a voice service, and the second indication information is used to indicate that the terminal device needs to return to the first network after the voice service ends. It may be learned that, the terminal device may move to the first network after determining, based on the first indication information and/or the second indication information in the fourth message, that execution of the voice service in the second network is completed, so that the terminal device is prevented from camping on the second network for an excessively long time.

Specifically, in some implementations, if the fourth message includes the first indication information and/or the second indication information and/or the network identifier information of the first network, after the voice service ends, the terminal device may return to the first network based on the first indication information and/or the second indication information and/or the network identifier information of the first network.

In some other implementations, if the fourth message does not include the first indication information and/or the second indication information and/or the network identifier information of the first network, after the voice service ends, the terminal device may alternatively return to the first network by itself. For a specific implementation, refer to the method corresponding to FIG. 18. Details are not described herein again.

It should be noted that a type of a core network of the first network is the same as that of a core network of the second network, and a type of an access network of the first network is different from that of an access network of the second network; or a type of a core network of the first network is different from that of a core network of the second network, and a type of an access network of the first network is different from that of an access network of the second network.

For example, the core network of the first network and the core network of the second network are 5G core networks, the access network of the first network is an NG RAN, and the access network of the second network is an evolved universal terrestrial radio access network E-UTRAN.

Alternatively, the core network of the first network is a 5G core network, the core network of the second network is a 4G core network, the access network of the first network is an NG RAN, and the access network of the second network is an E-UTRAN.

The following describes a network handover method provided in another embodiment of this application by using an example in which a terminal device is UE, a first network is a 5G network connected to an NG RAN, and a second network is a 4G network connected to an E-UTRAN. Certainly, the method is also applicable to another network architecture, for example, an architecture in which the first network is a 5G network connected to an NG RAN, and the second network is a 5G network connected to an E-UTRAN. This is not limited in the present invention.

Figure 36A:
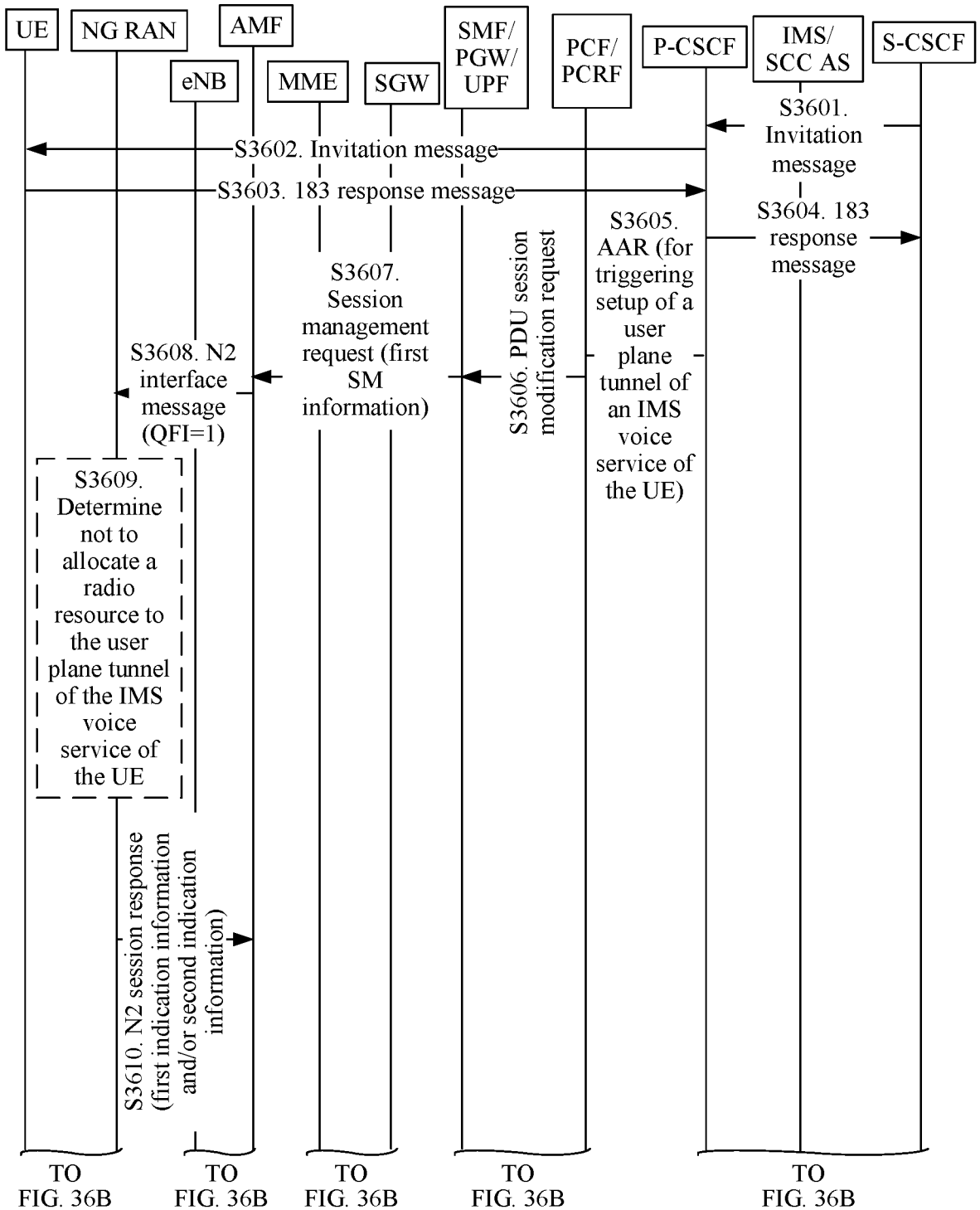
FIG. 36A and FIG. 36B are another schematic flowchart of a network handover method according to an embodiment of the present invention.
Figure 36B:
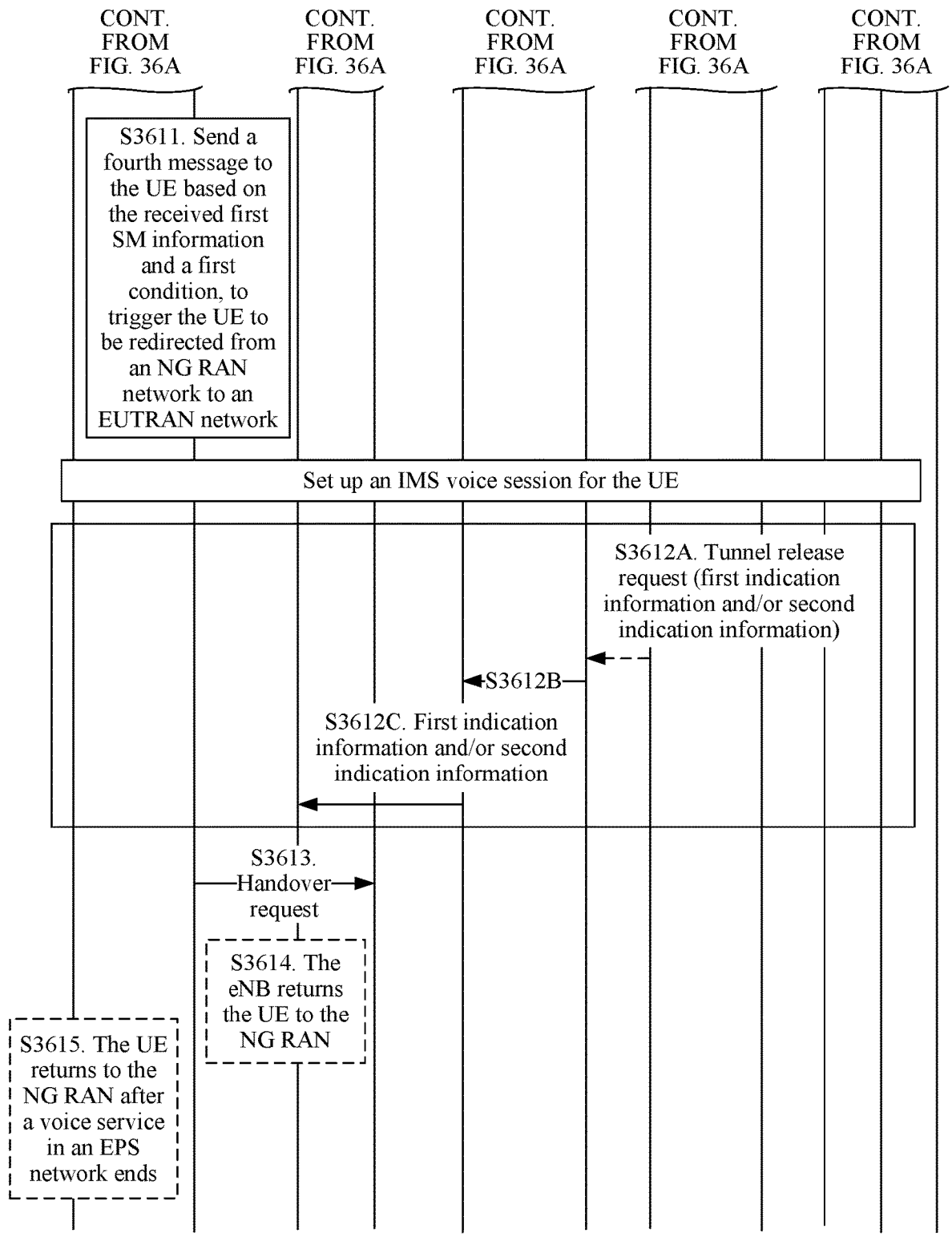

When the network handover method provided in this embodiment of this application is applied to the network shown in FIG. 3 (or applied to the 5G network shown in FIG. 1 and the 4G network shown in FIG. 2), UE may move from a 5G network connected to an NG RAN to an E-UTRAN connected to a 4G core network. Further, as shown in FIG. 36A and FIG. 36B, a network handover method provided in an embodiment of this application specifically includes the following steps.

Steps 3601 to 3610 are the same as steps 301 to 310 in the embodiments of the present invention, and are not described herein again.

3611. The NG RAN sends a fourth message to the UE based on the received first SM information and the first condition, to trigger the UE to be redirected from an NG RAN network to an EUTRAN network.

The NG RAN network is an access network type connected to a 5G core network, and the EUTRAN network is an access network type connected to a 5G core network or a 4G core network.

In other words, after receiving a request for setting up the user plane tunnel for the voice service of the UE in the 5G network, the NG RAN may trigger the UE to be redirected from the 5G network to the EPS network.

In specific implementation, if the first condition is met, the NG RAN may send the fourth message to the UE when determining, based on the first SM information, that a user plane tunnel with 5QI=1 needs to be set up.

It should be noted that, the NG RAN may send the fourth message to the UE based on only the received first SM information, to trigger the UE to move from the 5G network to the EPS network, in other words, the first condition may not be considered. For example, the NG RAN may send the fourth message to the UE when determining, based on the first SM information, that a user plane tunnel with 5QI=1 needs to be set up.

Optionally, the NG RAN may add the first indication information and/or the second indication information to the fourth message, where the first indication information is used to indicate that the terminal device moves from the first network to the second network to set up a voice service, and the second indication information is used to indicate that the terminal device needs to return to the first network after the voice service ends. After the first indication information and/or the second indication information are/is received by the UE, the UE may determine, based on the first indication information and/or the second indication information, to return to the 5G NG RAN network after the voice service in the EPS network ends. In some embodiments, the fourth message may further carry network identifier information of the first network, for example, a last 5G PLMN ID. After the network identifier information of the first network is received by the UE, the UE may determine, based on the network identifier information, to return to the NG RAN network of the first network after the voice service in the EPS network ends. For a procedure in which the UE is redirected from the 5G network to the EPS network, refer to a standard protocol. Details are not described herein. After the UE is redirected from the 5G network to the EPS network, and the UE receives signaling that is related to the IMS voice service and that is forwarded by the EPS network, the UE continues to perform a subsequent IMS voice call setup procedure in the EPS network, thereby completely setting up the IMS voice session.

After the UE is redirected from the 5G network to the EPS network, the eNB may send a connection setup request message or a path setup request message to the MME, where the connection setup request message or the path setup request message is used to set up a signaling connection between the eNB and the MME, and the eNB may correspondingly receive a connection setup response message or a path setup response message from the MME. It should be noted that, in this case, the MME may further send the first indication information and/or the second indication information to the eNB by using the connection setup response message or the path setup response message. The first indication information and/or the second indication information are/is received by the SMF/PGW-C in step 3608 and sent to the MME by using the SGW. After the first indication information and/or the second indication information are/is received by the eNB, the eNB may determine, based on the first indication information and/or the second indication information, to return the UE to the 5G NG RAN network after the voice service of the UE in the EPS network ends. In some embodiments, the MME may further add a last PLMN ID to the connection setup response message or the path setup response message, that is, an ID of a PLMN to which the 5G network that the UE camps on before the UE is redirected to the EPS network belongs, to instruct the eNB to return the UE to the 5G NG RAN network in which the UE is previously located.

3612. After the IMS voice service of the UE in the EPS network ends, the SMF/PGW-C initiates a dedicated bearer release procedure of the voice service.

The dedicated bearer release procedure may specifically include the following three steps:

3612A. The SMF+PGW-C sends a tunnel release request to the SGW, where the tunnel release request optionally carries the first indication information and/or the second indication information.

Specifically, the SMF+PGW-C sends, to the SGW based on the first indication information and/or the second indication information received in step 3608 and step 3609, the tunnel release request that carries the first indication information and/or the second indication information, so that the first indication information and/or the second indication information can be transmitted to the E-UTRAN (which may be specifically the eNB) by using the SGW and the MME.

In addition, the tunnel release request may be a delete bearer request, and is used to request to release the user plane tunnel of the voice service, that is, request to release a dedicated bearer with QCI=1.

In some embodiments, if the 5G network in which the UE initiates the voice service and the EPS network in which the UE actually executes the voice service after the redirection do not belong to a same PLMN, the SMF+PGW-C may add the last PLMN ID to a user plane tunnel release request of the voice service, that is, an ID of a PLMN to which the 5G network that the UE camps on before the UE moves to the EPS network belongs, to instruct the eNB to return the UE to the network in which the UE is previously located.

3612B. The SGW sends the tunnel release request of the voice service to the MME, where the tunnel release request optionally carries the first indication information and/or the second indication information.

3612C. The MME sends the tunnel release request of the voice service to the eNB, where the tunnel release request optionally carries the first indication information and/or the second indication information.

In some embodiments, if the 5G network in which the UE initiates the voice service and the EPS network in which the UE actually executes the voice service after the redirection do not belong to a same PLMN, the MME may add the last PLMN ID to the user plane tunnel release request of the voice service, to instruct the eNB to hand over the UE to the network in which the UE is previously located. The last PLMN ID may be from the SMF+PGW-C to the MME by using the SGW, and the MME forwards the last PLMN ID to the eNB, or the last PLMN ID may be determined by the MME and sent to the eNB.

Step 3613 is the same as step 313 in the embodiments of the present invention, and is not described herein again.

3614. Optionally, the eNB returns the UE to the NG RAN.

For a specific implementation in which the eNB returns the UE to the NG RAN, refer to step 314. Details are not described herein again.

It is noted that in this embodiment of the present invention, returning the UE to the NG RAN by the eNB is an optional manner. In another possible implementation, the UE may alternatively return to the NG RAN by itself. Refer to the following operation steps.

3615. Optionally, the UE returns to the NG RAN after the voice service in the EPS network ends.

Specifically, the UE may determine, based on the first indication information and/or the second indication information and/or the network identifier information of the first network included in the fourth message received in step 3611, to return to the NG RAN after the voice service in the EPS network ends.

For a method for returning to the NG RAN by the UE, refer to the description in step 1002. Details are not described herein again.

This embodiment of this application provides the method for returning the UE to the NG RAN after the voice service ends, in a scenario in which the UE is triggered, by using a redirection method in a network, to fall back from the NG RAN network to the EUTRAN network to execute the voice service. Herein, the NG RAN is an access network type connected to the 5G core network, and the EUTRAN is an access network type connected to the 4G core network or the 5G core network. In addition, it should be noted that, although an originating voice service is used as an example for description in this embodiment of this application, the method in this embodiment is also applicable to a terminating procedure. A difference lies only in that when the terminal device serves as an originating terminal device, the terminal device sends the invitation message to the P-CSCF after initiating an IMS voice call setup request, to request to set up the IMS voice service. When the terminal device serves as a terminating terminal, the terminal device sends the invitation message to the P-CSCF after receiving an IMS voice call setup request, to request to set up the IMS voice service.

Figure 37:
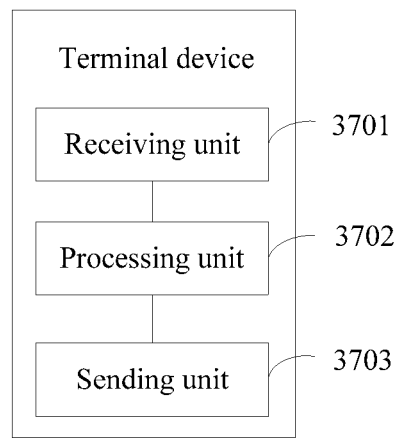
FIG. 37 to FIG. 39 are schematic composition diagrams of a terminal device according to an embodiment of this application.

An embodiment of this application provides a terminal device, and the terminal device may be specifically the UE described in the embodiments of this application. When each function module is obtained through division based on each corresponding function, FIG. 37 is a possible schematic structural diagram of the foregoing terminal device. As shown in FIG. 37, the terminal device includes a receiving unit 3701, a processing unit 3702, and a sending unit 3703.

The receiving unit 3701 is configured to support the terminal device in performing receiving a second IMS voice call setup request in the foregoing embodiment, and/or another process of the technology described in this specification.

The processing unit 3702 is configured to support the terminal device in performing step 3503 and step 3504 in the embodiments of the present invention, and/or another process of the technology described in this specification.

The sending unit 3703 is configured to support the terminal device in performing step 3502 in the embodiments of the present invention, and/or another process of the technology described in this specification.

It should be noted that all related content of the steps in the foregoing method embodiments can be cited in function descriptions of the corresponding function modules. Details are not described herein again.

Figure 38:
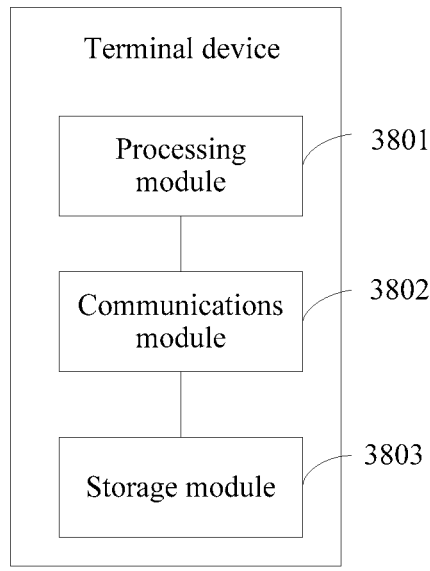

For example, when an integrated unit is used, FIG. 38 is a schematic structural diagram of a terminal device according to an embodiment of this application. In FIG. 38, the terminal device includes a processing module 3801 and a communications module 3802. The processing module 3801 is configured to control and manage actions of the terminal device, for example, performing the step performed by the processing unit 3702, and/or another process of the technology described in this specification. The communications module 3802 is configured to support interaction between the terminal device and another device, for example, performing the steps performed by the receiving unit 3701 and the sending unit 3703. As shown in FIG. 38, the terminal device may further include a storage module 3803, and the storage module 3803 is configured to store program code and data of the terminal device.

Figure 39:
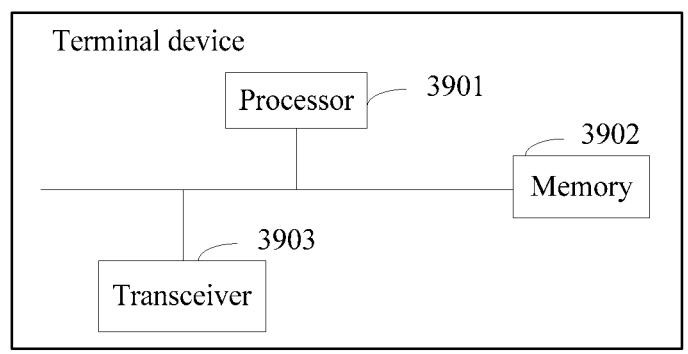

When the processing module 3801 is a processor, the communications module 3802 is a transceiver, and the storage module 3803 is a memory, the terminal device may be a terminal device shown in FIG. 39. Referring to FIG. 39, the terminal device includes at least one processor 3901, a memory 3902, and a transceiver 3903. The memory 3902 stores a group of code, and the processor 3901 invokes the code stored in the memory 3902, to support the terminal device in performing the network handover method provided in the embodiments of this application. If the transceiver is a receiver and a transmitter, the transmitter performs the step performed by the sending unit 3703. If the transceiver is a receiver and a transmitter, the receiver performs the step performed by the receiving unit 3701, and the transmitter performs the step performed by the sending unit 3703.

All or some of the foregoing embodiments may be implemented by software, hardware, firmware, or any combination thereof. When a software program is used to implement the embodiments, the embodiments may be all or partially implemented in a form of a computer program product. The computer program product includes one or more computer instructions. When the computer program instructions are loaded and executed on a computer, the procedures or functions in the embodiments of this application are all or partially generated. The computer may be a general-purpose computer, a special-purpose computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

In the embodiments of this application, for ease of understanding, a plurality of examples are used for description. However, these examples are merely examples, and do not mean that these examples are optimum implementations for implementing this application.

In the embodiments of this application, for ease of description, a request message, a response message, and names of various other messages are used. However, these messages are merely used as examples to describe content that needs to be carried or an implemented function. Specific names of the messages constitute no limitation on this application. For example, the messages may be a first message, a second message, and a third message. These messages may be specific messages, or may be some fields in the messages. These messages may alternatively represent various service operations.

The foregoing descriptions about implementations allow a person skilled in the art to understand that, for the purpose of ease and brevity of description, division of the foregoing function modules is merely used as an example for illustration. In actual application, the foregoing functions can be allocated to and implemented by different function modules depending on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or may not be physically separate, and parts displayed as units may be one or more physical units, may be located in one place, or may be distributed in different places. Some or all of the units may be selected depending on actual requirements, to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A network handover method, comprising:
receiving, by a session management network element, first indication information and second indication information from an access management network element, wherein the first indication information indicates that a terminal device is handed over from a first network to a second network to set up a voice service, and the second indication information indicates that the terminal device needs to return to the first network after the voice service ends, wherein the receiving the first indication information and the second indication information from the access management network element comprises at least one of the following:
receiving, by the session management network element, a first message from the access management network element, wherein the first message comprises first session management information from an access network device of the first network, the first session management information indicates, to the session management network element, whether setup of a user plane tunnel of the voice service is completed, and the first session management information comprises the first indication information and the second indication information; or
receiving, by the session management network element, a second message from the access management network element, wherein the second message is used to request a session management context of the terminal device from the session management network element, and the second message comprises the first indication information and the second indication information from an access network device of the first network; or
receiving, by the session management network element, a third message from the access management network element, wherein the third message is used to request the session management network element to hand over a session of the terminal device, and the third message comprises the first indication information and the second indication information from an access network device of the first network; and
sending, by the session management network element, the first indication information and the second indication information to an access network device of the second network.

2. The method according to claim 1, wherein the sending, by the session management network element, the first indication information and the second indication information to the access network device of the second network comprises:
sending, by the session management network element, second session management information to the access network device of the second network, wherein the second session management information is used to release a user plane tunnel of the voice service, and the second session management information comprises the first indication information and the second indication information.

3. The method according to claim 2, wherein the user plane tunnel of the voice service comprises a user plane quality of service flow of the voice service.

4. The method according to claim 1, wherein before the sending, by the session management network element, the first indication information and the second indication information to the access network device of the second network, the method further comprises:
   determining, by the session management network element, that the voice service ends.

5. The method according to claim 1, wherein the method further comprises:
   when sending the first indication information and the second indication information to the access network device of the second network, sending, by the session management network element, a network identifier of the first network to the access network device of the second network.

6. The method according to claim 1, wherein
   a type of a core network of the first network is the same as that of a core network of the second network, and a type of an access network of the first network is different from that of an access network of the second network; or
   a type of a core network of the first network is different from that of a core network of the second network, and a type of an access network of the first network is different from that of an access network of the second network.

7. The method according to claim 6, wherein the core network of the first network and the core network of the second network are 5G core networks, the access network of the first network is a next generation radio access network (NG RAN), and the access network of the second network is an evolved universal terrestrial radio access network (E-UTRAN).

8. The method according to claim 6, wherein the core network of the first network is a 5G core network, the core network of the second network is a 4G core network, the access network of the first network is an NG RAN, and the access network of the second network is an E-UTRAN.

9. An apparatus, comprising:
   at least one processor coupled with a memory, wherein the memory stores programming instructions for execution by the at least one processor to cause the apparatus to processor is configured to execute instructions stored in the memory, to enable the apparatus to perform the following operations:
   receiving first indication information and second indication information from an access management network element, wherein the first indication information indicates that a terminal device is handed over from a first network to a second network to set up a voice service, and the second indication information indicates that the terminal device needs to return to the first network after the voice service ends, wherein the receiving the first indication information and the second indication information from the access management network element comprises at least one of the following:
      receiving a first message from the access management network element, wherein the first message comprises first session management information from an access network device of the first network, the first session management information indicates, to the apparatus, whether setup of a user plane tunnel of the voice service is completed, and the first session management information comprises the first indication information and the second indication information; or
      receiving a second message from the access management network element, wherein the second message is used to request a session management context of the terminal device from the apparatus, and the second message comprises the first indication information and the second indication information from an access network device of the first network; or
      receiving a third message from the access management network element, wherein the third message is used to request the apparatus to hand over a session of the terminal device, and the third message comprises the first indication information and the second indication information from an access network device of the first network; and
   sending the first indication information and the second indication information to an access network device of the second network.

10. The apparatus according to claim 9, wherein the sending the first indication information and the second indication information to the access network device of the second network comprises:
   sending second session management information to the access network device of the second network, wherein the second session management information is used to release a user plane tunnel of the voice service, and the second session management information comprises the first indication information and the second indication information.

11. The apparatus according to claim 10, wherein the user plane tunnel of the voice service comprises a user plane quality of service flow of the voice service.

12. The apparatus according to claim 9, wherein the operations further comprise:
   determining that the voice service ends before sending the first indication information and the second indication information to the access network device of the second network.

13. The apparatus according to claim 9, wherein the operations further comprise:
   sending a network identifier of the first network to the access network device of the second network when sending the first indication information and the second indication information to the access network device of the second network.

14. A system, comprising:
   a session management apparatus, configured to receive first indication information and second indication information from an access management apparatus, wherein the first indication information indicates that a terminal device is handed over from a first network to a second network to set up a voice service, and the second indication information indicates that the terminal device needs to return to the first network after the voice service ends, and to send the first indication information and the second indication information to an access network device of the second network, wherein the session management apparatus configured to receive the first indication information and the second indication information from the access management apparatus comprises at least one of the following:
      the session management apparatus configured to receive a first message from the access management apparatus, wherein the first message comprises first session management information from an access network device of the first network, the first session management information indicates, to the session management apparatus, whether setup of a user plane tunnel of the voice service is completed, and the first session management information comprises the first indication information and the second indication information; or the session management apparatus configured to receive a second message from the access management apparatus, wherein the second message is used to request a session management context of the terminal device from the session management apparatus, and the second message comprises the first indication information and the second indication information from an access network device of the first network; or the session management apparatus configured to receive a third message from the access management apparatus, wherein the third message is used to request the session management apparatus to hand over a session of the terminal device, and the third message comprises the first indication information and the second indication information from an access network device of the first network; and the access management apparatus, configured to send the first indication information and second indication information to the session management apparatus.

* * * * *